United States Patent
Agiwal et al.

(10) Patent No.: US 10,681,754 B2
(45) Date of Patent: Jun. 9, 2020

(54) APPARATUS AND METHOD FOR ESTABLISHING NETWORK CONTROLLED DIRECT CONNECTION IN COMMUNICATION SYSTEM SUPPORTING DEVICE TO DEVICE SCHEME

(71) Applicant: Samsung Electronics Co., Ltd., Suwon-si, Gyeonggi-do (KR)

(72) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/023,926

(22) PCT Filed: Sep. 24, 2014

(86) PCT No.: PCT/KR2014/008875
§ 371 (c)(1),
(2) Date: Mar. 22, 2016

(87) PCT Pub. No.: WO2015/046868
PCT Pub. Date: Apr. 2, 2015

(65) Prior Publication Data
US 2016/0219639 A1    Jul. 28, 2016

(30) Foreign Application Priority Data
Sep. 24, 2013    (IN) .......................... 1096/KOL/2013

(51) Int. Cl.
*H04W 76/14*    (2018.01)
*H04W 8/02*    (2009.01)
*H04W 8/00*    (2009.01)
*H04W 84/04*    (2009.01)
*H04L 29/02*    (2006.01)

(52) U.S. Cl.
CPC ........... *H04W 76/14* (2018.02); *H04W 8/005* (2013.01); *H04W 8/02* (2013.01); *H04W 84/042* (2013.01)

(58) Field of Classification Search
CPC ..... H04W 8/02; H04W 8/005; H04W 76/046; H04L 29/02
See application file for complete search history.

(56) References Cited

U.S. PATENT DOCUMENTS 9,380,625 B2 *    6/2016    Schmidt ................. H04W 4/90
2010/0009675 A1    1/2010    Wijting et al.
(Continued)

FOREIGN PATENT DOCUMENTS

WO    2013-052163 A1    4/2003
WO    2006-016329 A1    2/2006
(Continued)

*Primary Examiner* — Asghar H Bilgrami
(74) *Attorney, Agent, or Firm* — Jefferson IP Law, LLP

(57) ABSTRACT

A method for establishing a network controlled direct connection by a first user equipment (UE) in a communication system supporting a device to device (D2D) scheme is provided. The method includes discovering a second UE, determining to establish a direct connection with the second UE, transmitting a direct connection request message to a mobility management entity (MME), and establishing a radio resource control (RRC) connection with the MME after transmitting the direct connection request message.

24 Claims, 23 Drawing Sheets

(56) References Cited

U.S. PATENT DOCUMENTS

| | | | |
|---|---|---|---|
| 2011/0098043 A1 | 4/2011 | Yu et al. | |
| 2012/0179789 A1* | 7/2012 | Griot | H04W 12/08 709/220 |
| 2013/0287012 A1* | 10/2013 | Pragada | H04W 76/25 370/338 |
| 2013/0288668 A1* | 10/2013 | Pragada | H04W 12/06 455/426.1 |
| 2013/0324114 A1* | 12/2013 | Raghothaman | H04W 76/023 455/426.1 |
| 2014/0022986 A1* | 1/2014 | Wu | H04W 48/16 370/328 |
| 2014/0213306 A1* | 7/2014 | Blankenship | H04W 4/21 455/457 |
| 2014/0241260 A1* | 8/2014 | Schmidt | H04W 72/04 370/329 |
| 2014/0254523 A1* | 9/2014 | Chai | H04W 72/04 370/329 |
| 2014/0256365 A1* | 9/2014 | Schmidt | H04W 4/90 455/466 |
| 2015/0004901 A1 | 1/2015 | Agiwal et al. | |
| 2016/0198329 A1* | 7/2016 | Lee | H04W 8/005 455/434 |
| 2016/0374104 A1* | 12/2016 | Watfa | H04W 36/0011 |
| 2017/0374611 A1* | 12/2017 | Pragada | H04W 12/06 |

FOREIGN PATENT DOCUMENTS

| | | | |
|---|---|---|---|
| WO | 2012-097075 A2 | | 7/2012 |
| WO | WO2012097075 | * | 7/2012 |
| WO | WO2012097075 A2 | * | 7/2012 |

* cited by examiner

ID. APPARATUS AND METHOD FOR ESTABLISHING NETWORK CONTROLLED DIRECT CONNECTION IN COMMUNICATION SYSTEM SUPPORTING DEVICE TO DEVICE SCHEME

CROSS-REFERENCE TO RELATED APPLICATION(S)

This application is a U.S. National Stage application under 35 U.S.C. § 371 of an International application filed on Sep. 24, 2014 and assigned application number PCT/KR2014/008875, which claimed the benefit of a Korean patent application filed on Sep. 24, 2013 in the Indian Patent Office and assigned Serial number 1096/KOL/2013, the entire disclosure of which is hereby incorporated by reference.

TECHNICAL FIELD

The present disclosure relates to an apparatus and method for establishing a connection in a communication system supporting a device to device (D2D) scheme. More particularly, the present disclosure relates to an apparatus and method for establishing a network controlled direct connection in a communication system supporting a D2D scheme.

BACKGROUND

A device to device (D2D) discovery process is a process of determining whether a D2D-enabled user equipment (UE) is in a proximity of other D2D-enabled UE. A discovering D2D-enabled UE determines whether other D2D-enabled UE is of interest to the discovering D2D-enabled UE based on the D2D discovery process. The other D2D-enabled UE is of interest to the discovering D2D-enabled UE if proximity of the other D2D-enabled UE needs to be known by one or more authorized applications on the discovering D2D-enabled UE. For example, a social networking application may be enabled to use a D2D discovery feature. The D2D discovery process enables a D2D-enabled UE of a given user of a social networking application to discover D2D-enabled UEs of friends of the given user of the social networking application, or to be discoverable by the D2D-enabled UEs of the friends of the given user of the social networking application. In another example, the D2D discovery process may enable the D2D-enabled UE of a given user of a search application to discover stores/restaurants, and the like of interest of the D2D-enabled UE of the given user of the search application in proximity of the D2D-enabled UE of the given user of the search application.

Discovery information transmitted during a D2D direct discovery process may be used below.

Firstly, the discovery information may be used as D2D application user identification. That is, in the D2D direct discovery process, a D2D-enabled application may detect a D2D-enabled UE for other user which is in proximity of the D2D-enabled application based on the discovery information.

Secondly, the discovery information may be used as interest information. That is, in the D2D direct discovery process, a user of a D2D-enabled application may discover another user of its interest in its proximity.

After discovering the user to which the discovering UE is of interest, the discovering UE may establish a dedicated connection with the discovered user in order to perform a communication between the discovering user and the discovered user. In order to establish the dedicated connection, there is a need for a UE identifier (ID) of the discovered UE. Here, in the communication network, the UE is identified based on the UE ID. The UE ID is needed to locate the UE in the communication network. The UE ID is needed to identity a UE corresponding to the application user by the communication network. It is noted that the application user is discovered during the direct D2D discovery process. Meanwhile, a scheme of determining the UE ID is a scheme of transmitting the UE ID in the discovery information. A size of a discovery channel is generally very small, and a size of the UE ID is relatively large. For example, the size of the UE ID may be maximum 80 bits. So, it is not feasible to transmit the UE ID through the discovery channel due to the size of the UE ID. Also, it is not advisable to transmit the UE ID through the discovery channel due to security reasons.

A network authorized direct connection establishment process in a communication system supporting a D2D scheme of the related art will be described with reference to FIG. 1.

FIG. 1 schematically illustrates a network authorized direct connection establishment process in a communication system supporting a D2D scheme according to the related art.

Referring to FIG. 1, the communication system includes a UE #1 111, an evolved node B (eNB)#1 113, a mobility management entity (MME) 115, an eNB #2 117, and a UE #2 119.

The UE #1 111 discovers the UE #2 119, and determines to establish a connection with the UE #2 119 at operation 121. During the discovery process, the UE #1 111 receives a discovery code for an application user of the UE #2 119. The discovery code is an alias for the application user. During the discovery process, a UE ID of the UE #2 119 is not transmitted by the UE #2 119. In order to establish a direct connection with the UE #2 119, the UE #1 111 transmits a direct connection request message to an eNB for a camped cell of the UE #1 111, e.g., the eNB #1 113 at operation 123. The direct connection request message includes a discovery code for the application user which is received by the UE #1 111 during the discovery process. After receiving the direct connection request message from the UE #1 111, the eNB #1 113 transmits the direct connection request message to the MME 115 at operation 125. After receiving the direct connection request message from the eNB #1 113, the MME 115 transmits a paging message including a direct connection indication parameter to the eNB #2 117 at operation 127. After receiving the paging message from the MME 115, the eNB #2 117 transmits the paging message to the UE #2 119 at operation 129. After receiving the paging message from the eNB #2 117, the UE #2 119 transmits a direct connection request message to the eNB #2 117 in response to the paging message at operation 131. After receiving the direct connection request message from the UE #2 119, the eNB #2 117 transmits the direct connection request message to the MME 115 at operation 133. After receiving the direct connection request message from the eNB #2 117, the MME 115 establishes a radio resource control (RRC) connection with the UE #1 111 through the eNB #1 113 at operation 135. That is, an RRC connection establishment process is performed among the UE #1 111, the eNB #1 113, and the MME 115. The MME 115 establishes an RRC connection with the UE #2 119 through the eNB #2 117 at operation 137. That is, an RRC connection establishment process is performed among the MME 115, the eNB #2 117, and the UE #2 119. So, an RRC connection is established between the UE #1 111 and the eNB #1 113, and an RRC connection is established between the UE #2 119 and the eNB #2 117. After the RRC connection is established, a direct connection signaling process is performed between the UE #1 111 and the UE #2 119 at operation 139. During the direct connection signaling process, direct connection parameters may be set up between the UE #1 111 and the UE #2 119. If there are no direct connection parameters to be set up, the process of setting up the direct connection parameters is not performed.

As described in FIG. 1, in a network authorized direct connection establishment process in a communication system supporting a conventional D2D scheme, it is not specified how the MME 115 determines the UE ID of the UE #2 119 from the discovery code of the UE #2 119. As described in FIG. 1, in a network authorized direct connection establishment process in a communication system supporting a conventional D2D scheme, it is not specified how the MME 115 determines location of the UE #2 119. The UE #2 119 may be associated with the same MME, other MME, or an MME which is included in other public land mobile network (PLMN). However, in order to establish a network authorized direct connection between the two UEs, there is a need for specifying how the MME 115 determines the UE ID of the UE #2 119 from the discovery code and how the MME 115 determines location of the UE #2 119.

So, there is a need for a scheme of determining an ID and location of a UE in order to establish a network controlled direct connection in a communication system supporting a D2D scheme.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for establishing a connection in a communication system supporting a device to device (D2D) scheme.

An embodiment of the present disclosure proposes an apparatus and method for establishing a network controlled direct connection in a communication system supporting a D2D scheme.

An embodiment of the present disclosure proposes an apparatus and method for establishing a network controlled direct connection thereby establishing a network associated connection in a communication system supporting a D2D scheme.

An embodiment of the present disclosure proposes an apparatus and method for establishing a network controlled direct connection thereby determining a user equipment (UE) identifier (ID) in a communication system supporting a D2D scheme.

An embodiment of the present disclosure proposes an apparatus and method for establishing a network controlled direct connection thereby determining a UE ID based on a proximity-based service (ProSe) UE ID in a communication system supporting a D2D scheme.

An embodiment of the present disclosure proposes an apparatus and method for establishing a network controlled direct connection thereby determining location of a UE in a communication system supporting a D2D scheme.

An embodiment of the present disclosure proposes an apparatus and method for establishing a network controlled direct connection thereby determining location of a UE based on a ProSe UE ID in a communication system supporting a D2D scheme.

An embodiment of the present disclosure proposes an apparatus and method for establishing a network controlled direct connection thereby increasing resource efficiency in a communication system supporting a D2D scheme.

An embodiment of the present disclosure proposes an apparatus and method for establishing a network controlled direct connection thereby decreasing signaling overhead in a communication system supporting a D2D scheme.

An embodiment of the present disclosure proposes an apparatus and method for establishing a network controlled direct connection based on mapping relation between a ProSe UE ID and application information in a communication system supporting a D2D scheme.

In accordance with an aspect of the present disclosure, a method for establishing a network controlled direct connection by a first UE in a communication system supporting a D2D scheme is provided. The method includes discovering a second UE, determining to establish a direct connection with the second UE, transmitting a direct connection request message to a mobility management entity (MME), and establishing a radio resource control (RRC) connection with the MME after transmitting the direct connection request message.

In accordance with another aspect of the present disclosure, a method for establishing a network controlled direct connection by an MME in a communication system supporting a D2D scheme is provided. The method includes determining whether a public land mobile network (PLMN) to which a first UE belongs is identical to a PLMN to which a second UE with which the first UE determines to establish a direct connection belongs after receiving a direct connection request message from the first UE, performing a process of acquiring a ProSe UE identifier (ID) of the second UE with a ProSe server if the PLMN to which the first UE belongs is identical to the PLMN to which the first UE belongs, determining an MME for the second UE based on the ProSe UE ID of the second UE, transmitting a paging message to the second UE if the MME for the second UE is identical to the MME, and establishing an RRC connection with the first UE and an RRC connection with the second UE after receiving a direct connection request message from the second UE.

In accordance with another aspect of the present disclosure, a method for establishing a network controlled direct connection by a ProSe server in a communication system supporting a D2D scheme is provided. The method includes determining whether a first UE and a second UE are authorized with each other in order to establish a direct connection between the first UE and the second UE after receiving a UE ID request message from an MME, determining a ProSe ID of the second UE if the first UE and the second UE are authorized with each other, and transmitting a UE ID response message including the ProSe ID of the second UE.

In accordance with another aspect of the present disclosure, a method for establishing a network controlled direct connection by a second UE in a communication system supporting a D2D scheme is provided. The method includes receiving a paging message from an MME, transmitting a direct connection request message to the MME after receiving the paging message, and establishing an RRC connection with the MME, wherein the paging message includes a direct connection indicator.

In accordance with another aspect of the present disclosure, a method for establishing a network controlled direct connection by an MME in a communication system supporting a D2D scheme is provided. The method includes transmitting a UE ID request message to a ProSe server after receiving a direct connection request message from a first UE, receiving a UE ID response message including a ProSe UE ID of a second UE with which the first UE determines to establish a direct connection from the ProSe server, determining an MME for the second UE based on the ProSe UE ID of the second UE, transmitting a paging message to the second UE if the MME for the second UE is identical to the MME, and establishing an RRC connection with the first UE and establishing an RRC connection with the second UE after receiving a direct connection request message from the second UE.

In accordance with another aspect of the present disclosure, a method for establishing a network controlled direct connection by a ProSe server in a communication system supporting a D2D scheme is provided. The method includes determining whether a PLMN to which the first UE belongs is identical to a PLMN to which a second UE with which the first UE determines to establish a direct connection belongs after receiving a UE ID request message from an MME, determining whether the first UE and the second UE are with authorized each other in order to establish a direct connection between the first UE and the second UE if the PLMN to which the first UE belongs is identical to the PLMN to which the second UE belongs, determining a ProSe ID of the second UE if the first UE and the second UE are with authorized each other, and transmitting a UE ID response message including the ProSe ID of the second UE.

In accordance with another aspect of the present disclosure, a first UE in a communication system supporting a D2D scheme is provided. The first UE includes a controller configured to discover a second UE, determine to establish a direct connection with the second UE, a transmitter configured to transmit a direct connection request message to an MME, and a receiver, wherein the transmitter and the receiver establish an RRC connection with the MME after the transmitter transmits the direct connection request message.

In accordance with another aspect of the present disclosure, an MME in a communication system supporting a D2D scheme is provided. The MME includes a controller configured to determine whether a PLMN to which a first UE belongs is identical to a PLMN to which a second UE with which the first UE determines to establish a direct connection belongs after a receiver receives a direct connection request message from the first UE, and a transmitter and the receiver configured to perform a process of acquiring a ProSe UE ID of the second UE with a ProSe server if the PLMN to which the first UE belongs is identical to the PLMN to which the first UE belongs, wherein the controller determines an MME for the second UE based on the ProSe UE ID of the second UE, wherein the transmitter transmits a paging message to the second UE if an MME for the second UE is identical to the MME, and wherein the transmitter and the receiver establish an RRC connection with the first UE and an RRC connection with the second UE after the receiver receives a direct connection request message from the second UE.

In accordance with another aspect of the present disclosure, a ProSe server in a communication system supporting a D2D scheme is provided. The ProSe server includes a controller configured to determine whether a first UE and a second UE are authorized with each other in order to establish a direct connection between the first UE and the second UE after a receiver receives a UE ID request message from an MME, and determine a ProSe ID of the second UE if the first UE and the second UE are authorized with each other, and a transmitter configured to transmit a UE ID response message including the ProSe ID of the second UE.

In accordance with another aspect of the present disclosure, a second UE in a communication system supporting a D2D scheme is provided. The second UE includes a receiver configured to receive a paging message from an MME, and a transmitter configured to transmit a direct connection request message to the MME after the receiver receives the paging message, wherein the transmitter and the receiver establish an RRC connection with the MME, and wherein the paging message includes a direct connection indicator.

In accordance with another aspect of the present disclosure, an MME in a communication system supporting a D2D scheme is provided. The MME includes a transmitter configured to transmit a UE ID request message to a ProSe server after a receiver receives a direct connection request message from a first UE, the receiver configured to receive a UE ID response message including a ProSe UE ID of a second UE with which the first UE determines to establish a direct connection from the ProSe server, and a controller configured to determine an MME for the second UE based on the ProSe UE ID of the second UE, wherein the transmitter transmits a paging message to the second UE if an MME for the second UE is identical to the MME, and wherein the transmitter and the receiver establish an RRC connection with the first UE and establish an RRC connection with the second UE after the receiver receives a direct connection request message from the second UE.

In accordance with another aspect of the present disclosure, a ProSe server in a communication system supporting a D2D scheme is provided. The ProSe server includes a controller configured to determine whether a PLMN to which the first UE belongs is identical to a PLMN to which a second UE with which the first UE determines to establish a direct connection belongs after a receiver receives a UE ID request message from an MME, determine whether the first UE and the second UE are authorized with each other in order to establish a direct connection between the first UE and the second UE if the PLMN to which the first UE belongs is identical to the PLMN to which the second UE belongs, and determine a ProSe ID of the second UE if the first UE and the second UE are authorized with each other, and a transmitter configured to transmit a UE ID response message including the ProSe ID of the second UE.

As is apparent from the foregoing description, an embodiment of the present disclosure enables to establish a network controlled direct connection in a communication system supporting a D2D scheme.

An embodiment of the present disclosure enables to establish a network controlled direct connection thereby establishing a network associated connection in a communication system supporting a D2D scheme.

An embodiment of the present disclosure enables to establish a network controlled direct connection thereby determining a UE ID in a communication system supporting a D2D scheme.

An embodiment of the present disclosure enables to establish a network controlled direct connection thereby determining a UE ID based on a ProSe UE ID in a communication system supporting a D2D scheme.

An embodiment of the present disclosure enables to establish a network controlled direct connection thereby determining location of a UE in a communication system supporting a D2D scheme.

An embodiment of the present disclosure enables to establish a network controlled direct connection thereby determining location of a UE based on a ProSe UE ID in a communication system supporting a D2D scheme.

An embodiment of the present disclosure enables to establish a network controlled direct connection thereby increasing resource efficiency in a communication system supporting a D2D scheme.

An embodiment of the present disclosure enables to establish a network controlled direct connection thereby decreasing signaling overhead in a communication system supporting a D2D scheme.

An embodiment of the present disclosure enables to establish a network controlled direct connection based on mapping relation between a ProSe UE ID and application information in a communication system supporting a D2D scheme.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
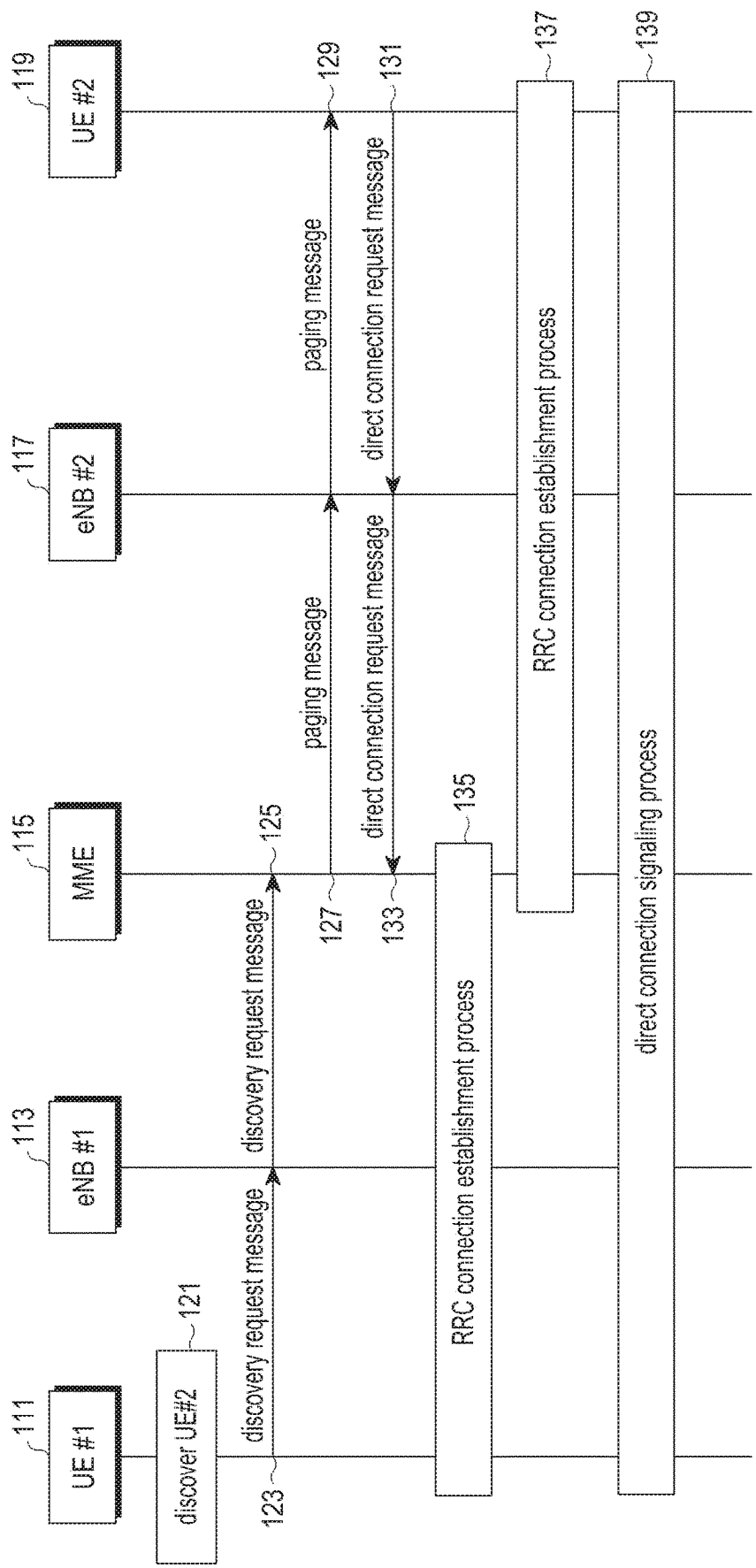
FIG. 1 schematically illustrates a network authorized direct connection establishment process in a communication system supporting a device to device (D2D) scheme according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include" and "comprise," as well as derivatives thereof, mean inclusion without limitation; the term "or," is inclusive, meaning and/or; the phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the present disclosure. The term "and/or" used herein includes any and all combinations of one or more of the associated listed items.

The terminology used herein is for the purpose of describing various embodiments of the present disclosure only and is not intended to be limiting. It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer 3 (mp3 player), a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a user equipment (UE) may be an electronic device.

An embodiment of the present disclosure proposes an apparatus and method for establishing a network controlled direct connection in a communication system supporting a device to device (D2D) scheme.

An embodiment of the present disclosure proposes an apparatus and method for establishing a network controlled direct connection thereby establishing a network associated connection in a communication system supporting a D2D scheme.

An embodiment of the present disclosure proposes an apparatus and method for establishing a network controlled direct connection thereby determining a UE identifier (ID) in a communication system supporting a D2D scheme.

An embodiment of the present disclosure proposes an apparatus and method for establishing a network controlled direct connection thereby determining a UE ID based on a proximity-based service (ProSe) UE ID in a communication system supporting a D2D scheme.

An embodiment of the present disclosure proposes an apparatus and method for establishing a network controlled direct connection thereby determining location of a UE in a communication system supporting a D2D scheme.

An embodiment of the present disclosure proposes an apparatus and method for establishing a network controlled direct connection thereby determining location of a UE based on a ProSe UE ID in a communication system supporting a D2D scheme.

An embodiment of the present disclosure proposes an apparatus and method for establishing a network controlled direct connection thereby increasing resource efficiency in a communication system supporting a D2D scheme.

An embodiment of the present disclosure proposes an apparatus and method for establishing a network controlled direct connection thereby decreasing signaling overhead in a communication system supporting a D2D scheme.

An embodiment of the present disclosure proposes an apparatus and method for establishing a network controlled direct connection based on mapping relation between a ProSe UE ID and application information in a communication system supporting a D2D scheme.

A method and apparatus proposed in an embodiment of the present disclosure may be applied to various communication systems such as a digital video broadcasting system such as a mobile broadcasting service such as a digital multimedia broadcasting (DMB) service, a digital video broadcasting-handheld (DVP-H) service, an advanced television systems committee-mobile/handheld (ATSC-M/H) service, and the like, and an Internet protocol television (IPTV) service, an MPEG media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a 3rd generation project partnership 2 (3GPP2), a wideband code division multiple access (WCDMA) mobile communication system proposed in the 3GPP2, a CDMA mobile communication system proposed in the 3GPP2, an Institute of Electrical and Electronics Engineers (IEEE) mobile communication system, a mobile IP system, and/or the like.

In a communication system supporting a D2D scheme according to an embodiment of the present disclosure, a ProSe UE ID is proposed, and a detailed description will be followed.

A ProSe UE ID is allocated to a D2D UE by a network. Here, the D2D UE denotes a UE which supports a D2D scheme. In order to establish a network assisted connection, a ProSe UE ID which is proposed in an embodiment of the present disclosure may be implemented with one of the following formats.

Firstly, the ProSe UE ID is a global unique terminal identifier (GUTI). The GUTI may be generated based on a mobile country code (MCC), a mobile network code (MNC), a mobility management entity group identifier (MMEGI), and a short temporary mobile station identifier (S-TMSI).

Secondly, the ProSe UE ID is generated based on an MME ID and an MME temporary mobile station identifier (M-TMSI). The MME ID may be generated based on an MMEGI and an MME code.

Thirdly, the ProSe UE ID may be generated based on an MMEGI and an S-TMSI.

Fourthly, the ProSe UE ID may be generated based on a GUTI, an MCC, an MNC, an S-TMSI, and additional parameters, e.g., a ProSe server ID, or may be generated based on an MMEGI, an S-TMSI, and the ProSe server ID.

The ProSe UE ID is generated based on temporary mobile IDs of the related art such as a GUTI or an S-TMSI, however, it will be understood by those of ordinary skill in the art that the ProSe UE ID may be generated based on new parameters which do not include any of the temporary mobile IDs of the related art such as the GUTI or the S-TMSI.

In a communication system supporting a D2D scheme according to an embodiment of the present disclosure, a scheme of mapping a ProSe UE ID and application information is proposed, and will be described below.

In order to establish a connection, a ProSe UE ID needs to be determined based on application information which is received during a discovery process. So, in an embodiment of the present disclosure, a mapping scheme between a ProSe UE ID and application information is proposed, and a mapping between the ProSe UE ID and the application information is maintained by a ProSe server or an application server. The mapping between the ProSe UE ID and the application information is used for determining the ProSe UE ID based on the application information which is received during the discovery process.

In an embodiment of the present disclosure, a mapping scheme between a ProSe UE ID and application information is proposed by considering three scenarios, i.e., a scenario #1, a scenario #2, and a scenario #3, and will be described below.

Each of the scenario #1, the scenario #2, and the scenario #3 will be described below.

The scenario #1 denotes a scenario in which discovery codes for application information are generated by a ProSe server.

The scenario #2 denotes a scenario in which discovery codes for application information are generated by a UE.

The scenario #3 denotes a scenario in which discovery codes for application information are not generated.

Firstly, each of schemes of maintaining mapping between a ProSe UE ID and application information in the scenario #1 as a scenario in which the discovery codes for the application information are generated by the ProSe server, i.e., a mapping scheme #1 between a ProSe UE ID and application information, a mapping scheme #2 between the ProSe UE ID and the application information, and a mapping scheme #3 between the ProSe UE ID and the application information will be described below.

A process of mapping between a ProSe UE ID and application information based on a mapping scheme #1 between a ProSe UE ID and application information which is performed in a scenario #1 in a communication system supporting a D2D scheme according to an embodiment of the present disclosure will be described below.

Figure 2:
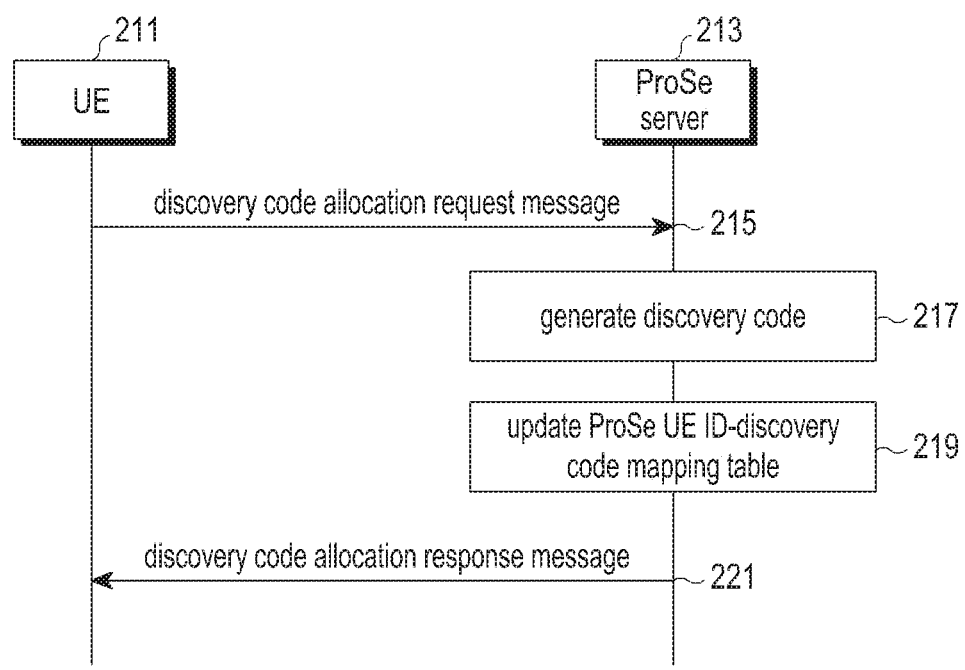
FIG. 2 schematically illustrates a process of mapping between a proximity-based service (ProSe) user equipment (UE) identifier (ID) and application information based on a mapping scheme #1 between a ProSe UE ID and application information which is performed in a scenario #1 in a communication system supporting a D2D scheme according to an embodiment of the present disclosure.

FIG. 2 schematically illustrates a process of mapping between a ProSe UE ID and application information based on a mapping scheme #1 between a ProSe UE ID and application information which is performed in a scenario #1 in a communication system supporting a D2D scheme according to an embodiment of the present disclosure.

Referring to FIG. 2, the communication system includes a UE 211, and a ProSe server 213.

The UE 211 transmits a discovery code allocation request message including a ProSe UE ID and application information of the UE 211 to the ProSe server 213 at operation 215. The UE 211 denotes a D2D UE which has a capability to perform a D2D discovery operation and D2D communication operation, i.e., a UE which supports a D2D scheme. The application information includes application user information or application user interest information, and the application information may be an application ID, an application user ID, and the like. The discovery code allocation request message is transmitted to the ProSe server 213, thereby a discovery code for the UE 211 is provided to an application user. The discovery code is an alias of application ID and application user ID which is transmitted by the UE 211 on the discovery channel during a discovery process. That is, after receiving the discovery code allocation request message from the UE 211, the ProSe server 213 generates a discovery code based on the ProSe UE ID and the application information included in the discovery code allocation request message at operation 217. The ProSe server 213 updates a ProSe UE ID-discovery code mapping table by mapping the ProSe UE ID included in the discovery code allocation request message to the generated discovery code at operation 219. The ProSe UE ID-discovery code mapping table denotes a table in which a ProSe UE ID is mapped to a discovery code one to one. If the ProSe UE ID-discovery code mapping table is previously generated, the ProSe server 213 updates the generated ProSe UE ID-discovery code mapping table. If the ProSe UE ID-discovery code mapping table is not previously generated, the ProSe server 213 generates the ProSe UE ID-discovery code mapping table. In FIG. 2, the ProSe server 213 updates the ProSe UE ID-discovery code mapping table. The ProSe server 213 transmits a discovery code allocation response message including the generated discovery code to the UE 211 at operation 221.

In FIG. 2, if the ProSe UE ID is an ID which is not based on any of conventional temporary mobile IDs such as a GUTI or an S-TMSI, the ProSe UE ID may be transmitted along with the GUTI, the S-TMSI, or MMEID+M-TMSI.

Although FIG. 2 illustrates a process of mapping between a ProSe UE ID and application information based on a mapping scheme #1 between a ProSe UE ID and application information which is performed in a scenario #1 in a communication system supporting a D2D scheme according to an embodiment of the present disclosure, various changes could be made to FIG. 2. For example, although shown as a series of operations, various operations in FIG. 2 could overlap, occur in parallel, occur in a different order, or occur multiple times.

A process of mapping between a ProSe UE ID and application information based on a mapping scheme #1 between a ProSe UE ID and application information which is performed in a scenario #1 in a communication system supporting a D2D scheme according to an embodiment of the present disclosure has been described with reference to FIG. 2, and a process of mapping between a ProSe UE ID and application information based on a mapping scheme #2 between a ProSe UE ID and application information which is performed in a scenario #1 in a communication system supporting a D2D scheme according to an embodiment of the present disclosure will be described with reference to FIG. 3.

Figure 3:
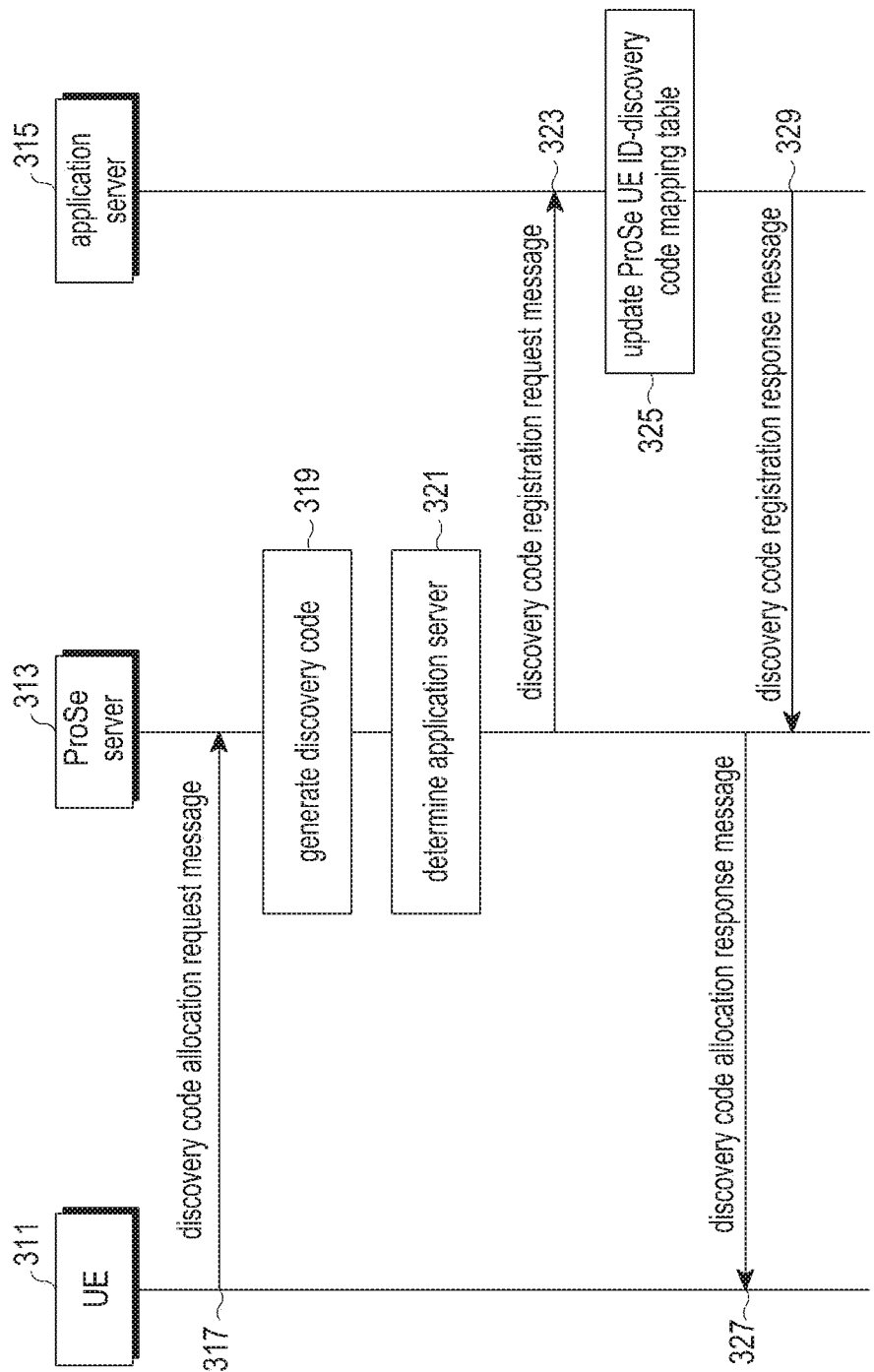
FIG. 3 schematically illustrates a process of mapping between a ProSe UE ID and application information based on a mapping scheme #2 between a ProSe UE ID and application information which is performed in a scenario #1 in a communication system supporting a D2D scheme according to an embodiment of the present disclosure.

FIG. 3 schematically illustrates a process of mapping between a ProSe UE ID and application information based on a mapping scheme #2 between a ProSe UE ID and application information which is performed in a scenario #1 in a communication system supporting a D2D scheme according to an embodiment of the present disclosure.

Referring to FIG. 3, the communication system includes a UE 311, a ProSe server 313, and an application server 315.

The UE 311 transmits a discovery code allocation request message including a ProSe UE ID and application information to the ProSe server 313 at operation 317. After receiving the discovery code allocation request message, the ProSe server 313 generates a discovery code based on the ProSe UE ID and the application information included in the discovery code allocation request message at operation 319.

The ProSe server 313 determines an application server for the UE 311, i.e., the application server 315 based on the application information included in the discovery code allocation request message at operation 321. The ProSe server 313 transmits a discovery code registration request message to the application server 315 at operation 323. The discovery code registration request message includes the ProSe UE ID and the discovery code. After receiving the discovery code registration request message from the ProSe server 313, the application server 315 updates a ProSe UE ID-discovery code mapping table by mapping the ProSe UE ID included in the discovery code allocation request message to the generated discovery code at operation 325. If the ProSe UE ID-discovery code mapping table is previously generated, the ProSe server 313 updates the generated ProSe UE ID-discovery code mapping table. If the ProSe UE ID-discovery code mapping table is not previously generated, the ProSe server 313 generates the ProSe UE ID-discovery code mapping table. In FIG. 3, the ProSe server 313 updates the ProSe UE ID-discovery code mapping table. The ProSe server 313 transmits a discovery code allocation response message as a responses message to the discovery code allocation request message at operation 327. The discovery code allocation response message includes the discovery code. The application server 315 transmits a discovery code registration response message as a response message to the discovery code registration request message to the ProSe server 313 at operation 329.

In FIG. 3, if the ProSe UE ID is an ID which is not based on any of conventional temporary mobile IDs such as a GUTI or an S-TMSI, the ProSe UE ID may be transmitted along with the GUTI, the S-TMSI, or MMEID+M-TMSI.

Although FIG. 3 illustrates a process of mapping between a ProSe UE ID and application information based on a mapping scheme #2 between a ProSe UE ID and application information which is performed in a scenario #1 in a communication system supporting a D2D scheme according to an embodiment of the present disclosure, various changes could be made to FIG. 3. For example, although shown as a series of operations, various operations in FIG. 3 could overlap, occur in parallel, occur in a different order, or occur multiple times.

A process of mapping between a ProSe UE ID and application information based on a mapping scheme #2 between a ProSe UE ID and application information which is performed in a scenario #1 in a communication system supporting a D2D scheme according to an embodiment of the present disclosure has been described with reference to FIG. 3, and a process of mapping between a ProSe UE ID and application information based on a mapping scheme #3 between a ProSe UE ID and application information which is performed in a scenario #1 in a communication system supporting a D2D scheme according to an embodiment of the present disclosure will be described with reference to FIG. 4.

Figure 4:
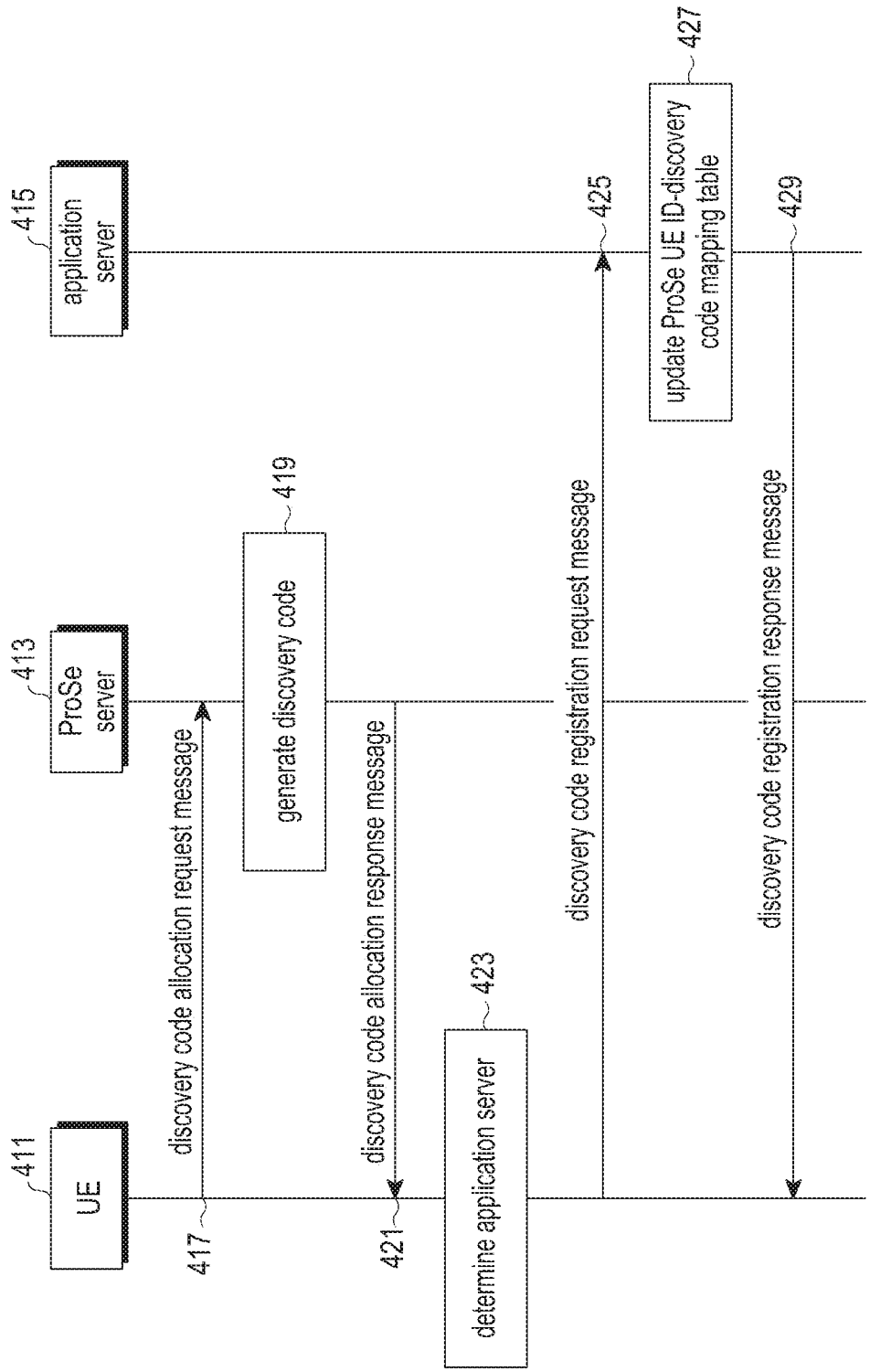
FIG. 4 schematically illustrates a process of mapping between a ProSe UE ID and application information based on a mapping scheme #3 between a ProSe UE ID and application information which is performed in a scenario #1 in a communication system supporting a D2D scheme according to an embodiment of the present disclosure.

FIG. 4 schematically illustrates a process of mapping between a ProSe UE ID and application information based on a mapping scheme #3 between a ProSe UE ID and application information which is performed in a scenario #1 in a communication system supporting a D2D scheme according to an embodiment of the present disclosure.

Referring to FIG. 4, the communication system includes a UE 411, a ProSe server 413, and an application server 415.

The UE 411 transmits a discovery code allocation request message including a ProSe UE ID and application information of the UE 411 to the ProSe server 413 at operation 417. After receiving the discovery code allocation request message, the ProSe server 413 generates a discovery code based on the ProSe UE ID and the application information included in the discovery code allocation request message at operation 419. The ProSe server 413 transmits a discovery code allocation response message including the generated discovery code to the UE 411 at operation 421. After receiving the discovery code registration response message from the ProSe server 413, the UE 411 determines an application server corresponding to the application information, i.e., the application server 415 at operation 423. The UE 411 transmits a discovery code registration request message to the application server 415 at operation 425. The discovery code registration request message includes a ProSe UE ID and a discovery code. After receiving the discovery code registration request message from the UE 411, the application server 415 updates a ProSe UE ID-discovery code mapping table by mapping the ProSe UE ID included in the discovery code allocation request message to the generated discovery code at operation 427. If the ProSe UE ID-discovery code mapping table is previously generated, the application server 415 updates the generated ProSe UE ID-discovery code mapping table. If the ProSe UE ID-discovery code mapping table is not previously generated, the application server 415 generates the ProSe UE ID-discovery code mapping table. In FIG. 4, the application server 415 updates the ProSe UE ID-discovery code mapping table. The application server 415 transmits a discovery code registration response message as a response message to the discovery code registration request message to the UE 411 at operation 429.

In FIG. 4, if the ProSe UE ID is an ID which is not based on any of conventional temporary mobile IDs such as a GUTI or an S-TMSI, the ProSe UE ID may be transmitted along with the GUTI, the S-TMSI, or MMEID+M-TMSI.

Although FIG. 4 illustrates a process of mapping between a ProSe UE ID and application information based on a mapping scheme #3 between a ProSe UE ID and application information which is performed in a scenario #1 in a communication system supporting a D2D scheme according to an embodiment of the present disclosure, various changes could be made to FIG. 4. For example, although shown as a series of operations, various operations in FIG. 4 could overlap, occur in parallel, occur in a different order, or occur multiple times.

Schemes which maintain a mapping between a ProSe UE ID and application information in a scenario #1 in which discovery codes for application information are generated by a ProSe server, i.e., a mapping scheme between a ProSe UE ID and application information #1, a mapping scheme between a ProSe UE ID and application information #2, and a mapping scheme between a ProSe UE ID and application information #3 have been described above, and schemes which maintain a mapping between a ProSe UE ID and application information in a scenario #2 in which discovery codes for application information are generated by a UE, i.e., a mapping scheme between a ProSe UE ID and application information #4, and a mapping scheme between a ProSe UE ID and application information #5 will be described below.

A process of mapping between a ProSe UE ID and application information based on a mapping scheme #4 between a ProSe UE ID and application information which is performed in a scenario #2 in a communication system supporting a D2D scheme according to an embodiment of the present disclosure will be described below.

Figure 5:
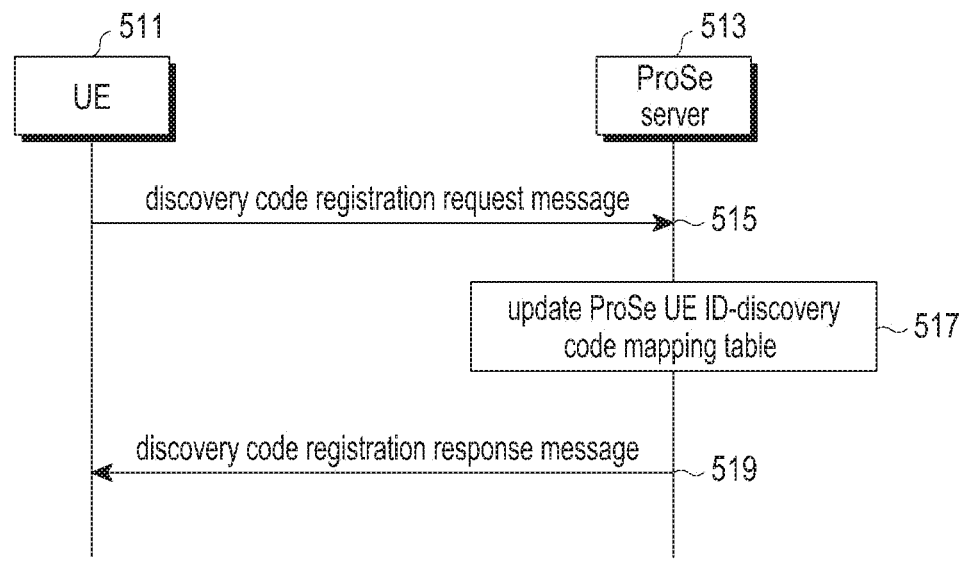
FIG. 5 schematically illustrates a process of mapping between a ProSe UE ID and application information based on a mapping scheme #4 between a ProSe UE ID and application information which is performed in a scenario #2 in a communication system supporting a D2D scheme according to an embodiment of the present disclosure.

FIG. 5 schematically illustrates a process of mapping between a ProSe UE ID and application information based on a mapping scheme #4 between a ProSe UE ID and application information which is performed in a scenario #2 in a communication system supporting a D2D scheme according to an embodiment of the present disclosure.

Referring to FIG. 5, the communication system includes a UE 511 and a ProSe server 513.

The UE 511 generates a discovery code(s), and transmits a discovery code registration request message including the discovery code(s) and a ProSe UE ID to the ProSe server 513 at operation 515. After receiving the discovery code registration request message from the UE 511, the ProSe server 513 updates a ProSe UE ID-discovery code mapping table by mapping the ProSe UE ID to the discovery code(s) at operation 517. If the ProSe UE ID-discovery code mapping table is previously generated, the ProSe server 513 updates the generated ProSe UE ID-discovery code mapping table. If the ProSe UE ID-discovery code mapping table is not previously generated, the ProSe server 513 generates the ProSe UE ID-discovery code mapping table. In FIG. 5, the ProSe server 513 updates the ProSe UE ID-discovery code mapping table. The ProSe server 513 transmits a discovery code registration response message as a response message to the discovery code registration request message to the UE 511 at operation 519.

In FIG. 5, if the ProSe UE ID is an ID which is not based on any of conventional temporary mobile IDs such as a GUTI or an S-TMSI, the ProSe UE ID may be transmitted along with the GUTI, the S-TMSI, or MMEID+M-TMSI.

Although FIG. 5 illustrates a process of mapping between a ProSe UE ID and application information based on a mapping scheme #4 between a ProSe UE ID and application information which is performed in a scenario #2 in a communication system supporting a D2D scheme according to an embodiment of the present disclosure, various changes could be made to FIG. 5. For example, although shown as a series of operations, various operations in FIG. 5 could overlap, occur in parallel, occur in a different order, or occur multiple times.

A process of mapping between a ProSe UE ID and application information based on a mapping scheme #4 between a ProSe UE ID and application information which is performed in a scenario #2 in a communication system supporting a D2D scheme according to an embodiment of the present disclosure has been described with reference to FIG. 5, and a process of mapping between a ProSe UE ID and application information based on a mapping scheme #5 between a ProSe UE ID and application information which is performed in a scenario #2 in a communication system supporting a D2D scheme according to an embodiment of the present disclosure will be described with reference to FIG. 6.

Figure 6:
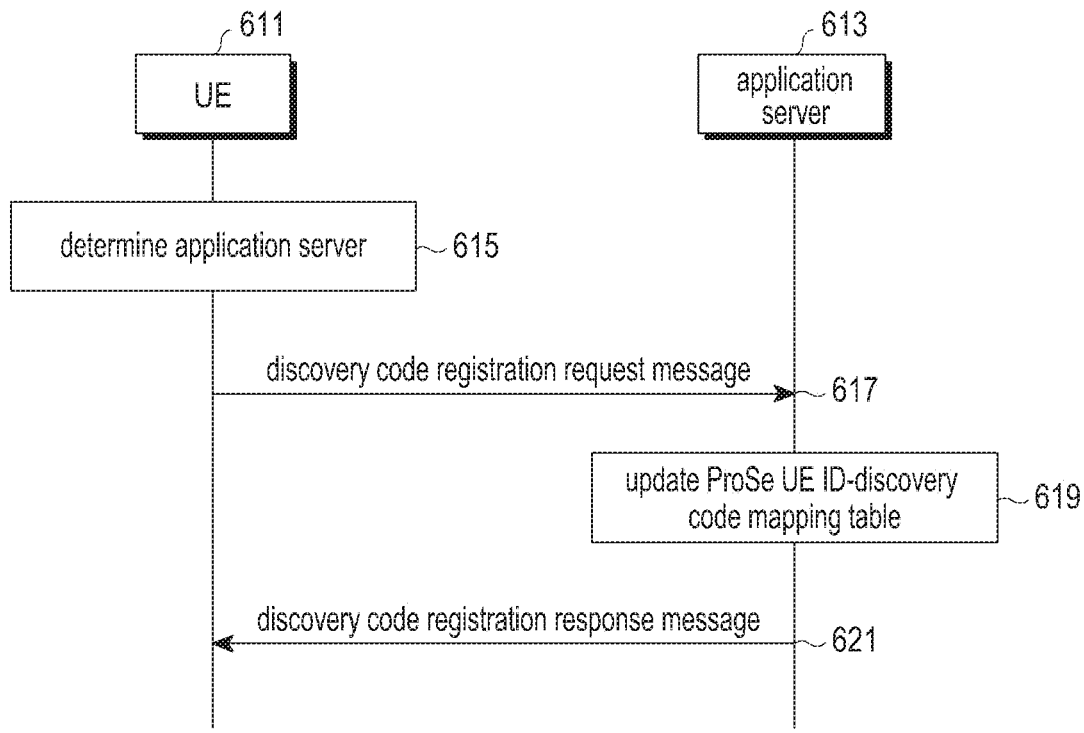
FIG. 6 schematically illustrates a process of mapping between a ProSe UE ID and application information based on a mapping scheme #5 between a ProSe UE ID and application information which is performed in a scenario #2 in a communication system supporting a D2D scheme according to an embodiment of the present disclosure.

FIG. 6 schematically illustrates a process of mapping between a ProSe UE ID and application information based on a mapping scheme #5 between a ProSe UE ID and application information which is performed in a scenario #2 in a communication system supporting a D2D scheme according to an embodiment of the present disclosure.

Referring to FIG. 6, the communication system includes a UE 611 and an application server 613.

The UE 611 generates a discovery code(s), and determines an application server corresponding to application information at operation 615. The UE 611 transmits a discovery code registration request message including the discovery code(s) and a ProSe UE ID to the application server 613 at operation 617. After receiving the discovery code registration request message from the UE 611, the application server 613 updates a ProSe UE ID-discovery code mapping table by mapping the ProSe UE ID to the discovery code(s) at operation 619. If the ProSe UE ID-discovery code mapping table is previously generated, the application server 613 updates the generated ProSe UE ID-discovery code mapping table. If the ProSe UE ID-discovery code mapping table is not previously generated, the application server 613 generates the ProSe UE ID-discovery code mapping table. In FIG. 6, the application server 613 updates the ProSe UE ID-discovery code mapping table. The application server 613 transmits a discovery code registration response message as a response message to the discovery code registration request message to the UE 611 at operation 621.

In FIG. 6, if the ProSe UE ID is an ID which is not based on any of conventional temporary mobile IDs such as a GUTI or an S-TMSI, the ProSe UE ID may be transmitted along with the GUTI, the S-TMSI, or MMEID+M-TMSI.

Although FIG. 6 illustrates a process of mapping between a ProSe UE ID and application information based on a mapping scheme #5 between a ProSe UE ID and application information which is performed in a scenario #2 in a communication system supporting a D2D scheme according to an embodiment of the present disclosure, various changes could be made to FIG. 6. For example, although shown as a series of operations, various operations in FIG. 6 could overlap, occur in parallel, occur in a different order, or occur multiple times.

Schemes which maintain a mapping between a ProSe UE ID and application information in a scenario #2 in which discovery codes for application information are generated by a UE, i.e., a mapping scheme between a ProSe UE ID and application information #4, and a mapping scheme between a ProSe UE ID and application information #5 have been described with reference to FIGS. 5 and 6, respectively, and each of schemes which maintain a mapping between a ProSe UE ID and application information in a scenario #3 in which discovery codes for application information are not generated, i.e., a mapping scheme between a ProSe UE ID and application information #6, and a mapping scheme between a ProSe UE ID and application information #7 will be described below.

A process of mapping between a ProSe UE ID and application information based on a mapping scheme #6 between a ProSe UE ID and application information which is performed in a scenario #3 in a communication system supporting a D2D scheme according to an embodiment of the present disclosure will be described with reference to FIG. 7.

Figure 7:
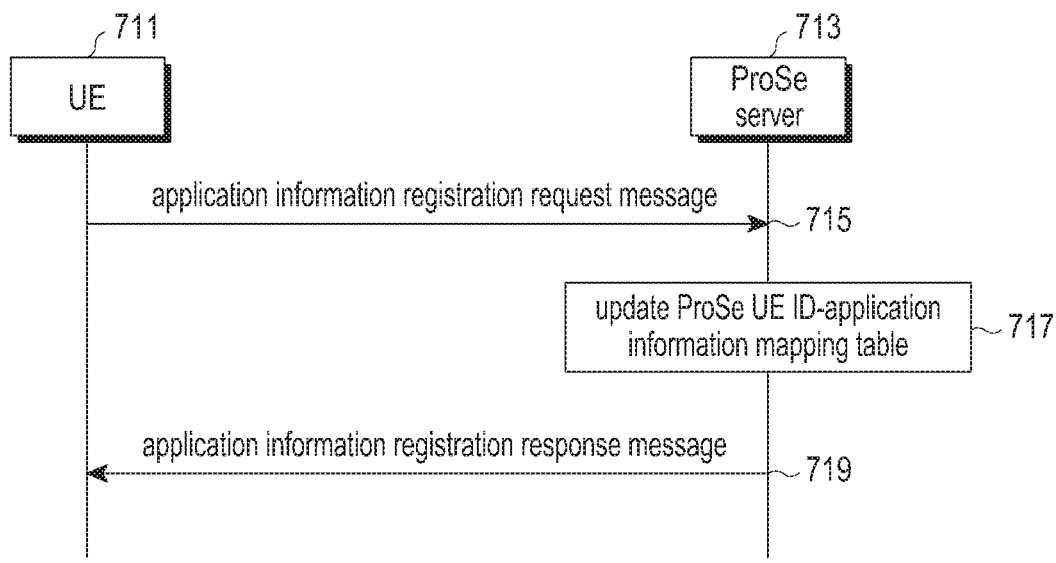
FIG. 7 schematically illustrates a process of mapping between a ProSe UE ID and application information based on a mapping scheme #6 between a ProSe UE ID and application information which is performed in a scenario #3 in a communication system supporting a D2D scheme according to an embodiment of the present disclosure.

FIG. 7 schematically illustrates a process of mapping between a ProSe UE ID and application information based on a mapping scheme #6 between a ProSe UE ID and application information which is performed in a scenario #3 in a communication system supporting a D2D scheme according to an embodiment of the present disclosure.

Referring to FIG. 7, the communication system includes a UE 711 and a ProSe server 713.

The UE 711 does not generate a discovery code for application information, so the UE 711 transmits an application information registration request message including the application information and a ProSe UE ID to the ProSe server 713 at operation 715. After receiving the application information registration request message from the UE 711, the ProSe server 713 updates a ProSe UE ID-application information mapping table by mapping the ProSe UE ID to the application information at operation 717. If the ProSe UE ID-application information mapping table is previously generated, the ProSe server 713 updates the generated ProSe UE ID-application information mapping table. If the ProSe UE ID-application information mapping table is not previously generated, the ProSe server 713 generates the ProSe UE ID-application information mapping table. In FIG. 7, the ProSe server 713 updates the ProSe UE ID-application information mapping table. The ProSe server 713 transmits an application information registration response message as a response message to the application information registration request message to the UE 711 at operation 719.

In FIG. 7, if the ProSe UE ID is an ID which is not based on any of conventional temporary mobile IDs such as a GUTI or an S-TMSI, the ProSe UE ID may be transmitted along with the GUTI, the S-TMSI, or MMEID+M-TMSI.

Although FIG. 7 illustrates a process of mapping between a ProSe UE ID and application information based on a mapping scheme #6 between a ProSe UE ID and application information which is performed in a scenario #3 in a communication system supporting a D2D scheme according to an embodiment of the present disclosure, various changes could be made to FIG. 7. For example, although shown as a series of operations, various operations in FIG. 7 could overlap, occur in parallel, occur in a different order, or occur multiple times.

A process of mapping between a ProSe UE ID and application information based on a mapping scheme #6 between a ProSe UE ID and application information which is performed in a scenario #3 in a communication system supporting a D2D scheme according to an embodiment of the present disclosure has been described with reference to FIG. 7, and a process of mapping between a ProSe UE ID and application information based on a mapping scheme #7 between a ProSe UE ID and application information which is performed in a scenario #3 in a communication system supporting a D2D scheme according to an embodiment of the present disclosure will be described with reference to FIG. 8.

Figure 8:
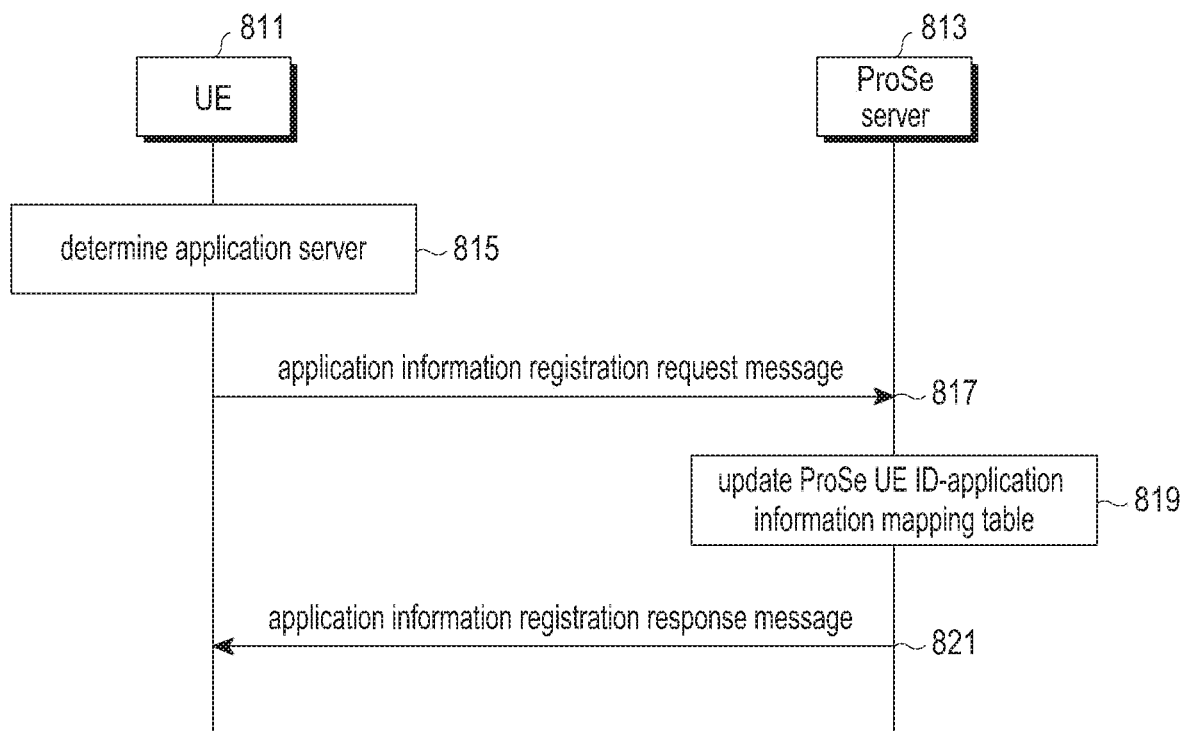
FIG. 8 schematically illustrates a process of mapping between a ProSe UE ID and application information based on a mapping scheme #7 between a ProSe UE ID and application information which is performed in a scenario #3 in a communication system supporting a D2D scheme according to an embodiment of the present disclosure.

FIG. 8 schematically illustrates a process of mapping between a ProSe UE ID and application information based on a mapping scheme #7 between a ProSe UE ID and application information which is performed in a scenario #3 in a communication system supporting a D2D scheme according to an embodiment of the present disclosure.

Referring to FIG. 8, the communication system includes a UE 811 and an application server 813.

The UE 811 determines an application server corresponding to application information at operation 815. The UE 811 transmits an application information registration request message including the application information, e.g., an application ID or an application user ID and a ProSe UE ID to the application server 813 at operation 817. After receiving the application information registration request message from the UE 811, the application server 813 updates a ProSe UE ID-application information mapping table by mapping the ProSe UE ID to the application information at operation 819. If the ProSe UE ID-application information mapping table is previously generated, the application server 813 updates the generated ProSe UE ID-application information mapping table. If the ProSe UE ID-application information mapping table is not previously generated, the application server 813 generates the ProSe UE ID-application information mapping table. In FIG. 8, the application server 813 updates the ProSe UE ID-application information mapping table. The application server 813 transmits an application information registration response message as a response message to the application information registration request message to the UE 811 at operation 821.

In FIG. 8, if the ProSe UE ID is an ID which is not based on any of conventional temporary mobile IDs such as a GUTI or an S-TMSI, the ProSe UE ID may be transmitted along with the GUTI, the S-TMSI, or MMEID+M-TMSI.

Although FIG. 8 illustrates a process of mapping between a ProSe UE ID and application information based on a mapping scheme #7 between a ProSe UE ID and application information which is performed in a scenario #3 in a communication system supporting a D2D scheme according to an embodiment of the present disclosure, various changes could be made to FIG. 8. For example, although shown as a series of operations, various operations in FIG. 8 could overlap, occur in parallel, occur in a different order, or occur multiple times.

Schemes which maintain a mapping between a ProSe UE ID and application information in a scenario #3 in which discovery codes for application information are not generated, i.e., a mapping scheme between a ProSe UE ID and application information #6, and a mapping scheme between a ProSe UE ID and application information #7 have been described with reference to FIGS. 7 and 8, respectively, and schemes of updating a mapping table between a ProSe UE ID and application information in a case that association between an MME and a UE is changed will be described below.

MME information includes a ProSe UE ID, and if an MME associated with the UE 911 is changed, the ProSe UE ID is changed. So, a mapping table between a ProSe UE ID and application information which are managed by a ProSe server or an application server needs to be updated. Association for the MME may be changed through a tracking area update process.

An example of a process of updating a mapping table between a ProSe UE ID and application information in a case that association between an MME and a UE is changed in a communication system supporting a D2D scheme according to an embodiment of the present disclosure will be described with reference to FIG. 9.

Figure 9:
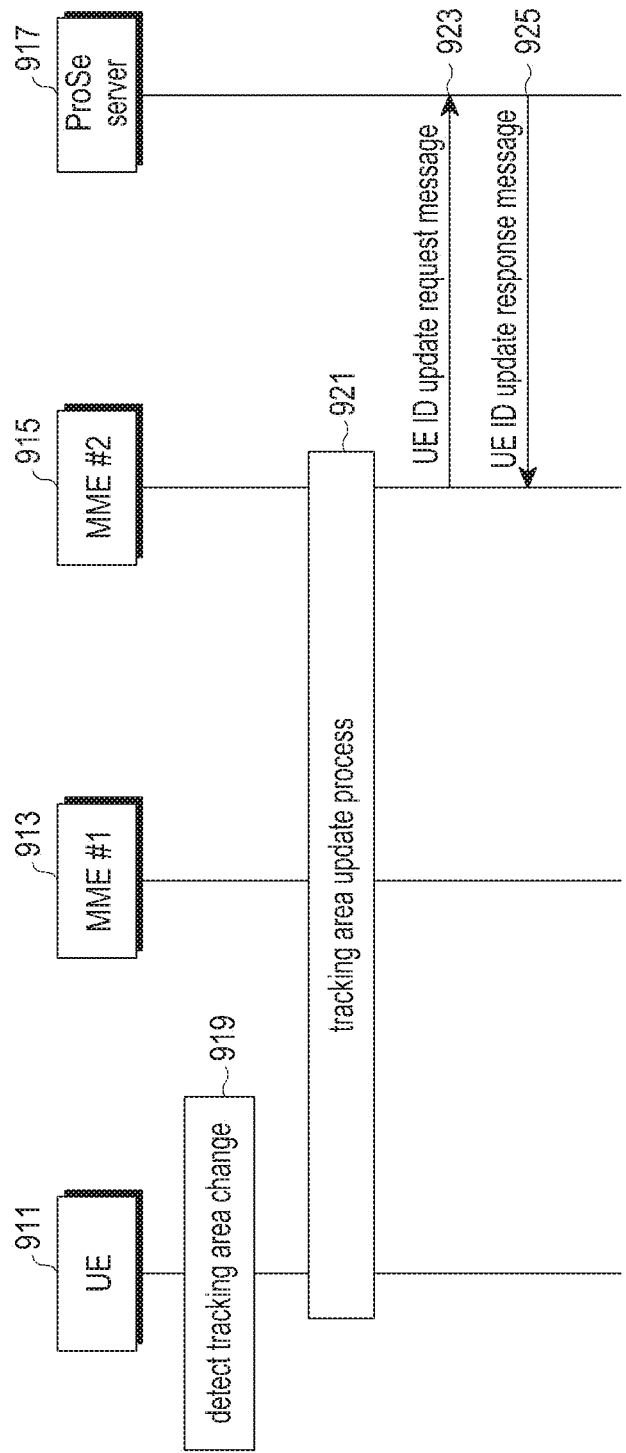
FIG. 9 schematically illustrates an example of a process of updating a mapping table between a ProSe UE ID and application information in a case that association between a mobility management entity (MME) and a UE is changed in a communication system supporting a D2D scheme according to an embodiment of the present disclosure.

FIG. 9 schematically illustrates an example of a process of updating a mapping table between a ProSe UE ID and application information in a case that association between an MME and a UE is changed in a communication system supporting a D2D scheme according to an embodiment of the present disclosure.

Referring to FIG. 9, the communication system includes a UE 911, an MME #1 913, an MME #2 915, and a ProSe server 917.

The UE 911 detects that a tracking area is changed at operation 919. In FIG. 9, it will be assumed that the tracking area of the UE 911 is changed from the MME #1 913 to the MME #2 915. After detecting that the tracking area is changed, the UE 911 performs a tracking area update process with the MME #1 913 and the MME #2 915 at operation 921. After the tracking area update process among the UE 911, the MME #1 913, and the MME #2 915 is performed, the MME #2 915 transmits a UE ID update request message which requests to update a UE ID to the ProSe server 917 at operation 923. The UE ID update request message includes an old ProSe UE ID and a new ProSe UE ID. In FIG. 9, it will be assumed that a ProSe UE ID is generated based on a GUTI, MMEGI+S-TMSI, or MME ID+M-TMSI.

After receiving the UE ID update request message from the MME #2 915, the ProSe server 917 updates a mapping table between a ProSe UE ID and application information by updating a UE ID for the UE 911, i.e., a ProSe UE ID, and transmits a UE ID update response as a response message to the UE ID update request message to the MME #2 915 at operation 925.

If the ProSe UE ID is an ID which is not based on any of conventional temporary mobile IDs such as a GUTI or an S-TMSI, the ProSe UE ID may be transmitted along with the GUTI, the S-TMSI, or MMEID+M-TMSI.

As described above, it is noted that a process of updating a mapping table between a ProSe UE ID and application information in FIG. 9 is a process in which a new MME updates a mapping table between a ProSe UE ID and application information by updating a ProSe UE ID of the UE with a ProSe server.

Although FIG. 9 illustrates an example of a process of updating a mapping table between a ProSe UE ID and application information in a case that association between an MME and a UE is changed in a communication system supporting a D2D scheme according to an embodiment of the present disclosure, various changes could be made to FIG. 9. For example, although shown as a series of operations, various operations in FIG. 9 could overlap, occur in parallel, occur in a different order, or occur multiple times.

An example of a process of updating a mapping table between a ProSe UE ID and application information in a case that association between an MME and a UE is changed in a communication system supporting a D2D scheme according to an embodiment of the present disclosure has been described with reference to FIG. 9, and another example of a process of updating a mapping table between a ProSe UE ID and application information in a case that association between an MME and a UE is changed in a communication system supporting a D2D scheme according to an embodiment of the present disclosure will be described with reference to FIG. 10.

Figure 10:
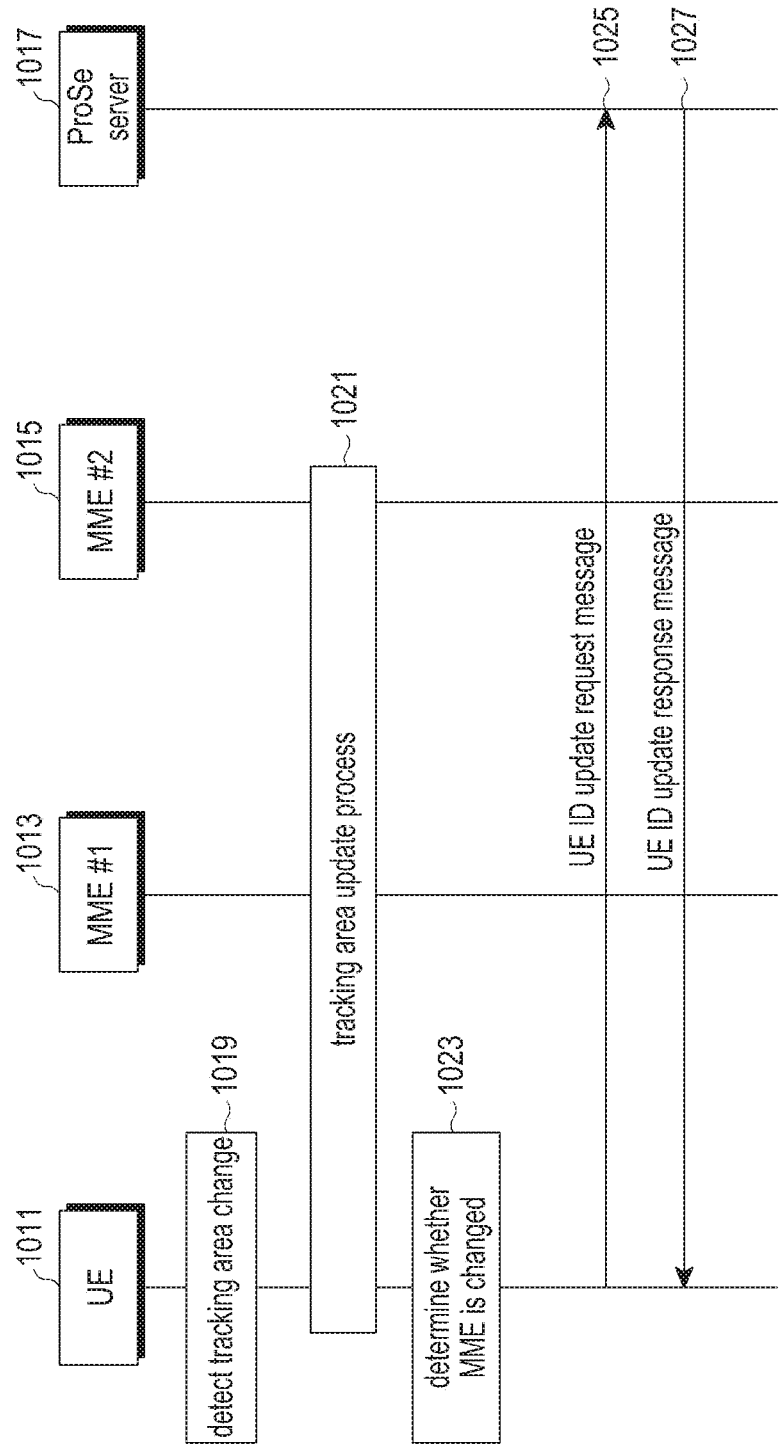
FIG. 10 schematically illustrates another example of a process of updating a mapping table between a ProSe UE ID and application information in a case that association between an MME and a UE is changed in a communication system supporting a D2D scheme according to an embodiment of the present disclosure.

FIG. 10 schematically illustrates another example of a process of updating a mapping table between a ProSe UE ID and application information in a case that association between an MME and a UE is changed in a communication system supporting a D2D scheme according to an embodiment of the present disclosure.

Referring to FIG. 10, the communication system includes a UE 1011, an MME #1 1013, an MME #2 1015, and a ProSe server 1017.

The UE 1011 detects that a tracking area is changed at operation 1019. In FIG. 10, it will be assumed that the tracking area of the UE 1011 is changed from the MME #1 1013 to the MME #2 1015. After detecting that the tracking area is changed, the UE 1011 performs a tracking area update process with the MME #1 1013 and the MME #2 1015 at operation 1021. After the tracking area update process among the UE 1011, the MME #1 1013, and the MME #2 1015 is performed, the UE 1011 determines whether an MME associated with the UE 1011 is changed at operation 1023. If the MME associated with the UE 1011 is changed, the UE 1011 transmits a UE ID update request message to the ProSe server 1017 at operation 1025. The UE ID update request message includes an old ProSe UE ID and a new ProSe UE ID. In FIG. 10, it will be assumed that a ProSe UE ID is generated based on a GUTI, MMEGI+S-TMSI, or MME ID+M-TMSI.

After receiving the UE ID update request message from the UE 1011, the ProSe server 1017 updates a mapping table between the ProSe UE ID and the application information by updating the UE ID for the UE 1011, i.e., the ProSe UE ID, and transmits a UE ID update response message as a response message to the UE ID update request message to the UE 1011 at operation 1027.

If the ProSe UE ID is an ID which is not based on any of conventional temporary mobile IDs such as a GUTI or an S-TMSI, the ProSe UE ID may be transmitted along with the GUTI, the S-TMSI, or MMEID+M-TMSI.

As described above, it is noted that a process of updating a mapping table between a ProSe UE ID and application information in FIG. 10 is a process in which a UE updates a mapping table between a ProSe UE ID and application information by updating a ProSe UE ID of the UE with a ProSe server.

Although FIG. 10 illustrates another example of a process of updating a mapping table between a ProSe UE ID and application information in a case that association between an MME and a UE is changed in a communication system supporting a D2D scheme according to an embodiment of the present disclosure, various changes could be made to FIG. 10. For example, although shown as a series of operations, various operations in FIG. 10 could overlap, occur in parallel, occur in a different order, or occur multiple times.

Another example of a process of updating a mapping table between a ProSe UE ID and application information in a case that association between an MME and a UE is changed in a communication system supporting a D2D scheme according to an embodiment of the present disclosure has been described with reference to FIG. 10, and still another example of a process of updating a mapping table between a ProSe UE ID and application information in a case that association between an MME and a UE is changed in a communication system supporting a D2D scheme according to an embodiment of the present disclosure will be described with reference to FIG. 11.

Figure 11:
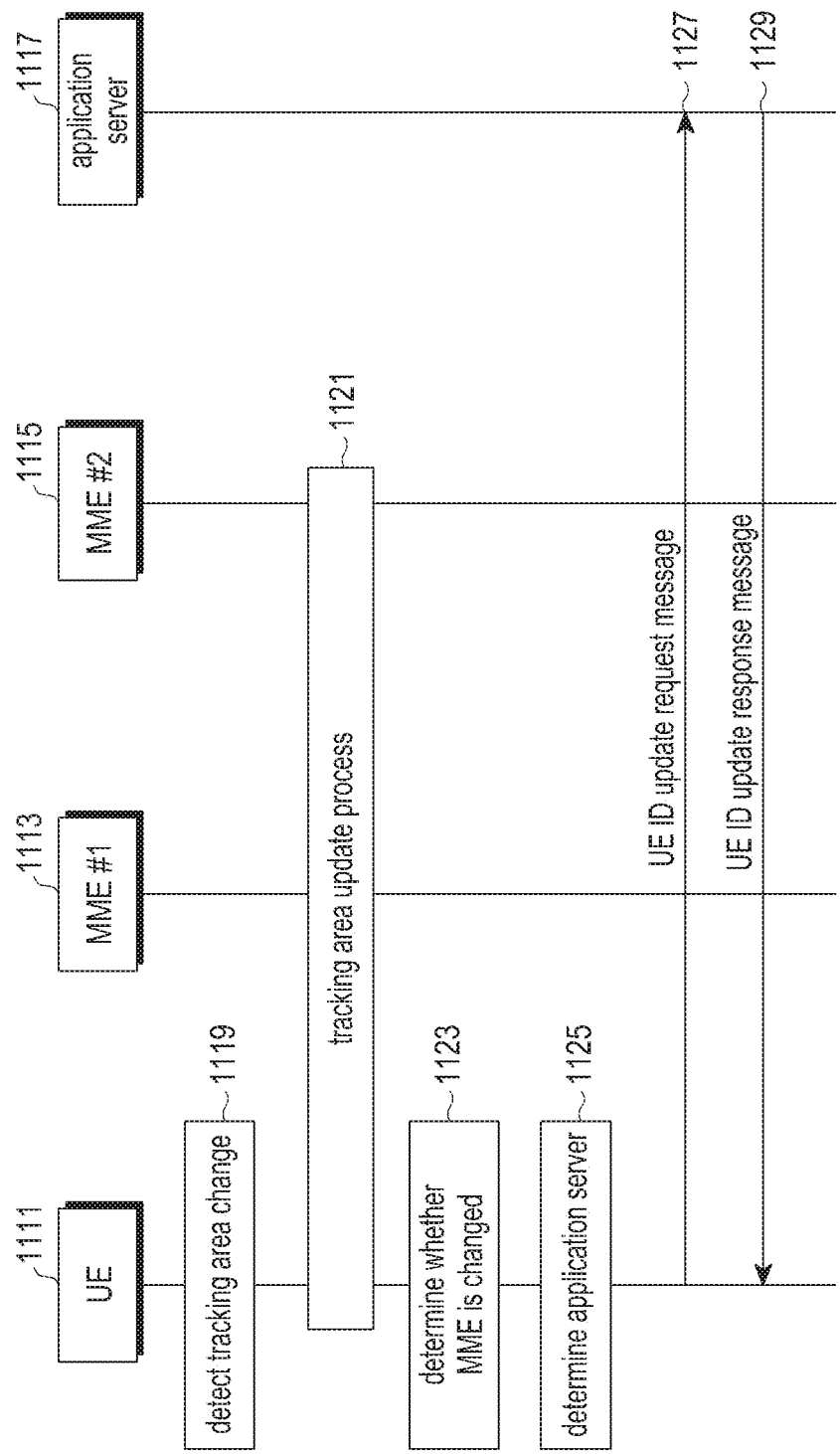
FIG. 11 schematically illustrates still another example of a process of updating a mapping table between a ProSe UE ID and application information in a case that association between an MME and a UE is changed in a communication system supporting a D2D scheme according to an embodiment of the present disclosure.

FIG. 11 schematically illustrates still another example of a process of updating a mapping table between a ProSe UE ID and application information in a case that association between an MME and a UE is changed in a communication system supporting a D2D scheme according to an embodiment of the present disclosure.

Referring to FIG. 11, the communication system includes a UE 1111, an MME #1 1113, an MME #2 1115, and an application server 1117.

The UE 1111 detects that a tracking area is changed at operation 1119. In FIG. 11, it will be assumed that the tracking area of the UE 1111 is changed from the MME #1 1113 to the MME #2 1115. After detecting that the tracking area is changed, the UE 1111 performs a tracking area update process with the MME #1 1113 and the MME #2 1115 at operation 1121. After the tracking area update process among the UE 1111, the MME #1 1113, and the MME #2 1115 is performed, the UE 1111 determines whether an MME associated with the UE 1111 is changed at operation 1123. If the MME associated with the UE 1111 is changed, the UE 1111 determines an application server(s) associated with application information of the UE 1111, i.e., the application server 1117 at operation 1125. The UE 1111 transmits a UE ID update request message to the application server 1117 at operation 1127. The UE ID update request message includes an old ProSe UE ID and a new ProSe UE ID. In FIG. 11, it will be assumed that a ProSe UE ID is generated based on a GUTI, MMEGI+S-TMSI, or MME ID+M-TMSI.

After receiving the UE ID update request message from the UE 1111, the application server 1117 updates a mapping table between the ProSe UE ID and the application information by updating the UE ID for the UE 1111, i.e., the ProSe UE ID, and transmits a UE ID update response message as a response message to the UE ID update request message to the UE 1111 at operation 1129.

If the ProSe UE ID is an ID which is not based on any of conventional temporary mobile IDs such as a GUTI or an S-TMSI, the ProSe UE ID may be transmitted along with the GUTI, the S-TMSI, or MMEID+M-TMSI.

As described above, it is noted that the process of updating the mapping table between the ProSe UE ID and the application information in FIG. 11 is a process in which a UE updates a mapping table between a ProSe UE ID and application information by updating a ProSe UE ID of the UE with an application server.

Although FIG. 11 illustrates still another example of a process of updating a mapping table between a ProSe UE ID and application information in a case that association between an MME and a UE is changed in a communication system supporting a D2D scheme according to an embodiment of the present disclosure, various changes could be made to FIG. 11. For example, although shown as a series of operations, various operations in FIG. 11 could overlap, occur in parallel, occur in a different order, or occur multiple times.

Still another example of a process of updating a mapping table between a ProSe UE ID and application information in a case that association between an MME and a UE is changed in a communication system supporting a D2D scheme according to an embodiment of the present disclosure has been described with reference to FIG. 11, and examples of a network authorized direct connection establishment process based on the first direct connection establishment scheme will be described with reference to FIGS. 12 to 18. In the network authorized direct connection establishment process based on the first direct connection establishment scheme, a direct connection request message is transmitted from a UE to an MME through an eNB.

Firstly, an example of a network authorized direct connection establishment process based on the first direct connection establishment scheme for an intra PLMN and an intra MME case in a communication system supporting a D2D scheme according to an embodiment of the present disclosure will be described with reference to FIG. 12.

Figure 12:
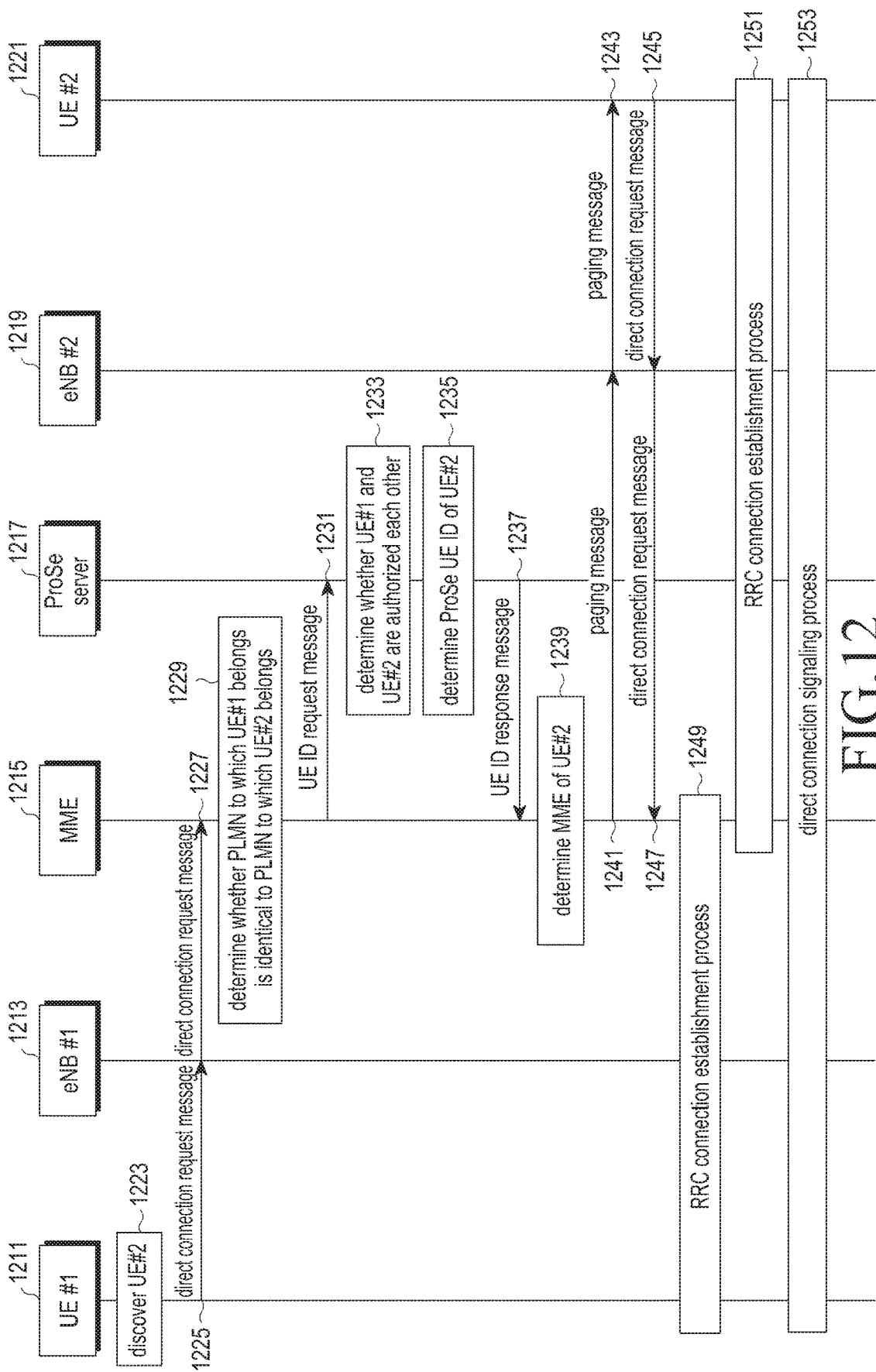
FIG. 12 schematically illustrates an example of a network authorized direct connection establishment process based on the first direct connection establishment scheme for an intra public land mobile network (PLMN) and an intra MME case in a communication system supporting a D2D scheme according to an embodiment of the present disclosure.

FIG. 12 schematically illustrates an example of a network authorized direct connection establishment process based on the first direct connection establishment scheme for an intra PLMN and an intra MME case in a communication system supporting a D2D scheme according to an embodiment of the present disclosure.

Referring to FIG. 12, the communication system includes a UE #1 1211, an eNB #1 1213, an MME 1215, a ProSe server 1217, an eNB #2 1219, and a UE #2 1221.

The UE #1 1211 discovers the UE #2 1221, and determines to establish a direct connection with the UE #2 1221 at operation 1223. The UE #1 1211 determines PLMN information of the UE #2 1221, and a detailed description will be followed.

Firstly, the PLMN information, e.g., a PLMN ID may be included in discovery information transmitted on a discovery channel. In this case, if the UE #1 1211 discovers the UE #2 1221 based on the discovery information, the UE #1 1211 may acquire the PLMN information.

Secondly, if the UE #2 1221 belongs to a PLMN which is different from a PLMN to which the UE #1 1211 belongs, the UE #2 1221 operates on an operating frequency different from an operating frequency of the UE #1 1211. In this case, in order to discover the UE #2 1221, the UE #1 1211 receives the discovery information from the UE #2 1221 on other frequency which is not a camped cell of the UE #1 1211. Here, a base station (BS) or an eNB of the UE #2 1221 transmits PLMN information for a PLMN to which the UE #2 1221 belongs. The UE #1 1211 may determine the PLMN information of the UE #2 1221 based on the PLMN information which is transmitted by the BS or the eNB of the UE #2 1221.

Thirdly, the UE #1 1211 may include a mapping table which stores mapping relation between a frequency and PLMN information. The UE #1 1211 may determine the PLMN information corresponding to a received frequency through which the discovery information is received using the mapping table. The UE #1 1211 knows the frequency through which the UE #1 1211 receives the discovery information which is transmitted by the UE #2 1221.

After determining to establish the direct connection with the UE #2 1221, the UE #1 1211 transmits a direct connection request message to the MME 1215 through an eNB (or a BS) of the UE #1 1211, i.e., the eNB #1 1213 at operations 1225 and 1227. The direct connection request message includes a connection type (e.g., mobile originated), information on the UE #2 1221 which is received on a discovery channel during a discovery process (e.g., a discovery code, an application user ID, or an alias of the application user ID), a ProSe UE ID of the UE #1 1211 and PLMN information of the UE #2 1221 (e.g., a PLMN ID and/or a frequency). The direct connection request message may include the PLMN ID of the UE #1 1211. The direct connection request message may include information of the UE #1 1211 (e.g., a discovery code, an application user ID, or an alias of the application user ID).

After receiving the direct connection request message from the eNB #1 1213, the MME 1215 determines whether a PLMN to which the UE #1 1211 belongs is identical to a PLMN to which the UE #2 1221 belongs at operation 1229. If the PLMN to which the UE #1 1211 belongs is identical to the PLMN to which the UE #2 1221 belongs, the MME 1215 transmits a UE ID request message to the ProSe server 1217 in order to determine the ProSe UE ID of the UE #2 1221 at operation 1231. The UE ID request message includes information on the UE #2 1221, i.e., UE #2 information and the ProSe UE ID of the UE #1 1211. If the PLMN to which the UE #1 1211 belongs is different from the PLMN to which the UE #2 1221 belongs, the MME 1215 may transmit a direct connection request message to the ProSe server 1217. In FIG. 12, it will be assumed that the PLMN to which the UE #1 1211 belongs is identical to the PLMN to which the UE #2 1221 belongs.

After receiving the UE ID request message from the MME 1215, the ProSe server 1217 determines whether the UE #1 1211 and the UE #2 1221 are authorized with each other in order to establish a direct connection between the UE #1 1211 and the UE #2 1221 at operation 1233. The ProSe server 1217 determines a ProSe UE ID of the UE #2 1221 based on the UE2 information included in the UE ID request message at operation 1235. A process of determining the ProSe UE ID of the UE #2 1221 in the ProSe server 1217 will be described below. The ProSe server 1217 includes a mapping table which stores mapping relation between UE information of a related UE and a ProSe UE ID of the UE, and determines the ProSe UE ID of the UE #2 1221 based on the mapping table. Alternatively, the mapping table may be managed by an application server (not shown in FIG. 12) not the ProSe server 1217. In this case, the ProSe server 1217 determines the ProSe UE ID of the UE #2 1221 through a communication with the application server. The application server with which the ProSe server 1217 communicates is determined based on the UE #2 information. After determining the ProSe UE ID of the UE #2 1221, the ProSe server 1217 transmits a UE ID response message as a response message to the UE ID request message to the MME 1215 at operation 1237. The UE ID response message includes the ProSe UE ID of the UE #2 1221.

After receiving the UE ID response message from the ProSe server 1217, the MME 1215 determines an MME for the UE #2 1221 based on the ProSe UE ID of the UE #2 1221 at operation 1239. Here, a ProSe UE ID includes specific bits indicating MME information. If the UE #2 1221 belongs to the MME 1215, the MME 1215 pages the UE #2 1221 by transmitting a paging message to the UE #2 1221 through the eNB #2 1219 at operations 1241 and 1243. The paging message includes a direct connection indicator and the ProSe UE ID of the UE #1 1211. The paging message may include information on the UE #1 1211, i.e., UE1 information (e.g., a discovery code, an application user ID, or an alias of the application user ID). In FIG. 12, the MME 1215 may determine radio resources for the UE #2 1221 by interacting with the eNB #1 1213 before paging the UE #2 1221. Here, radio resource information on the radio resources for the UE #2 1221 may be included in the paging message.

After receiving the paging message from the MME 1215, the UE #2 1221 transmits a direct connection request message to the MME 1215 through the eNB #2 1219 at operations 1245 and 1247. The direct connection request message includes a connection type (e.g., mobile terminated) and the ProSe UE ID of the UE #2 1221. The UE #1 information included in the paging message may be used to determine to accept the direct connection request or reject the direct connection request in the UE #2 1221.

After receiving the direct connection request message from the UE #2 1221, the MME 1215 establishes an RRC connection with the UE #1 1211 and the eNB #1 1213 at operation 1249. That is, an RRC connection establishment process is performed among the UE #1 1211, the eNB #1 1213, and the MME 1215. After receiving the direct connection request message from the UE #2 1221, the MME 1215 establishes an RRC connection with the UE #2 1221 and the eNB #2 1219 at operation 1251. That is, an RRC connection establishment process is performed among the MME 1215, the eNB #2 1219, and the UE #2 1221. While the RRC connection is established, radio resource information on a direct link is provided to the UE #1 1211 and the UE #2 1221. The MME 1215 establishes an RRC connection between the eNB #1 1213 and the eNB #2 1219 for resource coordination. The MME 1215 knows an eNB of the UE #1 1211, i.e., an eNB #1 1213 and an eNB of the UE #2 1221, i.e., an eNB #2 1219. As described above, since both the UE #1 1211 and the UE #2 1221 transmit the direct connection request message and know an eNB from which the direct connection request message is received, the MME 1215 may know eNBs which are associated with the UE #1 1211 and the UE #2 1221.

The UE #1 1211 and the UE #2 1221 may exchange signaling in a direct connection each other at operation 1253. That is, a direct connection signaling process is performed between the UE #1 1211 and the UE #2 1221.

Although FIG. 12 illustrates an example of a network authorized direct connection establishment process based on the first direct connection establishment scheme for an intra PLMN and an intra MME case in a communication system supporting a D2D scheme according to an embodiment of the present disclosure, various changes could be made to FIG. 12. For example, although shown as a series of operations, various operations in FIG. 12 could overlap, occur in parallel, occur in a different order, or occur multiple times.

An example of a network authorized direct connection establishment process based on the first direct connection establishment scheme for an intra PLMN and an intra MME case in a communication system supporting a D2D scheme according to an embodiment of the present disclosure has been described with reference to FIG. 12, and another example of a network authorized direct connection establishment process based on the first direct connection establishment scheme for an intra PLMN and an intra MME case in a communication system supporting a D2D scheme according to an embodiment of the present disclosure will be described with reference to FIG. 13.

Figure 13:
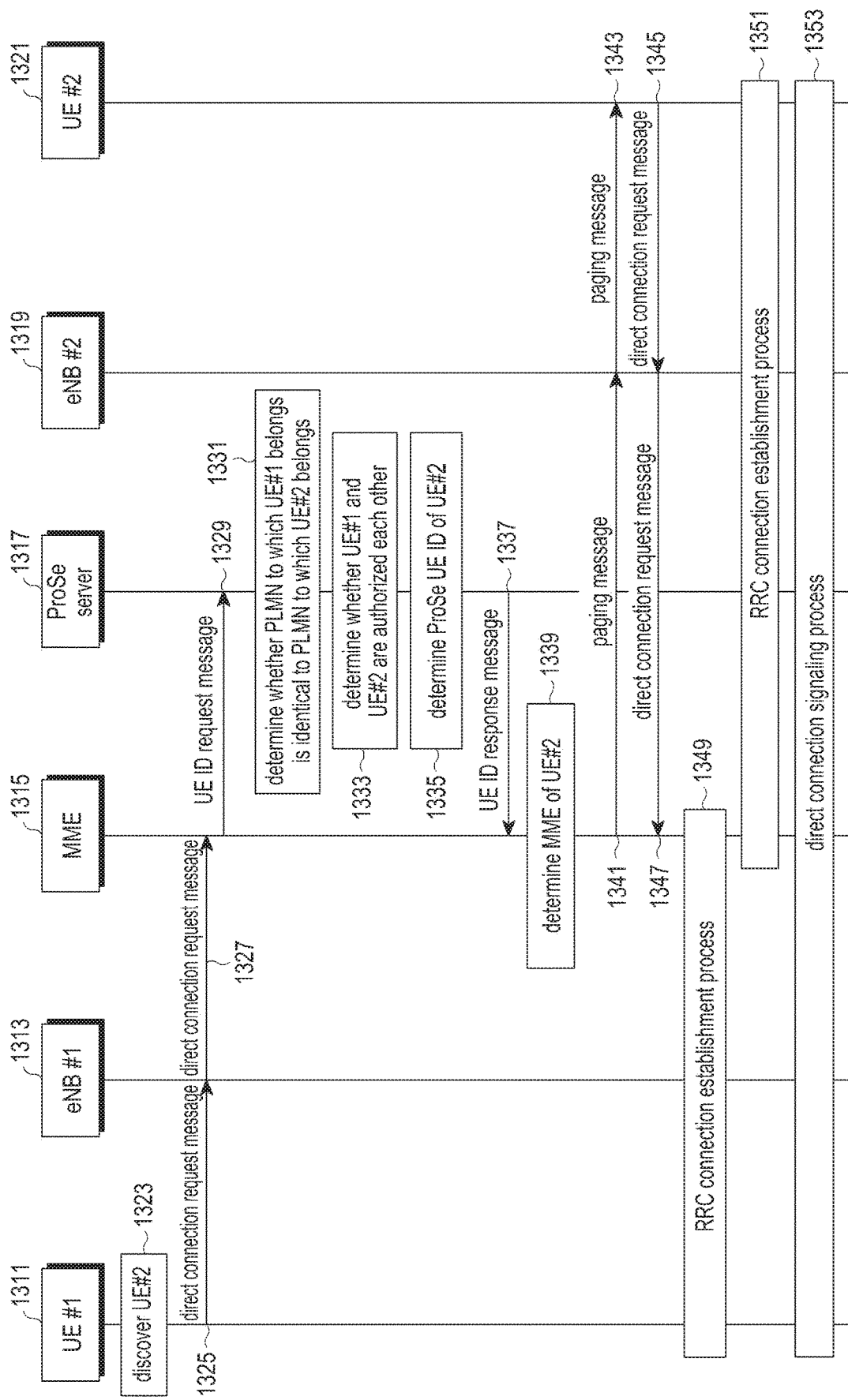
FIG. 13 schematically illustrates another example of a network authorized direct connection establishment process based on the first direct connection establishment scheme for an intra PLMN and an intra MME case in a communication system supporting a D2D scheme according to an embodiment of the present disclosure.

FIG. 13 schematically illustrates another example of a network authorized direct connection establishment process based on the first direct connection establishment scheme for an intra PLMN and an intra MME case in a communication system supporting a D2D scheme according to an embodiment of the present disclosure.

Referring to FIG. 13, the communication system includes a UE #1 1311, an eNB #1 1313, an MME 1315, a ProSe server 1317, an eNB #2 1319, and a UE #2 1321.

The UE #1 1311 discovers the UE #2 1321, and determines to establish a direct connection with the UE #2 1321 at operation 1323. The UE #1 1311 determines PLMN information of the UE #2 1321, and a detailed description will be followed.

Firstly, the PLMN information, e.g., a PLMN ID may be included in discovery information transmitted on a discovery channel. In this case, if the UE #1 1311 discovers the UE #2 1321 based on the discovery information, the UE #1 1311 may acquire the PLMN information.

Secondly, if the UE #2 1321 belongs to a PLMN which is different from a PLMN to which the UE #1 1311 belongs, the UE #2 1321 operates on an operating frequency different from an operating frequency of the UE #1 1311. In this case, in order to discover the UE #2 1321, the UE #1 1311 receives the discovery information from the UE #2 1321 on other frequency which is not a camped cell of the UE #1 1311. Here, a BS or an eNB of the UE #2 1321 transmits PLMN information on a PLMN to which the UE #2 1321 belongs. The UE #1 1311 may determine the PLMN information of the UE #2 1321 based on the PLMN information which is transmitted by the BS or the eNB of the UE #2 1321.

Thirdly, the UE #1 1311 may include a mapping table which stores mapping relation between a frequency and PLMN information. The UE #1 1311 may determine the PLMN information corresponding to a received frequency through which the discovery information is received using the mapping table. The UE #1 1311 knows a frequency through which the UE #1 1311 receives discovery information which is transmitted by the UE #2 1321.

After determining to establish the direct connection with the UE #2 1321, the UE #1 1311 transmits a direct connection request message to the MME 1315 through an eNB (or a BS) of the UE #1 1311, i.e., the eNB #1 1313 at operations 1325 and 1327. The direct connection request message includes a connection type (e.g., mobile originated), information on the UE #2 1321 which is received on a discovery channel during a discovery process (e.g., a discovery code, an application user ID, or an alias of the application user ID), a ProSe UE ID of the UE #1 1311 and PLMN information of the UE #2 1321 (e.g., a PLMN ID and/or a frequency). The direct connection request message may include the PLMN ID of the UE #1 1311. The direct connection request message may include information of the UE #1 1311 (e.g., a discovery code, an application user ID, or an alias of the application user ID).

After receiving the direct connection request message from the eNB #1 1313, the MME 1315 transmits a UE ID request message to the ProSe server 1317 at operation 1329. The UE ID request message includes information on the UE #2 1321, i.e., UE #2 information, the ProSe UE ID of the UE #1 1311, and PLMN information of the UE #2 1321, e.g., a PLMN ID.

After receiving the UE ID request message from the MME 1315, the ProSe server 1317 determines whether a PLMN to which the UE #1 1311 belongs is identical to a PLMN to which the UE #2 1321 belongs at operation 1331. If the PLMN to which the UE #1 1311 belongs is identical to the PLMN to which the UE #2 1321 belongs, the ProSe server 1317 determines whether the UE #1 1311 and the UE #2 1321 are authorized with each other in order to establish an RRC connection at operation 1333. In FIG. 13, it will be assumed that the PLMN to which the UE #1 1311 belongs is identical to the PLMN to which the UE #2 1321 belongs.

The ProSe server 1317 determines a ProSe UE ID of the UE #2 1321 based on the UE #2 information included in the UE ID request message at operation 1335. A process of determining the ProSe UE ID of the UE #2 1321 in the ProSe server 1317 will be described below. The ProSe server 1317 includes a mapping table which stores mapping relation between UE information of a related UE and a ProSe UE ID of the UE, and determines the ProSe UE ID of the UE #2 1321 based on the mapping table. Alternatively, the mapping table may be managed by an application server (not shown in FIG. 13) not the ProSe server 1317. In this case, the ProSe server 1317 determines the ProSe UE ID of the UE #2 1321 through a communication with the application server. The application server with which the ProSe server 1317 communicates is determined based on the UE #2 information. After determining the ProSe UE ID of the UE #2 1321, the ProSe server 1317 transmits a UE ID response message as a response message to the UE ID request message to the MME 1315 at operation 1337. The UE ID response message includes the ProSe UE ID of the UE #2 1321.

After receiving the UE ID response message from the ProSe server 1317, the MME 1315 determines an MME for the UE #2 1321 based on the ProSe UE ID of the UE #2 1321 at operation 1339. Here, a ProSe UE ID includes specific bits indicating MME information. If the UE #2 1321 belongs to the MME 1315, the MME 1315 pages the UE #2 1321 by transmitting a paging message to the UE #2 1321 through the eNB #2 1319 at operations 1341 and 1343. The paging message includes a direct connection indicator and the ProSe UE ID of the UE #1 1311. The paging message may include information on the UE #1 1311, i.e., UE #1 information (e.g., a discovery code, an application user ID, or an alias of the application user ID). In FIG. 13, the MME 1315 may determine radio resources for the UE #2 1321 by interacting with the eNB #1 1313 before paging the UE #2 1321. Here, radio resource information on the radio resources for the UE #2 1321 may be included in the paging message.

After receiving the paging message from the MME 1315, the UE #2 1321 transmits a direct connection request message to the MME 1315 through the eNB #2 1319 at operations 1345 and 1347. The direct connection request message includes a connection type (e.g., mobile terminated) and the ProSe UE ID of the UE #2 1321. The UE #1 information included in the paging message may be used to determine to accept the direct connection request or reject the direct connection request in the UE #2 1321.

After receiving the direct connection request message from the UE #2 1321, the MME 1315 establishes an RRC connection with the UE #1 1311 and the eNB #1 1313 at operation 1349. That is, an RRC connection establishment process is performed among the UE #1 1311, the eNB #1 1313, and the MME 1315. After receiving the direct connection request message from the UE #2 1321, the MME 1315 establishes an RRC connection with the UE #2 1321 and the eNB #2 1319 at operation 1351. That is, an RRC connection establishment process is performed among the MME 1315, the eNB #2 1319, and the UE #2 1321. While the RRC connection is established, radio resource information on a direct link is provided to the UE #1 1311 and the UE #2 1321. The MME 1315 establishes an RRC connection between the eNB #1 1313 and the eNB #2 1319 for resource coordination. The MME 1315 knows an eNB of the UE #1 1311, i.e., an eNB #1 1313 and an eNB of the UE #2 1321, i.e., an eNB #2 1319. As described above, since both the UE #1 1311 and the UE #2 1321 transmit the direct connection request message and know an eNB from which the direct connection request message is received, the MME 1315 may know eNBs which are associated with the UE #1 1311 and the UE #2 1321.

The UE #1 1311 and the UE #2 1321 may exchange signaling in a direct connection each other at operation 1353. That is, a direct connection signaling process is performed between the UE #1 1311 and the UE #2 1321.

Although FIG. 13 illustrates another example of a network authorized direct connection establishment process based on the first direct connection establishment scheme for an intra PLMN and an intra MME case in a communication system supporting a D2D scheme according to an embodiment of the present disclosure, various changes could be made to FIG. 13. For example, although shown as a series of operations, various operations in FIG. 13 could overlap, occur in parallel, occur in a different order, or occur multiple times.

Another example of a network authorized direct connection establishment process based on the first direct connection establishment scheme for an intra PLMN and an intra MME case in a communication system supporting a D2D scheme according to an embodiment of the present disclosure has been described with reference to FIG. 13, and an example of a network authorized direct connection establishment process based on the first direct connection establishment scheme for an intra PLMN and an inter MME case in a communication system supporting a D2D scheme according to an embodiment of the present disclosure will be described with reference to FIG. 14.

Figure 14:
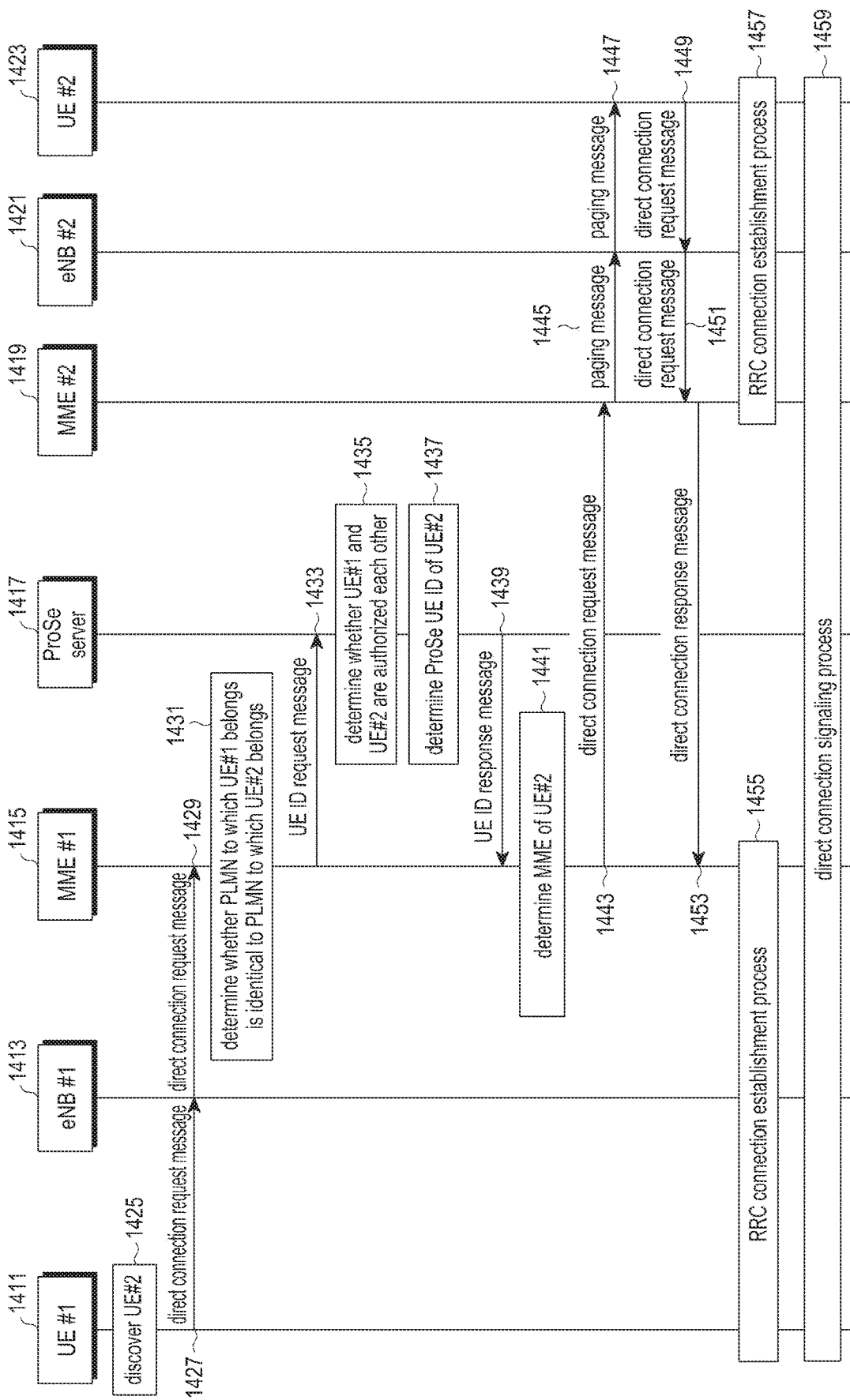
FIG. 14 schematically illustrates an example of a network authorized direct connection establishment process based on the first direct connection establishment scheme for an intra PLMN and an inter MME case in a communication system supporting a D2D scheme according to an embodiment of the present disclosure.

FIG. 14 schematically illustrates an example of a network authorized direct connection establishment process based on the first direct connection establishment scheme for an intra PLMN and an inter MME case in a communication system supporting a D2D scheme according to an embodiment of the present disclosure.

Referring to FIG. 14, the communication system includes a UE #1 1411, an eNB #1 1413, an MME #1 1415, a ProSe server 1417, an MME #2 1419, an eNB #2 1421, and a UE #2 1423.

The UE #1 1411 discovers the UE #2 1423, and determines to establish a direct connection with the UE #2 1423 at operation 1425. The UE #1 1411 determines PLMN information of the UE #2 1423. Here, an operation of determining the PLMN information of the UE #2 1423 in the UE #1 1411 will be described below.

Firstly, the PLMN information, e.g., a PLMN ID may be included in discovery information transmitted on a discovery channel. In this case, if the UE #1 1411 discovers the UE #2 1423 based on the discovery information, the UE #1 1411 may acquire the PLMN information.

Secondly, if the UE #2 1423 belongs to a PLMN which is different from a PLMN to which the UE #1 1411 belongs, the UE #2 1423 operates on an operating frequency different from an operating frequency of the UE #1 1411. In this case, in order to discover the UE #2 1423, the UE #1 1411 receives the discovery information from the UE #2 1423 on other frequency which is not a camped cell of the UE #1 1411. Here, a BS or an eNB of the UE #2 1423 transmits PLMN information on a PLMN to which the UE #2 1423 belongs. The UE #1 1411 may determine the PLMN information of the UE #2 1423 based on the PLMN information which is transmitted by the BS or the eNB of the UE #2 1423.

Thirdly, the UE #1 1411 may include a mapping table which stores mapping relation between a frequency and PLMN information. The UE #1 1411 may determine the PLMN information corresponding to a received frequency through which the discovery information is received using the mapping table. The UE #1 1411 knows a frequency through which the UE #1 1411 receives discovery information which is transmitted by the UE #2 1423.

After determining to establish the direct connection with the UE #2 1423, the UE #1 1411 transmits a direct connection request message to the MME #1 1415 through an eNB of the UE #1 1411, i.e., the eNB #1 1413 at operations 1427 and 1429. The direct connection request message includes a connection type (e.g., mobile originated), information on the UE #2 1423 which is received on a discovery channel during a discovery process (e.g., a discovery code, an application user ID, or an alias of the application user ID), a ProSe UE ID of the UE #1 1411 and PLMN information of the UE #2 1423 (e.g., a PLMN ID and/or a frequency). The direct connection request message may include the PLMN ID of the UE #1 1411. The direct connection request message may include information of the UE #1 1411 (e.g., a discovery code, an application user ID, or an alias of the application user ID).

After receiving the direct connection request message from the eNB #1 1413, the MME #1 1415 determines whether a PLMN to which the UE #1 1411 belongs is identical to a PLMN to which the UE #2 1423 belongs at operation 1431. If the PLMN to which the UE #1 1411 belongs is identical to the PLMN to which the UE #2 1423 belongs, the MME #1 1415 transmits a UE ID request message to the ProSe server 1417 in order to determine the ProSe UE ID of the UE #2 1423 at operation 1433. The UE ID request message includes information on the UE #2 1423, i.e., UE #2 information and the ProSe UE ID of the UE #1 1411. If the PLMN to which the UE #1 1411 belongs is different from the PLMN to which the UE #2 1423 belongs, the MME #1 1415 may transmit a direct connection request message to the ProSe server 1417. In FIG. 14, it will be assumed that the PLMN to which the UE #1 1411 belongs is identical to the PLMN to which the UE #2 1423 belongs.

After receiving the UE ID request message from the MME #1 1415, the ProSe server 1417 determines whether the UE #1 1411 and the UE #2 1423 are authorized with each other in order to establish a direct connection between the UE #1 1411 and the UE #2 1423 at operation 1435. The ProSe server 1417 determines a ProSe UE ID of the UE #2 1423 based on the UE #2 information at operation 1437. A process of determining the ProSe UE ID of the UE #2 1423 in the ProSe server 1417 will be described below. The ProSe server 1417 includes a mapping table which stores mapping relation between UE information of a related UE and a ProSe UE ID of the UE, and determines the ProSe UE ID of the UE #2 1423 based on the mapping table. Alternatively, the mapping table may be managed by an application server (not shown in FIG. 14) not the ProSe server 1417. In this case, the ProSe server 1417 determines the ProSe UE ID of the UE #2 1423 through a communication with the application server. The application server with which the ProSe server 1417 communicates is determined based on the UE #2 information. After determining the ProSe UE ID of the UE #2 1423, the ProSe server 1417 transmits a UE ID response message as a response message to the UE ID request message to the MME #1 1415 at operation 1439. The UE ID response message includes the ProSe UE ID of the UE #2 1423.

After receiving the UE ID response message from the ProSe server 1417, the MME #1 1415 determines an MME for the UE #2 1423 based on the ProSe UE ID of the UE #2 1221 at operation 1441. Here, a ProSe UE ID includes specific bits indicating MME information. If the UE #2 1423 belongs to other MME, i.e., the MME #2 1419, the MME #1 1415 transmits a direct connection request message to the MME #2 1419 of the UE #2 1423 at operation 1443. The direct connection request message includes the ProSe UE ID of the UE #2 1423. The direct connection request message may include the ProSe UE ID of the UE #1 1411. The direct connection request message may include UE information for the UE #1 1411. The direct connection request message may include radio resource information. Here, the MME #1 1415 determines radio resources by interacting with the eNB #1 1413, and information on the determined radio resources is the radio resource information included in the direct connection request message.

After receiving the direct connection request message from the MME #1 1415, the MME #2 1419 transmits a paging message to the UE #2 1423 through the eNB #2 1421 at operations 1445 and 1447. The paging message includes a direct connection indicator and the ProSe UE ID of the UE #1 1411. The paging message may include information on the UE #1 1411, i.e., UE #1 information. The UE #1 information included in the paging message may be used for determining whether the UE #2 1423 accepts the direct connection request or rejects the direct connection request. The paging message may include the radio resource information.

After receiving the paging message through the eNB #2 1421, the UE #2 1423 transmits a direct connection request message to the MME #2 1419 through the eNB #2 1421 at operations 1449 and 1451. The direct connection request message includes a connection type (i.e., mobile terminated) and the ProSe UE ID of the UE #2 1423.

After receiving the direct connection request message from the eNB #2 1421, the MME #2 1419 transmits a direct connection response message as a response message to the direct connection request message to the MME #1 1415 at operation 1453. The direct connection response message may include information on an eNB of the UE #2 1423, i.e., the eNB #2 1421. The direct connection response message may include radio resource information.

After receiving the direct connection response message from the MME #2 1419, the MME #1 1415 establishes an RRC connection with the UE #1 1411 and the eNB #1 1413 at operations 1455. That is, an RRC connection establishment process is performed among the UE #1 1411, the eNB #1 1413, and MME #1 1415. After receiving the direct connection request message from the eNB #2 1421, the MME #2 1419 establishes an RRC connection with the UE #2 1423 and the eNB #2 1421 at operations 1457. That is, an RRC connection establishment process is performed among the MME #2 1419, the eNB #2 1421, and the UE #2 1423. While the RRC connection is established, radio resource information on a direct link is provided to the UE #1 1411 and the UE #2 1423. The MMEs, i.e., the MME #1 1415 and the MME #2 1419 establish an RRC connection between the eNB #1 1413 and the eNB #2 1421 for resource coordination. The MME #1 1415 and the MME #2 1419 know an eNB of the UE #1 1411, i.e., an eNB #1 1413 and an eNB of the UE #2 1423, i.e., an eNB #2 1421. As described above, since both the UE #1 1411 and the UE #2 1423 transmit the direct connection request message and know an eNB from which the direct connection request message is received, the MME #1 1415 and the MME #2 1419 may know eNBs which are associated with the UE #1 1411 and the UE #2 1423.

The UE #1 1411 and the UE #2 1423 may exchange signaling in a direct connection each other at operation 1459. That is, a direct connection signaling process is performed between the UE #1 1411 and the UE #2 1423.

Although FIG. 14 illustrates an example of a network authorized direct connection establishment process based on the first direct connection establishment scheme for an intra PLMN and an inter MME case in a communication system supporting a D2D scheme according to an embodiment of the present disclosure, various changes could be made to FIG. 14. For example, although shown as a series of operations, various operations in FIG. 14 could overlap, occur in parallel, occur in a different order, or occur multiple times.

An example of a network authorized direct connection establishment process based on the first direct connection establishment scheme for an intra PLMN and an inter MME case in a communication system supporting a D2D scheme according to an embodiment of the present disclosure has been described with reference to FIG. 14, and another example of a network authorized direct connection establishment process based on the first direct connection establishment scheme for an intra PLMN and an inter MME case in a communication system supporting a D2D scheme according to an embodiment of the present disclosure will be described with reference to FIG. 15.

Figure 15:
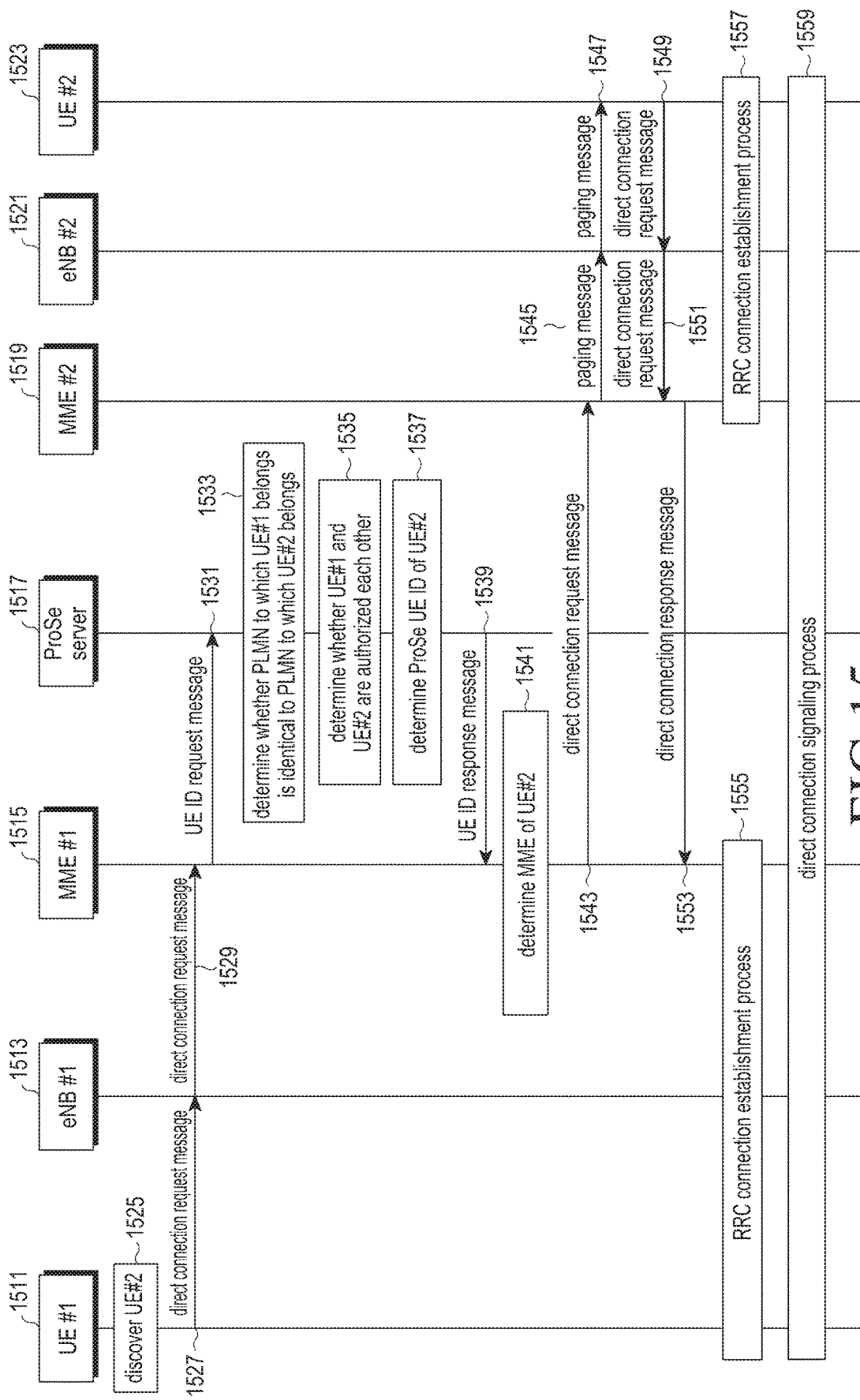
FIG. 15 schematically illustrates another example of a network authorized direct connection establishment process based on the first direct connection establishment scheme for an intra PLMN and an inter MME case in a communication system supporting a D2D scheme according to an embodiment of the present disclosure.

FIG. 15 schematically illustrates another example of a network authorized direct connection establishment process based on the first direct connection establishment scheme for an intra PLMN and an inter MME case in a communication system supporting a D2D scheme according to an embodiment of the present disclosure.

Referring to FIG. 15, the communication system includes a UE #1 1511, an eNB #1 1513, an MME #1 1515, a ProSe server 1517, an MME #2 1519, an eNB #2 1521, and a UE #2 1523.

The UE #1 1511 discovers the UE #2 1523, and determines to establish a direct connection with the UE #2 1523 at operation 1525. The UE #1 1511 determines PLMN information of the UE #2 1523. The operation of determining the PLMN information of the UE #2 1523 in the UE #1 1511 will be described below.

Firstly, the PLMN information, e.g., a PLMN ID may be included in discovery information transmitted on a discovery channel. If the UE #1 1511 discovers the UE #2 1523 based on the discovery information, the UE #1 1511 may acquire the PLMN information.

Secondly, if the UE #2 1523 belongs to a PLMN which is different from a PLMN to which the UE #1 1511 belongs, the UE #2 1523 operates on an operating frequency different from an operating frequency of the UE #1 1511. In this case, in order to discover the UE #2 1523, the UE #1 1511 receives the discovery information from the UE #2 1523 on other frequency which is not a camped cell of the UE #1 1511. Here, a BS or an eNB of the UE #2 1523 transmits PLMN information on a PLMN to which the UE #2 1523 belongs. The UE #1 1511 may determine the PLMN information of the UE #2 1523 based on the PLMN information which is transmitted by the BS or the eNB of the UE #2 1523.

Thirdly, the UE #1 1511 may include a mapping table which stores mapping relation between a frequency and PLMN information. The UE #1 1511 may determine the PLMN information corresponding to a received frequency through which the discovery information is received using the mapping table. The UE #1 1511 knows a frequency through which the UE #1 1511 receives discovery information which is transmitted by the UE #2 1523.

After determining to establish the direct connection with the UE #2 1523, the UE #1 1511 transmits a direct connection request message to the MME #1 1515 through an eNB of the UE #1 1511, i.e., the eNB #1 1513 at operations 1527 and 1529. The direct connection request message includes a connection type (e.g., mobile originated), information on the UE #2 1523 which is received on a discovery channel during a discovery process (e.g., a discovery code, an application user ID, or an alias of the application user ID), a ProSe UE ID of the UE #1 1511, and PLMN information of the UE #2 1523 (e.g., a PLMN ID and/or a frequency). The direct connection request message may include the PLMN ID of the UE #1 1511. The direct connection request message may include information of the UE #1 1511 (e.g., a discovery code, an application user ID, or an alias of the application user ID).

After receiving the direct connection request message from the eNB #1 1513, the MME #1 1515 transmits a UE ID request message to the ProSe server 1517 at operation 1531. The UE ID request message includes information on the UE #2 1523, i.e., UE #2 information and the ProSe UE ID of the UE #1 1511.

After receiving the UE ID request message from the MME #1 1515, the ProSe server 1517 determines whether a PLMN to which the UE #1 1511 belongs is identical to a PLMN to which the UE #2 1523 belongs at operation 1533. If the PLMN to which the UE #1 1511 belongs is identical to the PLMN to which the UE #2 1523 belongs, the ProSe server 1517 determines whether the UE #1 1511 and the UE #2 1523 are authorized with each other in order to establish an RRC connection at operation 1535. In FIG. 15, it will be assumed that the PLMN to which the UE #1 1511 belongs is identical to the PLMN to which the UE #2 1523 belongs.

The ProSe server 1517 determines a ProSe UE ID of the UE #2 1523 based on the UE #2 information included in the UE ID request message at operation 1537. A process of determining the ProSe UE ID of the UE #2 1523 in the ProSe server 1517 will be described below. The ProSe server 1517 includes a mapping table which stores mapping relation between UE information of a related UE and a ProSe UE ID of the UE, and determines the ProSe UE ID of the UE #2 1523 based on the mapping table. Alternatively, the mapping table may be managed by an application server (not shown in FIG. 15) not the ProSe server 1517. In this case, the ProSe server 1517 determines the ProSe UE ID of the UE #2 1521 through a communication with the application server. The application server with which the ProSe server 1517 communicates is determined based on the UE #2 information. After determining the ProSe UE ID of the UE #2 1523, the ProSe server 1517 transmits a UE ID response message as a response message to the UE ID request message to the MME #1 1515 at operation 1539. The UE ID response message includes the ProSe UE ID of the UE #2 1523.

After receiving the UE ID response message from the ProSe server 1517, the MME #1 1515 determines an MME for the UE #2 1523 based on the ProSe UE ID of the UE #2 1523 included in the UE ID response message at operation 1541. Here, a ProSe UE ID includes specific bits indicating MME information. If the UE #2 1523 belongs to other MME, i.e., the MME #2 1519, the MME #1 1515 transmits a direct connection request message to the MME #2 1519 of the UE #2 1523 at operation 1543. The direct connection request message includes the ProSe UE ID of the UE #2 1523. The direct connection request message may include the ProSe UE ID of the UE #1 1511. The direct connection request message may include UE information for the UE #1 1511. The direct connection request message may include radio resource information. Here, the MME #1 1515 determines radio resources by interacting with the eNB #1 1513, and information on the determined radio resources is the radio resource information included in the direct connection request message.

After receiving the direct connection request message from the MME #1 1515, the MME #2 1519 transmits a paging message to the UE #2 1523 through the eNB #2 1521 at operations 1545 and 1547. The paging message includes a direct connection indicator and the ProSe UE ID of the UE #1 1511. The paging message may include information on the UE #1 1511, i.e., UE #1 information. The UE #1 information included in the paging message may be used for determining whether the UE #2 1523 accepts the direct connection request or rejects the direct connection request. The paging message may include the radio resource information.

After receiving the paging message through the eNB #2 1521, the UE #2 1523 transmits a direct connection request message to the MME #2 1519 through the eNB #2 1521 at operations 1549 and 1551. The direct connection request message includes a connection type (i.e., mobile terminated) and the ProSe UE ID of the UE #2 1523.

After receiving the direct connection request message from the eNB #2 1521, the MME #2 1519 transmits a direct connection response message as a response message to the direct connection request message to the MME #1 1515 at operation 1553. The direct connection response message may include information on an eNB of the UE #2 1523, i.e., the eNB #2 1521. The direct connection response message may include radio resource information.

After receiving the direct connection response message from the MME #2 1519, the MME #1 1515 establishes an RRC connection with the UE #1 1511 and the eNB #1 1513 at operation 1555. That is, an RRC connection establishment process is performed among the UE #1 1511, the eNB #1 1513, and MME #1 1515. After receiving the direct connection request message from the eNB #2 1521, the MME #2 1519 establishes an RRC connection with the UE #2 1523 and the eNB #2 1521 at operation 1557. That is, an RRC connection establishment process is performed among the MME #2 1519, the eNB #2 1521, and the UE #2 1523. While the RRC connection is established, radio resource information on a direct link is provided to the UE #1 1511 and the UE #2 1523. The MMEs, i.e., the MME #1 1515 and the MME #2 1519 establish an RRC connection between the eNB #1 1513 and the eNB #2 1521 for resource coordination. The MME #1 1515 and the MME #2 1519 know an eNB of the UE #1 1511, i.e., an eNB #1 1513 and an eNB of the UE #2 1523, i.e., an eNB #2 1521. As described above, since both the UE #1 1511 and the UE #2 1523 transmit the direct connection request message and know an eNB from which the direct connection request message is received, the MME #1 1515 and the MME #2 1519 may know eNBs which are associated with the UE #1 1511 and the UE #2 1523.

The UE #1 1511 and the UE #2 1523 may exchange signaling in a direct connection each other at operation 1559. That is, a direct connection signaling process is performed between the UE #1 1511 and the UE #2 1523.

Although FIG. 15 illustrates another example of a network authorized direct connection establishment process based on the first direct connection establishment scheme for an intra PLMN and an inter MME case in a communication system supporting a D2D scheme according to an embodiment of the present disclosure, various changes could be made to FIG. 15. For example, although shown as a series of operations, various operations in FIG. 15 could overlap, occur in parallel, occur in a different order, or occur multiple times.

Another example of a network authorized direct connection establishment process based on the first direct connection establishment scheme for an intra PLMN and an inter MME case in a communication system supporting a D2D scheme according to an embodiment of the present disclosure has been described with reference to FIG. 15, and still another example of a network authorized direct connection establishment process based on the first direct connection establishment scheme for an intra PLMN and an inter MME case in a communication system supporting a D2D scheme according to an embodiment of the present disclosure will be described with reference to FIG. 16.

Figure 16:
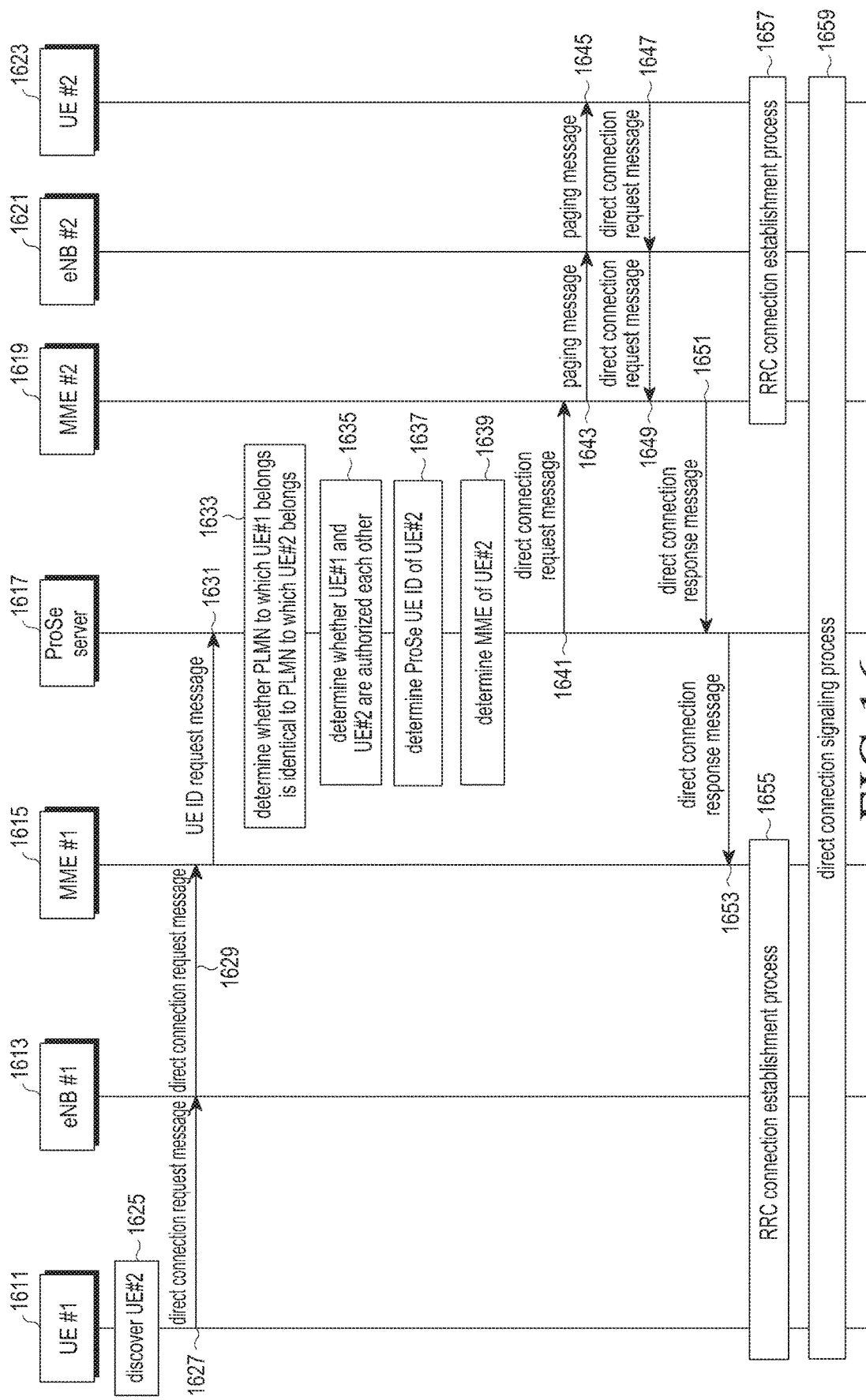
FIG. 16 schematically illustrates still another example of a network authorized direct connection establishment process based on the first direct connection establishment scheme for an intra PLMN and an inter MME case in a communication system supporting a D2D scheme according to an embodiment of the present disclosure.

FIG. 16 schematically illustrates still another example of a network authorized direct connection establishment process based on the first direct connection establishment scheme for an intra PLMN and an inter MME case in a communication system supporting a D2D scheme according to an embodiment of the present disclosure.

Referring to FIG. 16, the communication system includes a UE #1 1611, an eNB #1 1613, an MME #1 1615, a ProSe server 1617, an MME #2 1619, an eNB #2 1621, and a UE #2 1623.

The UE #1 1611 discovers the UE #2 1623, and determines to establish a direct connection with the UE #2 1623 at operation 1625. The UE #1 1611 determines PLMN information of the UE #2 1623. The operation of determining the PLMN information of the UE #2 1623 in the UE #1 1611 will be described below.

Firstly, the PLMN information, e.g., a PLMN ID may be included in discovery information transmitted on a discovery channel. If the UE #1 1611 discovers the UE #2 1623 based on the discovery information, the UE #1 1611 may acquire the PLMN information.

Secondly, if the UE #2 1623 belongs to a PLMN which is different from a PLMN to which the UE #1 1611 belongs, the UE #2 1623 operates on an operating frequency different from an operating frequency of the UE #1 1611. In this case, in order to discover the UE #2 1623, the UE #1 1611 receives the discovery information from the UE #2 1623 on other frequency which is not a camped cell of the UE #1 1611. Here, a BS or an eNB of the UE #2 1623 transmits PLMN information on a PLMN to which the UE #2 1623 belongs. The UE #1 1611 may determine the PLMN information of the UE #2 1623 based on the PLMN information which is transmitted by the BS or the eNB of the UE #2 1623.

Thirdly, the UE #1 1611 may include a mapping table which stores mapping relation between a frequency and PLMN information. The UE #1 1611 may determine the PLMN information corresponding to a received frequency through which the discovery information is received using the mapping table. The UE #1 1611 knows a frequency through which the UE #1 1611 receives discovery information which is transmitted by the UE #2 1623.

After determining to establish the direct connection with the UE #2 1623, the UE #1 1611 transmits a direct connection request message to the MME #1 1615 through an eNB (or a BS) of the UE #1 1611, i.e., the eNB #1 1613 at operations 1627 and 1629. The direct connection request message includes a connection type (e.g., mobile originated), information on the UE #2 1623 which is received on a discovery channel during a discovery process (e.g., a discovery code, an application user ID, or an alias of the application user ID), a ProSe UE ID of the UE #1 1611, and PLMN information of the UE #2 1623 (e.g., a PLMN ID and/or a frequency). The direct connection request message may include the PLMN ID of the UE #1 1611. The direct connection request message may include information of the UE #1 1611 (e.g., a discovery code, an application user ID, or an alias of the application user ID).

After receiving the direct connection request message from the eNB #1 1613, the MME #1 1615 transmits a direct connection request message to the ProSe server 1617 at operation 1631. The direct connection request message includes UE #2 information, the ProSe UE ID of the UE #1 1611, and PLMN information of the UE #2 1623.

After receiving the direct connection request message from the MME #1 1615, the ProSe server 1617 determines whether a PLMN to which the UE #1 1611 belongs is identical to a PLMN to which the UE #2 1623 belongs at operation 1633. If the PLMN to which the UE #1 1611 belongs is identical to the PLMN to which the UE #2 1623 belongs, the ProSe server 1617 determines whether the UE #1 1611 and the UE #2 1623 are authorized with each other in order to establish an RRC connection at operation 1635. The ProSe server 1617 determines a ProSe UE ID of the UE #2 1623 based on the UE #2 information at operation 1637. A process of determining the ProSe UE ID of the UE #2 1623 in the ProSe server 1617 will be described below. The ProSe server 1617 includes a mapping table which stores mapping relation between UE information of a related UE and a ProSe UE ID of the UE, and determines the ProSe UE ID of the UE #2 1623 based on the mapping table. Alternatively, the mapping table may be managed by an application server (not shown in FIG. 16) not the ProSe server 1617. In this case, the ProSe server 1617 determines the ProSe UE ID of the UE #2 1621 through a communication with the application server. The application server with which the ProSe server 1617 communicates is determined based on the UE #2 information.

The ProSe server 1617 determines an MME of the UE #2 1623, i.e., the MME #2 1619 based on the ProSe UE ID at operation 1639. If the UE #2 1623 belongs to other MME, i.e., the MME #2 1619, the ProSe server 1617 transmits a direct connection request message to the MME #2 1619 at operation 1641. The direct connection request message includes the ProSe UE ID of the UE #2 1623. The direct connection request message may include the ProSe UE ID of the UE #1 1611. The direct connection request message may include UE #1 information for the UE #1 1611. The direct connection request message may include radio resource information. The ProSe server 1617 determines radio resources by interacting with the eNB #1 1613 and the MME #1 1615. The radio resources may be previously determined, and information on the previously determined radio resources may be informed to the ProSe server 1617.

The MME #2 1619 transmits a paging message to the UE #2 1623 through the eNB #2 1621 at operations 1643 and 1645. The paging message includes a direct connection indicator and the ProSe UE ID of the UE #1 1611. The paging message may include information on the UE #1 1611, i.e., UE #1 information. The UE #1 information included in the paging message may be used for determining whether the UE #2 1623 accepts the direct connection request or rejects the direct connection request.

After receiving the paging message through the eNB #2 1621, the UE #2 1623 transmits a direct connection request message to the MME #2 1619 through the eNB #2 1621 at operations 1647 and 1649. The direct connection request message includes a connection type (i.e., mobile terminated) and the ProSe UE ID of the UE #2 1623.

After receiving the direct connection request message through the eNB #2 1621, the MME #2 1619 transmits a direct connection response message as a response message to the direct connection request message to the ProSe server 1617 at operation 1651. The direct connection response message may include information on an eNB of the UE #2 1623, i.e., the eNB #2 1621. The direct connection response message may include radio resource information. The ProSe server 1617 transmits the direct connection response message to the MME #1 1615 at operation 1653. Here, the direct connection response message includes information on radio resources and the information on the eNB #2 1621. After receiving the direct connection response message from the MME #2 1619, the MME #1 1615 establishes an RRC connection with the UE #1 1611 and the eNB #1 1613 at operation 1655. That is, an RRC connection establishment process is performed among the UE #1 1611, the eNB #1 1613, and MME #1 1615. After receiving the direct connection request message from the eNB #2 1621, the MME #2 1619 establishes an RRC connection with the UE #2 1623 and the eNB #2 1621 at operation 1657. That is, an RRC connection establishment process is performed among the MME #2 1619, the eNB #2 1621, and the UE #2 1623. While the RRC connection is established, radio resource information on a direct link is provided to the UE #1 1611 and the UE #2 1623. The MMEs, i.e., the MME #1 1615 and the MME #2 1619 establish an RRC connection between the eNB #1 1613 and the eNB #2 1621 for resource coordination. The MME #1 1615 and the MME #2 1619 know an eNB of the UE #1 1611, i.e., an eNB #1 1613 and an eNB of the UE #2 1623, i.e., an eNB #2 1621. As described above, since both the UE #1 1611 and the UE #2 1623 transmit the direct connection request message and know an eNB from which the direct connection request message is received, the MME #1 1615 and the MME #2 1619 may know eNBs which are associated with the UE #1 1611 and the UE #2 1623.

The UE #1 1611 and the UE #2 1623 may exchange signaling in a direct connection each other at operation 1659. That is, a direct connection signaling process is performed between the UE #1 1611 and the UE #2 1623.

Although FIG. 16 illustrates still another example of a network authorized direct connection establishment process based on the first direct connection establishment scheme for an intra PLMN and an inter MME case in a communication system supporting a D2D scheme according to an embodiment of the present disclosure, various changes could be made to FIG. 16. For example, although shown as a series of operations, various operations in FIG. 16 could overlap, occur in parallel, occur in a different order, or occur multiple times.

Still another example of a network authorized direct connection establishment process based on the first direct connection establishment scheme for an intra PLMN and an inter MME case in a communication system supporting a D2D scheme according to an embodiment of the present disclosure has been described with reference to FIG. 16, and examples of a network authorized direct connection establishment process based on the first direct connection establishment scheme for an inter MME case in a communication system supporting a D2D scheme according to an embodiment of the present disclosure will be described with reference to FIG. 17 and FIG. 18.

Firstly, for an inter MME case, a network authorized direct connection establishment process based on the first direct connection establishment scheme will be described below.

In a direct connection establishment between D2D UEs which belong to the same PLMN and different MMEs, an operation of determining whether related D2D UEs belong to the same PLMN or the different PLMNs may be performed by an MME or a ProSe server. The operation of determining whether the related D2D UEs belong to the same PLMN or the different PLMNs in the MME will be described with reference to FIG. 17, and the operation of determining whether the related D2D UEs belong to the same PLMN or the different PLMNs in the ProSe server will be described with reference to FIG. 18. A paging process in each of FIGS. 17 and 18, a ProSe UE ID of a UE #1 may be included in a direct connection request message which is transmitted from a UE #2 to an eNB2. For example, the UE #1 uses an uplink (UL) frequency F1, and the UE #2 uses a UL frequency F2. It is informed to the UE #2 that the UE #1 exists in other PLMN. A UL frequency of the UE #1 is informed to the UE #2. The UE #2 should transmit a signal through the UL frequency F2, and receive a signal through the UL frequency F1 of the UE #1. The UE #1 should transmit a signal through the UL frequency F1, and receive a signal through the UL frequency F2 of the UE #2. This indication operation may be performed during a paging process or an RRC connection establishment process.

An example of a network authorized direct connection establishment process based on the first direct connection establishment scheme for an inter MME case in a communication system supporting a D2D scheme according to an embodiment of the present disclosure will be described with reference to FIG. 17.

Figure 17:
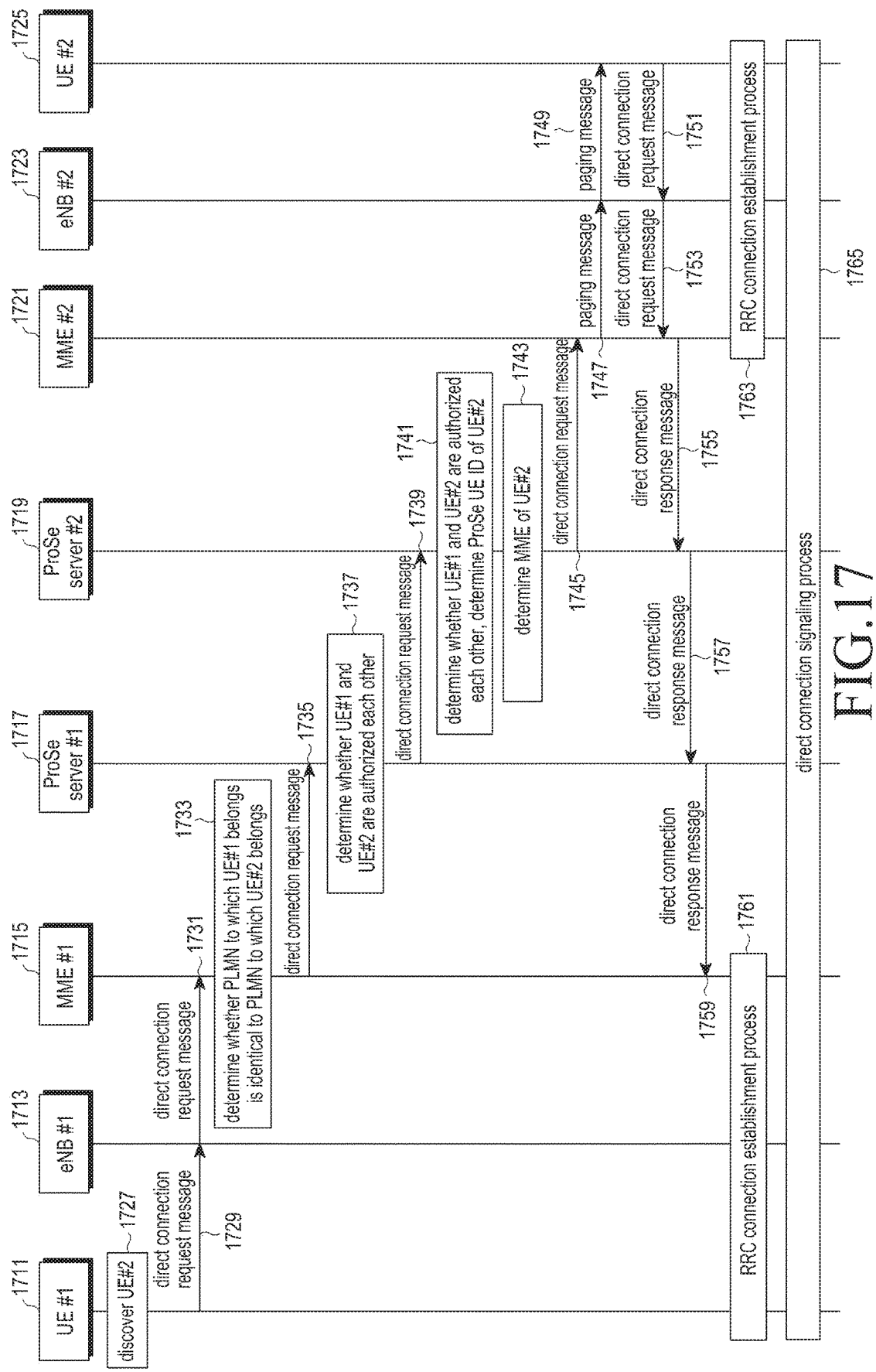
FIG. 17 schematically illustrates an example of a network authorized direct connection establishment process based on the first direct connection establishment scheme for an inter MME case in a communication system supporting a D2D scheme according to an embodiment of the present disclosure.

FIG. 17 schematically illustrates an example of a network authorized direct connection establishment process based on the first direct connection establishment scheme for an inter MME case in a communication system supporting a D2D scheme according to an embodiment of the present disclosure.

Referring to FIG. 17, the communication system includes a UE #1 1711, an eNB #1 1713, an MME #1 1715, a ProSe Server #1 1717, a ProSe server #2 1719, an MME #2 1721, an eNB #2 1723, and a UE #2 1725.

The UE #1 1711 discovers the UE #2 1725, and determines to establish a direct connection with the UE #2 1725 at operation 1727. The UE #1 1711 determines PLMN information of the UE #2 1725. Here, an operation of determining PLMN information of the UE #2 1725 in the UE #1 1711 will be described below.

Firstly, the PLMN information, e.g., a PLMN ID may be included in discovery information transmitted on a discovery channel. If the UE #1 1711 discovers the UE #2 1725 based on the discovery information, the UE #1 1711 may acquire the PLMN information.

Secondly, if the UE #2 1725 belongs to a PLMN which is different from a PLMN to which the UE #1 1711 belongs, the UE #2 1725 operates on an operating frequency different from an operating frequency of the UE #1 1711. In this case, in order to discover the UE #2 1725, the UE #1 1711 receives the discovery information from the UE #2 1725 on other frequency which is not a camped cell of the UE #1 1711. Here, a BS or an eNB of the UE #2 1725 transmits PLMN information on a PLMN to which the UE #2 1725 belongs. The UE #1 1711 may determine the PLMN information of the UE #2 1725 based on the PLMN information which is transmitted by the BS or the eNB of the UE #2 1725.

Thirdly, the UE #1 1711 may include a mapping table which stores mapping relation between a frequency and PLMN information. The UE #1 1711 may determine the PLMN information corresponding to a received frequency through which the discovery information is received using the mapping table. The UE #1 1711 knows a frequency through which the UE #1 1711 receives discovery information which is transmitted by the UE #2 1725.

After determining to establish the direct connection with the UE #2 1725, the UE #1 1711 transmits a direct connection request message to the MME #1 1715 through an eNB of the UE #1 1711, i.e., the eNB #1 1713 at operations 1729 and 1731. The direct connection request message includes a connection type (e.g., mobile originated), information on the UE #2 1725 which is received on a discovery channel during a discovery process (e.g., a discovery code, an application user ID, or an alias of the application user ID), a ProSe UE ID of the UE #1 1711, and PLMN information of the UE #2 1725 (e.g., a PLMN ID and/or a frequency). The direct connection request message may include the PLMN ID of the UE #1 1711. The direct connection request message may include information of the UE #1 1711 (e.g., a discovery code, an application user ID, or an alias of the application user ID).

After receiving the direct connection request message from the eNB #1 1713, the MME #1 1715 determines whether a PLMN to which the UE #1 1711 belongs is identical to a PLMN to which the UE #2 1725 belongs at operation 1733. In FIG. 17, it will be assumed that the UE #1 1711 belongs to the PLMN which is different from the PLMN to which the UE #2 1725 belongs. If the PLMN to which the UE #1 1711 belongs is different from the PLMN to which the UE #2 1725 belongs, the MME #1 1715 transmits a direct connection request message to the ProSe server #1 1717 at operation 1735. The direct connection request message includes UE #2 information, the ProSe UE ID of the UE #1 1711, and PLMN information of the UE #2 1725, e.g., a PLMN ID. The direct connection request message may include the PLMN ID of the UE #1 1711. The direct connection request message may include UE #1 information, e.g., a discovery code, an application user ID, or an alias of the application user ID.

After receiving the direct connection request message from the MME #1 1715, the ProSe server #1 1717 determines whether the UE #1 1711 and the UE #2 1725 are authorized with each other in order to establish a direct connection between the UE #1 1711 and the UE #2 1725 at operation 1737. In FIG. 17, it will be assumed that the UE #1 1711 and the UE #2 1725 are with authorized each other.

The ProSe server #1 1717 determines a ProSe server which will transmit a direct connection request message, i.e., the ProSe server #2 1719 based on the PLMN information of the UE #2 1725. The ProSe server #1 1717 transmits a direct connection request message to the ProSe server #2 1719 at operation 1739. The direct connection request message includes UE #2 information, the ProSe UE ID of the UE #1 1711, and PLMN information of the UE #2 1725, e.g., a PLMN ID. The direct connection request message may include the PLMN ID of the UE #1 1711. The direct connection request message may include UE #1 information, e.g., a discovery code, an application user ID, or an alias of the application user ID. The direct connection request message may include radio resource information. The ProSe server #1 1717 determines radio resources by interacting with the MME #1 1715 and the eNB #1 1713. Here, radio resource information may be pre-configured, and information on the radio resources may be informed to the ProSe server #1 1717.

After receiving the direct connection request message from the ProSe server #1 1717, the ProSe server #2 1719 determines whether the UE #1 1711 and the UE #2 1725 are authorized with each other in order to establish a direct connection between the UE #1 1711 and the UE #2 1725 at operation 1741. The ProSe server #2 1719 determines a ProSe UE ID of the UE #2 1725 based on the UE2 information at operation 1741. For example, the ProSe server #2 1719 includes a UE information-ProSe UE ID mapping table in which UE information is mapped to a ProSe UE ID, and the UE information-ProSe UE ID mapping table is used to determine the ProSe UE ID of the UE #2 1725. In other example, the UE information-ProSe UE ID mapping table may be maintained by an application server. If the UE information-ProSe UE ID mapping table is maintained by the application server, the ProSe server #2 1719 determines the ProSe UE ID of the UE #2 1725 by performing a communication with the application server. The application server with which the ProSe server #2 1719 performs a communication is determined based on the UE information.

The ProSe server #2 1719 determines an MME of the UE #2 1725 based on the ProSe UE ID at operation 1743. The MME of the UE #2 1725 is the MME #2 1721. The ProSe server #2 1719 transmits a direct connection request message to the MME #2 1721 at operation 1745. The direct connection request message includes the ProSe UE ID of the UE #2 1725. The direct connection request message may include the ProSe UE ID of the UE #1 1711. The direct connection request message may include UE #1 information. The direct connection request message may include radio resource information. The ProSe server #2 1719 determines radio resources through the ProSe server #1 1717.

After receiving the direct connection request message, the MME #2 1721 transmits a paging message to the UE #2 1725 through the eNB #2 1723 at operations 1747 and 1749. The paging message includes a direct connection indicator and the ProSe UE ID of the UE #1 1711. The paging message may include UE #1 information. The UE #1 information included in the paging message may be used for determining to accept the direct connection request or reject the direct connection request in the UE #2 1725. The paging message may include information on the UE #1 1711 which belongs to the other PLMN and a frequency of the UE #1 1711 which belongs to the other PLMN.

After receiving the paging message through the eNB #2 1723, the UE #2 1725 transmits a direct connection request message to the MME #2 1721 through the eNB #2 1723 at operations 1751 and 1753. The direct connection request message includes a connection type (i.e., mobile terminated) and the ProSe UE ID of the UE #2 1725.

After receiving the direct connection request message from the eNB #2 1723, the MME #2 1721 transmits a direct connection response message as a response message to the direct connection request message to the ProSe server #2 1719 at operation 1755. The direct connection response message may include information on an eNB of the UE #2 1725, i.e., the eNB #2 1723. The direct connection response message may radio resource information. The ProSe server #2 1719 transmits the direct connection response message to the ProSe server #1 1717 at operation 1757. After receiving the direct connection response message from the ProSe server #2 1719, the ProSe server #1 1717 transmits the direct connection response message to the MME #1 1711 at operation 1759.

After receiving the direct connection response message from the MME #2 1721, the MME #1 1715 establishes an RRC connection with the UE #1 1711 and the eNB #1 1713 at operation 1761. That is, an RRC connection establishment process is performed among the UE #1 1711, the eNB #1 1713, and MME #1 1715. After receiving the direct connection request message from the eNB #2 1723, the MME #2 1721 establishes an RRC connection with the UE #2 1725 and the eNB #2 1723 at operation 1763. That is, an RRC connection establishment process is performed among the MME #2 1721, the eNB #2 1723, and the UE #2 1725. While the RRC connection is established, radio resource information on a direct link is provided to the UE #1 1711 and the UE #2 1725. The MMEs, i.e., the MME #1 1715 and the MME #2 1721 establish an RRC connection between the eNB #1 1713 and the eNB #2 1723 for resource coordination. The MME #1 1715 and the MME #2 1721 know an eNB of the UE #1 1711, i.e., an eNB #1 1713 and an eNB of the UE #2 1725, i.e., an eNB #2 1723. As described above, since both the UE #1 1711 and the UE #2 1725 transmit the direct connection request message and know an eNB from which the direct connection request message is received, the MME #1 1715 and the MME #2 1721 may know eNBs which are associated with the UE #1 1711 and the UE #2 1725.

The UE #1 1711 and the UE #2 1725 may exchange signaling in a direct connection each other at operation 1765. That is, a direct connection signaling process is performed between the UE #1 1711 and the UE #2 1725.

Although FIG. 17 illustrates an example of a network authorized direct connection establishment process based on the first direct connection establishment scheme for an inter MME case in a communication system supporting a D2D scheme according to an embodiment of the present disclosure, various changes could be made to FIG. 17. For example, although shown as a series of operations, various operations in FIG. 17 could overlap, occur in parallel, occur in a different order, or occur multiple times.

An example of a network authorized direct connection establishment process based on the first direct connection establishment scheme for an inter MME case in a communication system supporting a D2D scheme according to an embodiment of the present disclosure has been described with reference to FIG. 17, and another example of a network authorized direct connection establishment process based on the first direct connection establishment scheme for an inter MME case in a communication system supporting a D2D scheme according to an embodiment of the present disclosure will be described with reference to FIG. 18.

Figure 18:
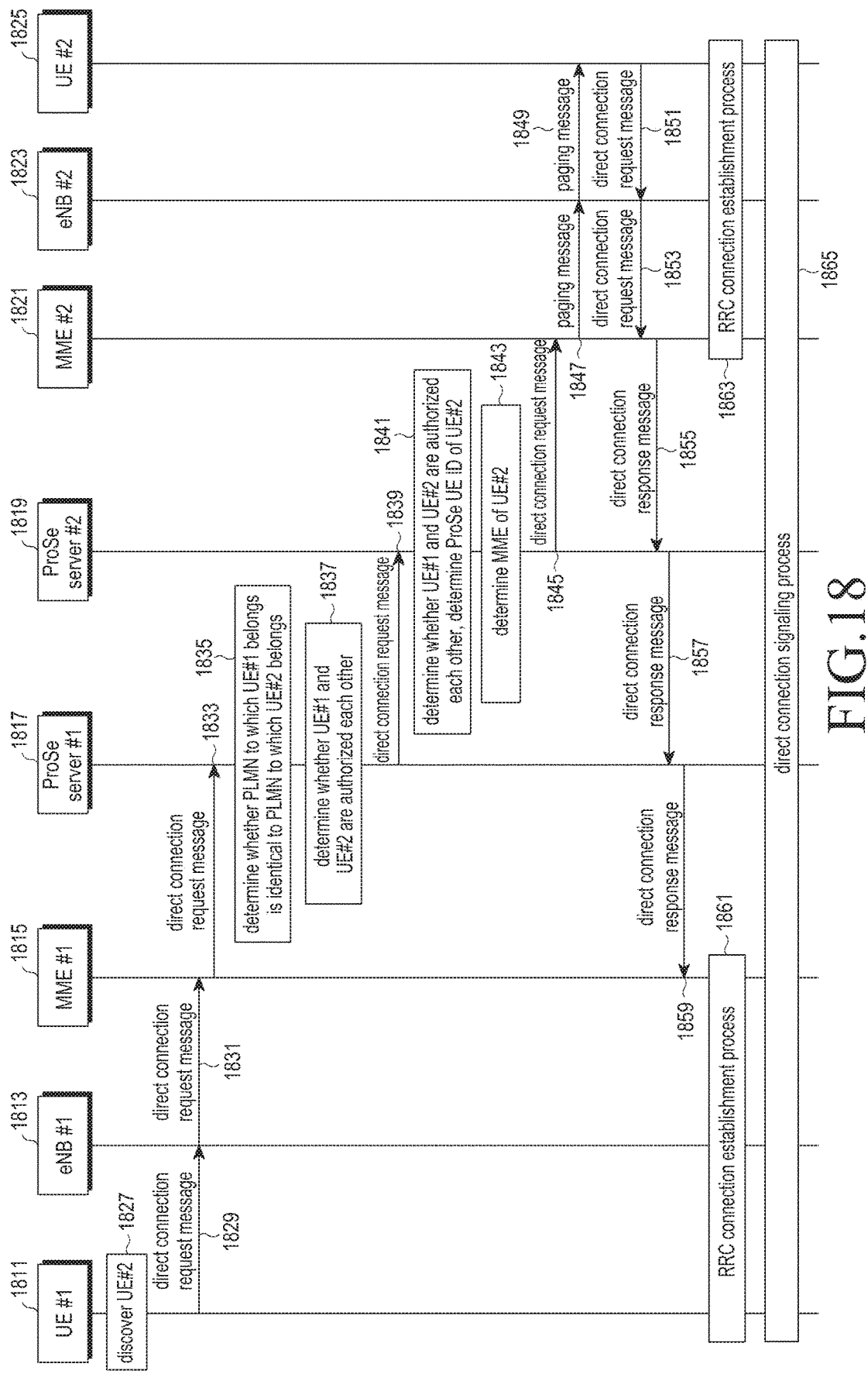
FIG. 18 schematically illustrates another example of a network authorized direct connection establishment process based on the first direct connection establishment scheme for an inter MME case in a communication system supporting a D2D scheme according to an embodiment of the present disclosure.

FIG. 18 schematically illustrates another example of a network authorized direct connection establishment process based on the first direct connection establishment scheme for an inter MME case in a communication system supporting a D2D scheme according to an embodiment of the present disclosure.

Referring to FIG. 18, the communication system includes a UE #1 1811, an eNB #1 1813, an MME #1 1815, a ProSe server #1 1817, a ProSe server #2 1819, an MME #2 1821, an eNB #2 1823, and a UE #2 1825.

The UE #1 1811 discovers the UE #2 1825, and determines to establish a direct connection with the UE #2 1825 at operation 1827. The UE #1 1811 determines PLMN information of the UE #2 1825. A detailed description of the operation of determining the PLMN information of the UE #2 1825 in the UE #1 1811 will be followed.

Firstly, the PLMN information, e.g., a PLMN ID may be included in discovery information transmitted on a discovery channel. If the UE #1 1811 discovers the UE #2 1825 using the discovery information, the UE #1 1811 may acquire the PLMN information.

Secondly, if the UE #2 1825 belongs to a PLMN which is different from a PLMN to which the UE #1 1811 belongs, the UE #2 1825 operates on an operating frequency different from an operating frequency of the UE #1 1811. In this case, in order to discover the UE #2 1825, the UE #1 1811 receives the discovery information from the UE #2 1825 on other frequency which is not a camped cell of the UE #1 1811. Here, a BS or an eNB of the UE #2 1825 transmits PLMN information on a PLMN to which the UE #2 1825 belongs. The UE #1 1811 may determine the PLMN information of the UE #2 1825 based on the PLMN information which is transmitted by the BS or the eNB of the UE #2 1825.

Thirdly, the UE #1 1811 may include a mapping table which stores mapping relation between a frequency and PLMN information. The UE #1 1811 may determine the PLMN information corresponding to a received frequency through which the discovery information is received using the mapping table. The UE #1 1811 knows a frequency through which the UE #1 1811 receives discovery information which is transmitted by the UE #2 1825.

After determining to establish the direct connection with the UE #2 1825, the UE #1 1811 transmits a direct connection request message to the MME #1 1815 through an eNB of the UE #1 1811, i.e., the eNB #1 1813 at operations 1829 and 1831. The direct connection request message includes a connection type (e.g., a mobile originated), information on the UE #2 1825 which is received on a discovery channel during a discovery process (e.g., a discovery code, an application user ID, or an alias), or a ProSe UE ID of the UE #1 1811 and PLMN information of the UE #2 1825 (e.g., a PLMN ID and/or a frequency). The direct connection request message may include a PLMN ID of the UE #1 1811. The direct connection request message may include information of the UE #1 1811 (e.g., a discovery code, an application user ID, or an alias of the application user ID).

After receiving the direct connection request message from the eNB #1 1813, the MME #1 1815 transmits a direct connection request message to the ProSe server #1 1817 at operation 1833. The direct connection request message includes UE #2 information, the ProSe UE ID of the UE #1 1811, and the PLMN information of the UE #2 1825, e.g., a PLMN ID. The direct connection request message may include the PLMN ID of the UE #1 1811. The direct connection request message may include UE #1 information, e.g., a discovery code, an application user ID, or an alias of the application user ID.

After receiving the direct connection request message from the MME #1 1815, the ProSe server #1 1817 determines whether a PLMN to which the UE #1 1811 belongs is identical to a PLMN to which the UE #2 1825 belongs at operation 1835. In FIG. 18, it will be assumed that the UE #1 1811 belongs to a PLMN which is different to a PLMN to which the UE #2 1825 belongs. If the PLMN to which the UE #1 1811 belongs is different from the PLMN to which the UE #2 1825 belongs, the ProSe server #1 1817 determines whether the UE #1 1811 and the UE #2 1825 are authorized with each other in order to establish a direct connection between the UE #1 1811 and the UE #2 1825 at operation 1837. In FIG. 18, it will be assume that the UE #1 1811 and the UE #2 1825 are authorized with each other. The ProSe server #1 1817 determines a ProSe server which will transmit a direct connection request message based on PLMN information of the UE #2 1825, i.e., the ProSe server #2 1819. The ProSe server #1 1817 transmits a direction connection request message to the ProSe server #2 1819 at operation 1839. The direction connection request message includes UE #2 information, the ProSe UE ID of the UE #1 1811, and the PLMN information of the UE #2 1825, e.g., a PLMN ID. The direction connection request message may include the PLMN ID of the UE #1 1811. The direction connection request message may include UE #1 information, e.g., a discovery code, an application ID, or an alias of the application ID. The direction connection request message may include radio resource information. The ProSe server #1 1817 determines radio resources by interacting with the MME #1 1815 and the eNB #1 1813. The radio resources may be previously configured, and information on the radio resources may be informed to the ProSe server #1 1817.

After receiving the direct connection request message from the ProSe server #1 1817, the ProSe server #2 1819 determines whether the UE #1 1811 and the UE #2 1825 are authorized with each other in order to establish a direct connection between the UE #1 1811 and the UE #2 1825 at operation 1841. The ProSe server #2 1819 determines a ProSe UE ID of the UE #2 1825 based on the UE #2 information. In an example, the ProSe server #2 1819 includes a UE information-ProSe UE ID mapping table in which UE information is mapped to a ProSe UE ID of a UE, and the UE information-ProSe UE ID mapping table is used to determine the ProSe UE ID of the UE #2 1825. In other example, the UE information-ProSe UE ID mapping table may be maintained by an application server. If the UE information-ProSe UE ID mapping table is maintained by the application server, the ProSe server #2 1819 performs a communication with the application server to determine the ProSe UE ID of the UE #2 1825. The application server with which the ProSe server #2 1819 performs a communication is determined based on the UE information.

The ProSe server #2 1819 determines an MME of the UE #2 1825 based on the ProSe UE ID at operation 1843. Here, the MME of the UE #2 1825 is the MME #2 1821. The ProSe server #2 1819 transmits a direct connection request message to the MME #2 1821 at operation 1845. The direct connection request message includes the ProSe UE ID of the UE #2 1825. The direct connection request message may include the ProSe UE ID of the UE #1 1811. The direct connection request message may include UE #1 information. The direct connection request message may include radio resource information. The ProSe server #2 1819 determines radio resources through the ProSe server #1 1817.

After receiving the direct connection request message, the MME #2 1821 transmits a paging message to the UE #2 1825 through the eNB #2 1823 at operations 1847 and 1849. The paging message includes a direct connection indicator and the ProSe UE ID of the UE #1 1811. The paging message may include UE #1 information. The UE #1 information included in the paging message may be used to determine to accept the direct connection request or reject the direct connection request. The paging message may include information on the UE #1 1811 which belongs to the other PLMN and a frequency of the UE #1 1811 which belongs to the other PLMN.

After receiving the paging message through the eNB #2 1823, the UE #2 1825 transmits a direct connection request message to the MME #2 1821 through the eNB #2 1823 at operations 1851 and 1853. The direct connection request message includes a connection type (i.e., mobile terminated) and the ProSe UE ID of the UE #2 1825.

After receiving the direct connection request message from the eNB #2 1823, the MME #2 1821 transmits a direct connection response message as a response message to the direct connection request message to the ProSe server #2 1819 at operation 1855. The direct connection response message may include information on an eNB of the UE #2 1825, i.e., the eNB #2 1823. The direct connection response message may include radio resource information. The ProSe server #2 1819 transmits the direct connection response message to the ProSe server #1 1817 at operation 1857. After receiving the direct connection response message from the ProSe server #2 1819, the ProSe server #1 1817 transmits the direct connection response message to the MME #1 1811 at operation 1859.

After receiving the direct connection response message from the MME #2 1821, the MME #1 1815 establishes an RRC connection with the UE #1 1811 and the eNB #1 1813 at operation 1861. That is, an RRC connection establishment process is performed among the UE #1 1811, the eNB #1 1813, and the MME #1 1815. After receiving the direct connection request message from the eNB #2 1823, the MME #2 1821 establishes an RRC connection with the UE #2 1825 and the eNB #2 1823 at operation 1863. That is, an RRC connection establishment process is performed among the MME #2 1821, the eNB #2 1823, and the UE #2 1825. While the RRC connection is established, radio resource information on a direct connection is provided to the UE #1 1811 and the UE #2 1825. The MMEs, i.e., the MME #1 1815 and the MME #2 1821 establish an RRC connection between the eNB #1 1813 and the eNB #2 1823 for resource coordination. The MME #1 1815 and the MME #2 1821 know an eNB of the UE #1 1811, i.e., an eNB #1 1813 and an eNB of the UE #2 1825, i.e., an eNB #2 1823. As described above, since both the UE #1 1811 and the UE #2 1825 transmit the direct connection request message and know an eNB from which the direct connection request message is received, the MME #1 1815 and the MME #2 1821 may know eNBs which are associated with the UE #1 1811 and the UE #2 1825.

The UE #1 1811 and the UE #2 1825 may exchange signaling in a direct connection each other at operation 1865. That is, a direct connection signaling process is performed between the UE #1 1811 and the UE #2 1825.

Although FIG. 18 illustrates another example of a network authorized direct connection establishment process based on the first direct connection establishment scheme for an inter MME case in a communication system supporting a D2D scheme according to an embodiment of the present disclosure, various changes could be made to FIG. 18. For example, although shown as a series of operations, various operations in FIG. 18 could overlap, occur in parallel, occur in a different order, or occur multiple times.

Another example of a network authorized direct connection establishment process based on the first direct connection establishment scheme for an inter MME case in a communication system supporting a D2D scheme according to an embodiment of the present disclosure has been described with reference to FIG. 18, and examples of a network authorized direct connection establishment process based on the second direct connection establishment scheme in a communication system supporting a D2D scheme according to an embodiment of the present disclosure will be described with reference to FIGS. 19 to 23. In the network authorized direct connection establishment process based on the second direct connection establishment scheme, a direct connection request message is transmitted from a UE to a ProSe server.

Firstly, examples of a network authorized direct connection establishment process based on the second direct connection establishment scheme for an intra PLMN and an intra MME case in a communication system supporting a D2D scheme according to an embodiment of the present disclosure will be described with reference to FIGS. 19 to 20.

Firstly, for an intra PLMN and intra MME case, a network authorized direct connection establishment process based on the second direct connection establishment scheme will be described below.

Firstly, a UE #1 uses a UL frequency F1, and a UE #2 uses a UL frequency F2. It is informed to the UE #2 that the UE #1 exists in other PLMN. A UL frequency of the UE #1 is informed to the UE #2. The UE #2 should transmit a signal on the UL frequency F2, and receive a signal on F1 as the UL frequency of the UE #1. The UE #1 should transmit a signal on the UL frequency F1, and receive a signal on F2 as the UL frequency of the UE #2. This indication operation may performed during a paging process or an RRC connection establishment process.

Firstly, an example of a network authorized direct connection establishment process based on the second direct connection establishment scheme for an intra PLMN and an intra MME case in a communication system supporting a D2D scheme according to an embodiment of the present disclosure will be described with reference to FIG. 19.

Figure 19:
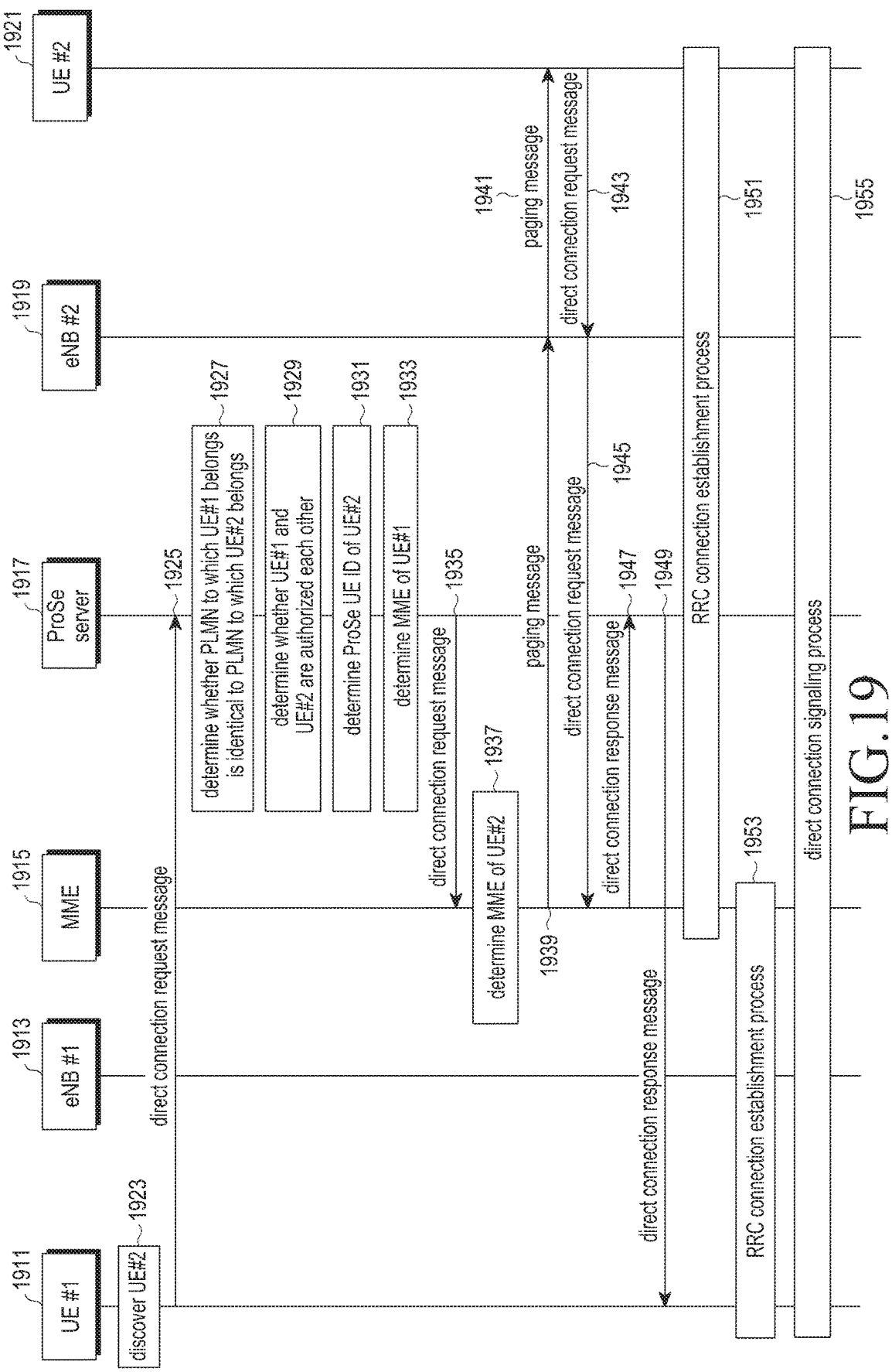
FIG. 19 schematically illustrates an example of a network authorized direct connection establishment process based on the second direct connection establishment scheme for an intra PLMN and an intra MME case in a communication system supporting a D2D scheme according to an embodiment of the present disclosure.

FIG. 19 schematically illustrates an example of a network authorized direct connection establishment process based on the second direct connection establishment scheme for an intra PLMN and an intra MME case in a communication system supporting a D2D scheme according to an embodiment of the present disclosure.

Referring to FIG. 19, the communication system includes a UE #1 1911, an eNB #1 1913, an MME 1915, a ProSe server 1917, an eNB #2 1919, and a UE #2 1921.

The UE #1 1911 discovers the UE #2 1921, and determines to establish a direct connection with the UE #2 1921 at operation 1923. The UE #1 1911 determines PLMN information of the UE #2 1921, and a detailed description will be followed.

Firstly, the PLMN information, e.g., a PLMN ID may be included in discovery information transmitted on a discovery channel. In this case, if the UE #1 1911 discovers the UE #2 1921 based on the discovery information, the UE #1 1911 may acquire the PLMN information.

Secondly, if the UE #2 1921 belongs to a PLMN which is different from a PLMN to which the UE #1 1911 belongs, the UE #2 1921 operates on an operating frequency different from an operating frequency of the UE #1 1911. In this case, in order to discover the UE #2 1921, the UE #1 1911 receives the discovery information from the UE #2 1921 on other frequency which is not a camped cell of the UE #1 1911. Here, a BS or an eNB of the UE #2 1921 transmits PLMN information on a PLMN to which the UE #2 1921 belongs. The UE #1 1911 may determine the PLMN information of the UE #2 1921 based on the PLMN information which is transmitted by the BS or the eNB of the UE #2 1921.

Thirdly, the UE #1 1911 may include a mapping table which stores mapping relation between a frequency and PLMN information. The UE #1 1911 may determine the PLMN information corresponding to a received frequency through which the discovery information is received using the mapping table. The UE #1 1911 knows a frequency through which the UE #1 1911 receives discovery information which is transmitted by the UE #2 1921.

The UE #1 1911 transmits a direct connection request message to the ProSe server 1917 at operation 1925. The direct connection request message includes a connection type (e.g., mobile originated), information on the UE #2 1921 which is received on a discovery channel during a discovery process (e.g., a discovery code, an application user ID, or an alias of the application user ID), a ProSe UE ID of the UE #1 1911 and PLMN information of the UE #2 1921 (e.g., a PLMN ID and/or a frequency). The direct connection request message may include the PLMN ID of the UE #1 1211. The direct connection request message may include information of the UE #1 1911 (e.g., a discovery code, an application user ID, or an alias of the application user ID).

After receiving the direct connection request message from the UE #1 1911, the ProSe server 1917 determines whether a PLMN to which the UE #1 1911 belongs is identical to a PLMN to which the UE #2 1921 belongs at operation 1927. In FIG. 19, it will be assume that the PLMN to which the UE #1 1911 belongs is identical to the PLMN to which the UE #2 1921 belongs. Since the PLMN to which the UE #1 1911 belongs is identical to the PLMN to which the UE #2 1921 belongs, the ProSe server 1917 determines whether the UE #1 1911 and the UE #2 1921 are authorized with each other in order to establish a direct connection between the UE #1 1911 and the UE #2 1921 at operation 1929. In FIG. 19, it will be assumed that the UE #1 1911 and the UE #2 1921 are authorized with each other.

Since the UE #1 1911 and the UE #2 1921 are authorized with each other, the ProSe server 1917 determines a ProSe UE ID of the UE #2 1921 based on the UE #2 information at operation 1931. For example, the ProSe server 1917 includes a UE information-ProSe UE ID mapping table in which UE information is mapped to a ProSe UE ID, and the ProSe server 1917 uses the UE information-ProSe UE ID mapping table in order to determine the ProSe UE ID of the UE #2 1921. In other example, the UE information-ProSe UE ID mapping table may be maintained by an application server (not shown in FIG. 19). In this case, the ProSe server 1917 determines the ProSe UE ID of the UE #2 1921 by performing a communication with the application server. The application server with which the ProSe server 1917 performs a communication is determined based on the UE information.

The ProSe server 1917 determines an MME of the UE #1 1911 based on the ProSe UE ID of the UE #1 1911 at operation 1933. In FIG. 19, it will be assumed that the MME 1915 is determined as the MME of the UE #1 1911. The ProSe server 1917 transmits a direct connection request message to the determined MME, i.e., the MME 1915 at operation 1935. The direct connection request message includes the ProSe UE ID of the UE #2 1921. The direct connection request message may include UE #1 information and a ProSe UE ID.

After receiving the direct connection request message from the ProSe server 1917, the MME 1915 determines an MME for the UE #2 1921 based on the ProSe UE ID of the UE #2 1921 included in the direct connection request message at operation 1937. Here, the ProSe UE ID includes specific bits indicating MME information. In FIG. 19, it will be assumed that the UE #2 1921 belongs to the MME 1915. Since the MME of the UE #2 1921 is the MME 1915, the MME 1915 pages the UE #2 1921 by transmitting a paging message to the UE #2 1921 through the eNB #2 1919 at operations 1939 and 1941. The paging message includes a direct connection indicator and the ProSe UE ID of the UE #1 1911. The paging message may include information on UE #1 information. The UE #1 information included in the paging message may be used for determining to accept the direct connection request or reject the direct connection request in the UE #2 1921.

After receiving the paging message through the eNB #2 1919, the UE #2 1921 transmits a direct connection request message to the MME 1915 through the eNB #2 1919 in response to the paging message at operations 1943 and 1945. The direct connection request message includes a connection type (i.e., mobile terminated) and a ProSe UE ID of the UE #2 1921.

After receiving the direct connection request message through the eNB #2 1919, the MME 1915 transmits a direct connection response message as a response message to the direct connection request message to the ProSe server 1917 at operation 1947. After receiving the direct connection response message from the MME 1915, the ProSe server 1917 transmits a direct connection response message to the UE #1 1911 at operation 1949. The direct connection response message may include radio resource information on the direct connection.

So, an RRC connection establishment process is performed among the MME 1915, the eNB #2 1919, and the UE #2 1921 at operation 1951, and an RRC connection establishment process is performed among the UE #1 1911, the eNB #1 1913, and the MME 1915 at operation 1953. During the RRC connection establishment process, radio resource information on a direct link is provided to the UE #1 1911 and the UE #2 1913.

The UE #1 1911 and the UE #2 1921 may exchange signaling in a direct connection each other at operation 1955. That is, a direct connection signaling process is performed between the UE #1 1911 and the UE #2 1921.

Although FIG. 19 illustrates an example of a network authorized direct connection establishment process based on the second direct connection establishment scheme for an intra PLMN and an intra MME case in a communication system supporting a D2D scheme according to an embodiment of the present disclosure, various changes could be made to FIG. 19. For example, although shown as a series of operations, various operations in FIG. 19 could overlap, occur in parallel, occur in a different order, or occur multiple times.

An example of a network authorized direct connection establishment process based on the second direct connection establishment scheme for an intra PLMN and an intra MME case in a communication system supporting a D2D scheme according to an embodiment of the present disclosure has been described with reference to FIG. 19, and another example of a network authorized direct connection establishment process based on the second direct connection establishment scheme for an intra PLMN and an intra MME case in a communication system supporting a D2D scheme according to an embodiment of the present disclosure will be described with reference to FIG. 20.

Figure 20:
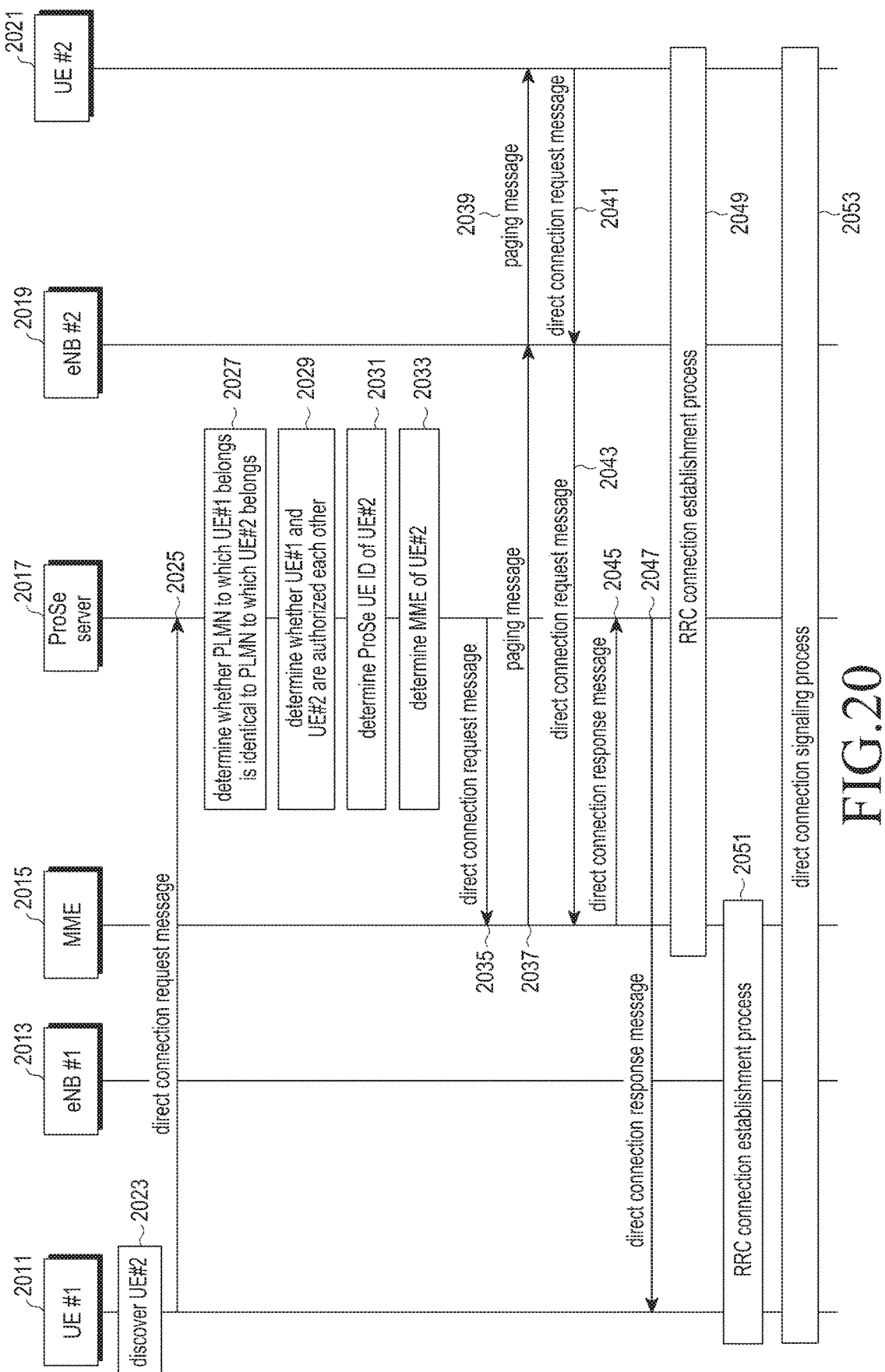
FIG. 20 schematically illustrates another example of a network authorized direct connection establishment process based on the second direct connection establishment scheme for an intra PLMN and an intra MME case in a communication system supporting a D2D scheme according to an embodiment of the present disclosure.

FIG. 20 schematically illustrates another example of a network authorized direct connection establishment process based on the second direct connection establishment scheme for an intra PLMN and an intra MME case in a communication system supporting a D2D scheme according to an embodiment of the present disclosure.

Referring to FIG. 20, the communication system includes a UE #1 2011, an eNB #1 2013, an MME 2015, a ProSe server 2017, an eNB #2 2019, and a UE #2 2021.

The UE #1 2011 discovers the UE #2 2021, and determines to establish a direct connection with the UE #2 2021 at operation 2023. The UE #1 2011 determines PLMN information of the UE #2 2021, and a detailed description will be followed.

Firstly, the PLMN information, e.g., a PLMN ID may be included in discovery information transmitted on a discovery channel. In this case, if the UE #1 2011 discovers the UE #2 2021 based on the discovery information, the UE #1 2011 may acquire the PLMN information.

Secondly, if the UE #2 2021 belongs to a PLMN which is different from a PLMN to which the UE #1 2011 belongs, the UE #2 2021 operates on an operating frequency different from an operating frequency of the UE #1 2011. In this case, in order to discover the UE #2 2021, the UE #1 2011 receives the discovery information from the UE #2 2021 on other frequency which is not a camped cell of the UE #1 2011. Here, a BS or an eNB of the UE #2 2021 transmits PLMN information on a PLMN to which the UE #2 2021 belongs. The UE #1 2011 may determine the PLMN information of the UE #2 2021 based on the PLMN information which is transmitted by the BS or the eNB of the UE #2 2021.

Thirdly, the UE #1 2011 may include a mapping table which stores mapping relation between a frequency and PLMN information. The UE #1 2011 may determine the PLMN information corresponding to a received frequency through which the discovery information is received using the mapping table. The UE #1 2011 knows a frequency through which the UE #1 2011 receives discovery information which is transmitted by the UE #2 2021.

The UE #1 2011 transmits a direct connection request message to the ProSe server 2017 at operation 2025. The direct connection request message includes a connection type (e.g., mobile originated), information on the UE #2 1221 which is received on a discovery channel during a discovery process (e.g., a discovery code, an application user ID, or an alias of the application user ID), a ProSe UE ID of the UE #1 2011 and PLMN information of the UE #2 2021 (e.g., a PLMN ID and/or a frequency). The direct connection request message may include the PLMN ID of the UE #1 2011. The direct connection request message may include information of the UE #1 2011 (e.g., a discovery code, an application user ID, or an alias of the application user ID).

After receiving the direct connection request message from the UE #1 2011, the ProSe server 2017 determines whether a PLMN to which the UE #1 2011 belongs is identical to a PLMN to which the UE #2 2021 belongs at operation 2027. In FIG. 20, it will be assumed that the PLMN to which the UE #1 2011 belongs is identical to the PLMN to which the UE #2 2021 belongs. Since the PLMN to which the UE #1 2011 belongs is identical to the PLMN to which the UE #2 2021 belongs, the ProSe server 2017 determines whether the UE #1 2011 and the UE #2 2021 are authorized with each other in order to establish a direct connection between the UE #1 2011 and the UE #2 2021 at operation 2029. In FIG. 20, it will be assumed that the UE #1 2011 and the UE #2 2021 are authorized with each other.

Since the UE #1 2011 and the UE #2 2021 are authorized with each other, the ProSe server 2017 determines a ProSe UE ID of the UE #2 2021 based on the UE #2 information at operation 2031. For example, the ProSe server 2017 includes a UE information-ProSe UE ID mapping table in which UE information is mapped to a ProSe UE ID, and the ProSe server 2017 uses the UE information-ProSe UE ID mapping table in order to determine the ProSe UE ID of the UE #2 2021. In other example, the UE information-ProSe UE ID mapping table may be maintained by an application server (not shown in FIG. 20). In this case, the ProSe server 2017 determines the ProSe UE ID of the UE #2 2021 by performing a communication with the application server. The application server with which the ProSe server 2017 performs a communication is determined based on the UE information.

The ProSe server 2017 determines an MME for the UE #2 2021 based on the ProSe UE ID of the UE #2 2021 at operation 2033. In FIG. 20, it will be assumed that the MME 2015 is determined as an MME of the UE #2 2021. The ProSe server 2017 transmits a direct connection request message to the determined MME, i.e., the MME 2015 at operation 2035. The direct connection request message includes the ProSe UE ID of the UE #2 2021. The direct connection request message may include UE #1 information and a ProSe UE ID.

After receiving the direct connection request message from the ProSe server 2017, the MME 2015 pages the UE #2 2021 by transmitting a paging message to the UE #2 2021 through the eNB #2 2019 at operations 2037 and 2039. The paging message includes a direct connection indicator and the ProSe UE ID of the UE #1 2011. The paging message may include UE #1 information. The UE #1 information included in the paging message may be used for determining to accept the direct connection request or reject the direct connection request in the UE #2 2021.

After receiving the paging message through the eNB #2 2019, the UE #2 2021 transmits a direct connection request message to the MME 2015 through the eNB #2 2019 in response to the paging message at operations 2041 and 2043. The direct connection request message includes a connection type (i.e., mobile terminated) and a ProSe UE ID of the UE #2 2021.

After receiving the direct connection request message through the eNB #2 2019, the MME 2015 transmits a direct connection response message as a response message to the direct connection request message to the ProSe server 2017 at operation 2045. After receiving the direct connection response message from the MME 2015, the ProSe server 2017 transmits a direct connection response message to the UE #1 2011 at operation 2047. The direct connection response message may include radio resource information on the direct connection.

So, an RRC connection establishment process is performed among the MME 2015, the eNB #2 2019, and the UE #2 2021 at operation 2049, and an RRC connection establishment process is performed among the UE #1 2011, the eNB #1 2013, and the MME 2015 at operation 2051. During the RRC connection establishment process, radio resource information on a direct link is provided to the UE #1 2011 and the UE #2 2013.

The UE #1 2011 and the UE #2 2021 may exchange signaling in a direct connection each other at operation 2053. That is, a direct connection signaling process is performed between the UE #1 2011 and the UE #2 2021.

Although FIG. 20 illustrates another example of a network authorized direct connection establishment process based on the second direct connection establishment scheme for an intra PLMN and an intra MME case in a communication system supporting a D2D scheme according to an embodiment of the present disclosure, various changes could be made to FIG. 20. For example, although shown as a series of operations, various operations in FIG. 20 could overlap, occur in parallel, occur in a different order, or occur multiple times.

Another example of a network authorized direct connection establishment process based on the second direct connection establishment scheme for an intra PLMN and an intra MME case in a communication system supporting a D2D scheme according to an embodiment of the present disclosure has been described with reference to FIG. 20, and an example of a network authorized direct connection establishment process based on the second direct connection establishment scheme for an intra PLMN and an inter MME case in a communication system supporting a D2D scheme according to an embodiment of the present disclosure will be described with reference to FIG. 21.

Figure 21:
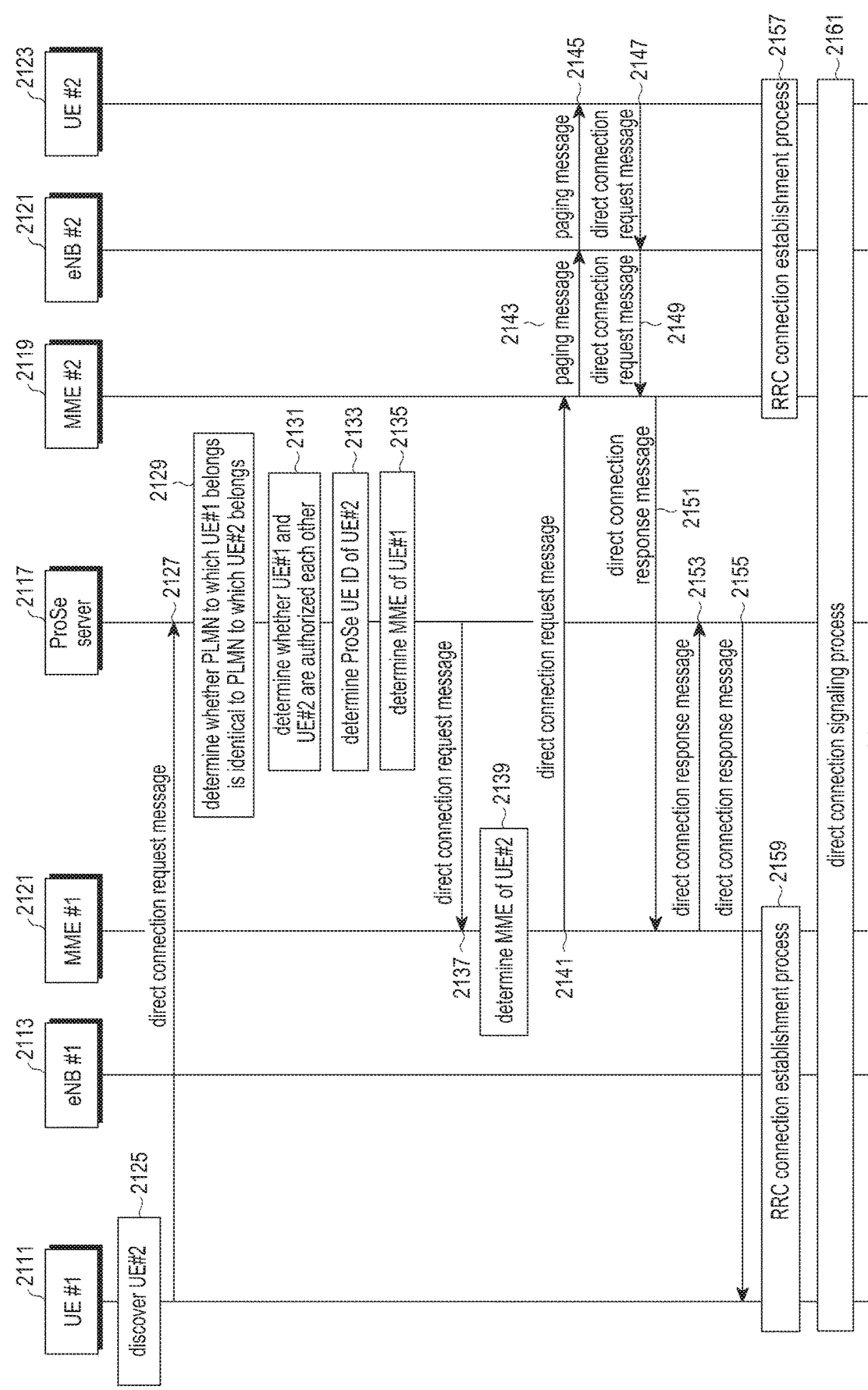
FIG. 21 schematically illustrates an example of a network authorized direct connection establishment process based on the second direct connection establishment scheme for an intra PLMN and an inter MME case in a communication system supporting a D2D scheme according to an embodiment of the present disclosure.

FIG. 21 schematically illustrates an example of a network authorized direct connection establishment process based on the second direct connection establishment scheme for an intra PLMN and an inter MME case in a communication system supporting a D2D scheme according to an embodiment of the present disclosure.

Referring to FIG. 21, the communication system includes a UE #1 2111, an eNB #1 2113, an MME #1 2115, a ProSe server 2117, an MME #2 2119, an eNB #2 2121, and a UE #2 2123.

The UE #1 2111 discovers the UE #2 2123, and determines to establish a direct connection with the UE #2 2123 at operation 2125. The UE #1 2111 determines PLMN information of the UE #2 2123, and a detailed description will be followed.

Firstly, the PLMN information, e.g., a PLMN ID may be included in discovery information transmitted on a discovery channel. In this case, if the UE #1 2111 discovers the UE #2 2123 based on the discovery information, the UE #1 2111 may acquire the PLMN information.

Secondly, if the UE #2 2123 belongs to a PLMN which is different from a PLMN to which the UE #1 2111 belongs, the UE #2 2123 operates on an operating frequency different from an operating frequency of the UE #1 2111. In this case, in order to discover the UE #2 2123, the UE #1 2111 receives the discovery information from the UE #2 2123 on other frequency which is not a camped cell of the UE #1 2111. Here, a BS or an eNB of the UE #2 2123 transmits PLMN information on a PLMN to which the UE #2 2123 belongs. The UE #1 2111 may determine the PLMN information of the UE #2 2123 based on the PLMN information which is transmitted by the BS or the eNB of the UE #2 2123.

Thirdly, the UE #1 2111 may include a mapping table which stores mapping relation between a frequency and PLMN information. The UE #1 2111 may determine the PLMN information corresponding to a received frequency through which the discovery information is received using the mapping table. The UE #1 2111 knows a frequency through which the UE #1 2111 receives discovery information which is transmitted by the UE #2 2123.

The UE #1 2111 transmits a direct connection request message to the ProSe server 2117 at operation 2127. The direct connection request message includes a connection type (e.g., mobile originated), information on the UE #2 2123 which is received on a discovery channel during a discovery process (e.g., a discovery code, an application user ID, or an alias of the application user ID), a ProSe UE ID of the UE #1 2111 and PLMN information of the UE #2 2123 (e.g., a PLMN ID and/or a frequency). The direct connection request message may include the PLMN ID of the UE #1 2111. The direct connection request message may include information of the UE #1 2111 (e.g., a discovery code, an application user ID, or an alias of the application user ID).

After receiving the direct connection request message from the UE #1 2111, the ProSe server 2117 determines whether a PLMN to which the UE #1 2111 belongs is identical to a PLMN to which the UE #2 2123 belongs at operation 2129. In FIG. 21, it will be assumed that the PLMN to which the UE #1 2111 belongs is identical to the PLMN to which the UE #2 2123 belongs. Since the PLMN to which the UE #1 2111 belongs is identical to the PLMN to which the UE #2 2123 belongs, the ProSe server 2117 determines whether the UE #1 2111 and the UE #2 2123 are authorized with each other in order to establish a direct connection between the UE #1 2111 and the UE #2 2123 at operation 2131. In FIG. 21, it will be assumed that the UE #1 2111 and the UE #2 2123 are authorized with each other.

Since the UE #1 2111 and the UE #2 2123 are authorized with each other, the ProSe server 2117 determines a ProSe UE ID of the UE #2 2123 based on the UE #2 information at operation 2133. For example, the ProSe server 2117 includes a UE information-ProSe UE ID mapping table in which UE information is mapped to a ProSe UE ID, and the ProSe server 2117 uses the UE information-ProSe UE ID mapping table in order to determine the ProSe UE ID of the UE #2 2123. In other example, the UE information-ProSe UE ID mapping table may be maintained by an application server (not shown in FIG. 21). In this case, the ProSe server 2117 determines the ProSe UE ID of the UE #2 2123 by performing a communication with the application server. The application server with which the ProSe server 2117 performs a communication is determined based on the UE information.

The ProSe server 2117 determines an MME of the UE #1 2111 based on the ProSe UE ID of the UE #1 2111 at operation 2135. In FIG. 21, it will be assumed that the MME 2115 is determined as the MME of the UE #1 2111. The ProSe server 2117 transmits a direct connection request message to the determined MME, i.e., the MME #1 2115 at operation 2137. The direct connection request message includes the ProSe UE ID of the UE #2 2123. The direct connection request message may include UE #1 information and a ProSe UE ID.

After receiving the direct connection request message from the ProSe server 2117, the MME #1 2115 determines an MME for the UE #2 2123 based on the ProSe UE ID included in the direct connection request message at operation 2139. Here, the ProSe UE ID includes specific bits indicating MME information. In FIG. 21, it will be assumed that the UE #2 2123 belongs to other MME, i.e., the MME #2 2119. The MME #1 2115 transmits a direct connection request message to the MME #2 2119 at operation 2141. The direct connection request message includes the ProSe UE ID of the UE #2 2123. The direct connection request message may include UE #1 information and a ProSe UE ID.

After receiving the direct connection request message from the MME #1 2115, the MME #2 2119 pages the UE #2 2123 by transmitting a paging message to the UE #2 2123 through the eNB #2 2121 at operations 2143 and 2145. The paging message includes a direct connection indicator and the ProSe UE ID of the UE #1 2111. The paging message may include UE #1 information. The UE #1 information included in the paging message may be used for determining to accept the direct connection request or reject the direct connection request in the UE #2 2123.

After receiving the paging message through the eNB #2 2121, the UE #2 2123 transmits a direct connection request message to the MME #2 2119 through the eNB #2 2121 at operations 2147 and 2149. The direct connection request message includes a connection type (i.e., mobile terminated) and a ProSe UE ID of the UE #2 2123.

After receiving the direct connection request message through the eNB #2 2121, the MME #2 2119 transmits a direct connection response message to the MME #1 2115 at operation 2151. After receiving the direct connection response message from the MME #2 2119, the MME #1 2115 transmits a direct connection response message to the ProSe server 2117 at operation 2153. After receiving the direct connection response message from the MME #1 2115, the ProSe server 2117 transmits a direct connection response message to the UE #1 2111 at operation 2155. The direct connection response message may include radio resource information on the direct connection.

So, an RRC connection establishment process is performed among the MME #2 2119, the eNB #2 2121, and the UE #2 2123 at operation 2157, and an RRC connection establishment process is performed among the UE #1 2111, the eNB #1 2113, the MME #1 2115 at operation 2159. During the RRC connection establishment process, radio resource information on a direct connection is provided to the UE #1 2111 and the UE #2 2123.

The UE #1 2111 and the UE #2 2123 may exchange signaling in a direct connection each other at operation 2161. That is, a direct connection signaling process is performed between the UE #1 2111 and the UE #2 2123.

Although FIG. 21 illustrates an example of a network authorized direct connection establishment process based on the second direct connection establishment scheme for an intra PLMN and an inter MME case in a communication system supporting a D2D scheme according to an embodiment of the present disclosure, various changes could be made to FIG. 21. For example, although shown as a series of operations, various operations in FIG. 21 could overlap, occur in parallel, occur in a different order, or occur multiple times.

An example of a network authorized direct connection establishment process based on the second direct connection establishment scheme for an intra PLMN and an inter MME case in a communication system supporting a D2D scheme according to an embodiment of the present disclosure has been described with reference to FIG. 21, and another example of a network authorized direct connection establishment process based on the second direct connection establishment scheme for an intra PLMN and an inter MME case in a communication system supporting a D2D scheme according to an embodiment of the present disclosure will be described with reference to FIG. 22.

Figure 22:
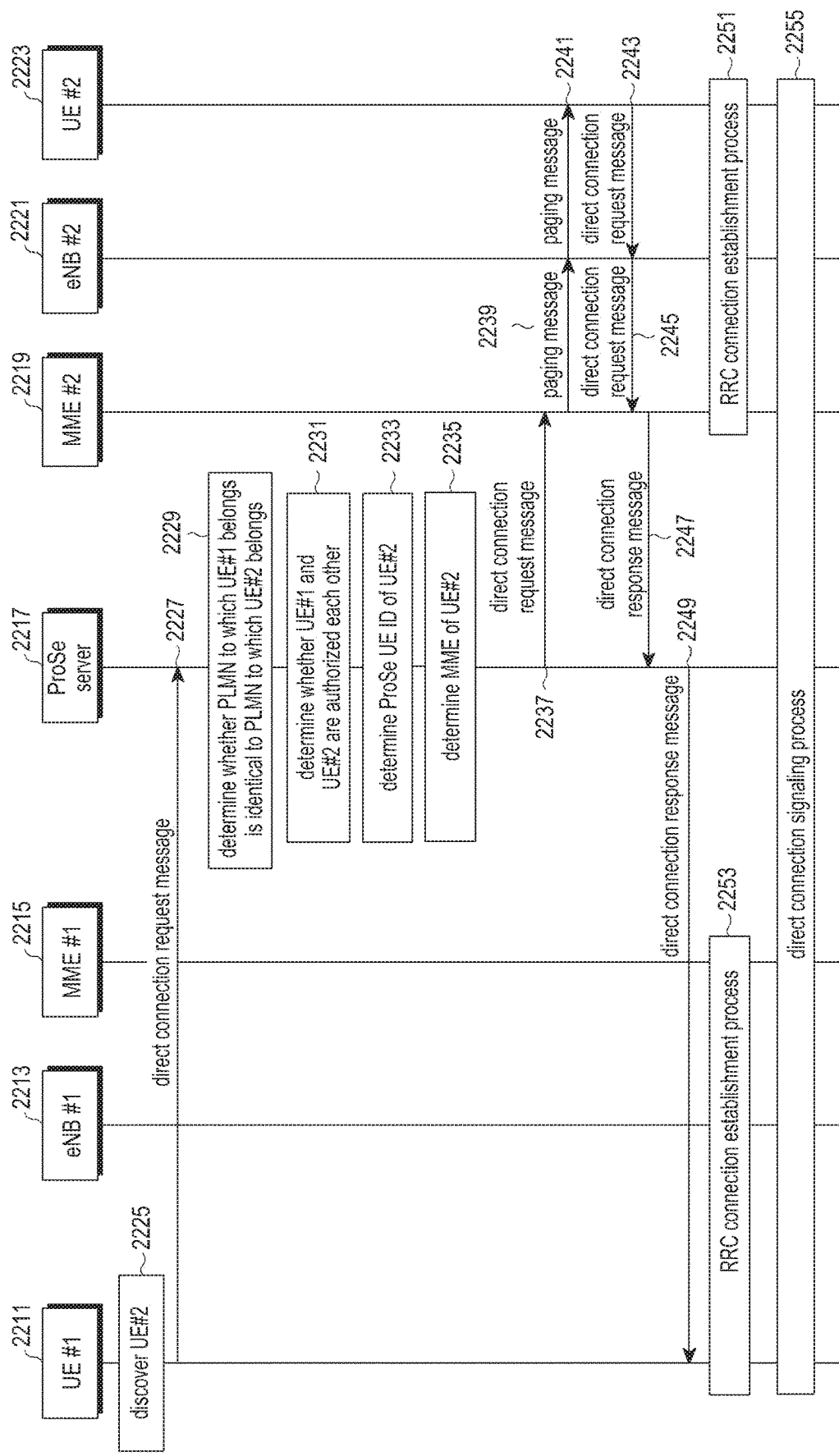
FIG. 22 schematically illustrates another example of a network authorized direct connection establishment process based on the second direct connection establishment scheme for an intra PLMN and an inter MME case in a communication system supporting a D2D scheme according to an embodiment of the present disclosure.

FIG. 22 schematically illustrates another example of a network authorized direct connection establishment process based on the second direct connection establishment scheme for an intra PLMN and an inter MME case in a communication system supporting a D2D scheme according to an embodiment of the present disclosure.

Referring to FIG. 22, the communication system includes a UE #1 2211, an eNB #1 2213, an MME #1 2215, a ProSe server 2217, an MME #2 2219, an eNB #2 2221, and a UE #2 2223.

The UE #1 2211 discovers the UE #2 2223, and determines to establish a direct connection with the UE #2 2223 at operation 2225. The UE #1 2211 determines PLMN information of the UE #2 2223, and a detailed description will be followed.

Firstly, the PLMN information, e.g., a PLMN ID may be included in discovery information transmitted on a discovery channel. In this case, if the UE #1 2211 discovers the UE #2 2223 based on the discovery information, the UE #1 2211 may acquire the PLMN information.

Secondly, if the UE #2 2223 belongs to a PLMN which is different from a PLMN to which the UE #1 2211 belongs, the UE #2 2223 operates on an operating frequency different from an operating frequency of the UE #1 2211. In this case, in order to discover the UE #2 2223, the UE #1 2211 receives the discovery information from the UE #2 2223 on other frequency which is not a camped cell of the UE #1 2211. Here, a BS or an eNB of the UE #2 2223 transmits PLMN information on a PLMN to which the UE #2 2223 belongs. The UE #1 2211 may determine the PLMN information of the UE #2 2223 based on the PLMN information which is transmitted by the BS or the eNB of the UE #2 2223.

Thirdly, the UE #1 2211 may include a mapping table which stores mapping relation between a frequency and PLMN information. The UE #1 2211 may determine the PLMN information corresponding to a received frequency through which the discovery information is received using the mapping table. The UE #1 2211 knows a frequency through which the UE #1 2211 receives discovery information which is transmitted by the UE #2 2223.

The UE #1 2211 transmits a direct connection request message to the ProSe server 2217 at operation 2227. The direct connection request message includes a connection type (e.g., mobile originated), information on the UE #2 2223 which is received on a discovery channel during a discovery process (e.g., a discovery code, an application user ID, or an alias of the application user ID), a ProSe UE ID of the UE #1 2211 and PLMN information of the UE #2 2223 (e.g., a PLMN ID and/or a frequency). The direct connection request message may include the PLMN ID of the UE #1 2211. The direct connection request message may include information of the UE #1 2211 (e.g., a discovery code, an application user ID, or an alias of the application user ID).

After receiving the direct connection request message from the UE #1 2211, the ProSe server 2217 determines whether a PLMN to which the UE #1 2211 belongs is identical to a PLMN to which the UE #2 2223 belongs at operation 2229. In FIG. 22, it will be assumed that the PLMN to which the UE #1 2211 belongs is identical to the PLMN to which the UE #2 2223 belongs. Since the PLMN to which the UE #1 2211 belongs is identical to the PLMN to which the UE #2 2223 belongs, the ProSe server 2217 determines whether the UE #1 2211 and the UE #2 2223 are authorized with each other in order to establish a direct connection between the UE #1 2211 and the UE #2 2223 at operation 2231. In FIG. 22, it will be assumed that the UE #1 2211 and the UE #2 2223 are authorized with each other.

Since the UE #1 2211 and the UE #2 2223 are authorized with each other, the ProSe server 2217 determines a ProSe UE ID of the UE #2 2223 based on the UE #2 information at operation 2233. For example, the ProSe server 2217 includes a UE information-ProSe UE ID mapping table in which UE information is mapped to a ProSe UE ID, and the ProSe server 2217 uses the UE information-ProSe UE ID mapping table in order to determine the ProSe UE ID of the UE #2 2223. In other example, the UE information-ProSe UE ID mapping table may be maintained by an application server (not shown in FIG. 22). In this case, the ProSe server 2217 determines the ProSe UE ID of the UE #2 2223 by performing a communication with the application server. The application server with which the ProSe server 2217 performs a communication is determined based on the UE information.

The ProSe server 2217 determines an MME for the UE #2 2221 based on the ProSe UE ID of the UE #2 2223 at operation 2235. In FIG. 22, it will be assumed that the MME #2 2219 is determined as an MME of the UE #2 2223. The ProSe server 2217 transmits a direct connection request message to the determined MME, i.e., the MME #2 2219 at operation 2237. The direct connection request message includes the ProSe UE ID of the UE #1 2211. The direct connection request message may include UE #2 information and a ProSe UE ID.

After receiving the direct connection request message from the ProSe server 2217, the MME #2 2219 pages the UE #2 2223 by transmitting a paging message to the UE #2 2223 through the eNB #2 2221 at operations 2239 and 2241. The paging message includes a direct connection indicator and the ProSe UE ID of the UE #1 2211. The paging message may include UE #1 information. The UE #1 information included in the paging message may be used for determining to accept the direct connection request or reject the direct connection request in the UE #2 2223.

After receiving the paging message through the eNB #2 2221, the UE #2 2223 transmits a direct connection request message to the MME #2 2219 through the eNB #2 2221 at operations 2243 and 2245. The direct connection request message includes a connection type (i.e., mobile terminated) and a ProSe UE ID of the UE #2 2223.

After receiving the direct connection request message through the eNB #2 2221, the MME #2 2219 transmits a direct connection response message to the ProSe server 2217 at operation 2247. After receiving the direct connection response message from the MME #2 2219, the ProSe server 2217 transmits a direct connection response message to the UE #1 2211 at operation 2249. The direct connection response message may include radio resource information on the direct connection.

So, an RRC connection establishment process is performed among the MME #2 2219, the eNB #2 2221, and the UE #2 2223 at operation 2251, and an RRC connection establishment process is performed among the UE #1 2211, the eNB #1 2213, and the MME #1 2215 at operation 2253. During the RRC connection establishment process, radio resource information on a direct connection is provided to the UE #1 2211 and the UE #2 2223.

The UE #1 2211 and the UE #2 2223 may exchange signaling in a direct connection each other at operation 2255. That is, a direct connection signaling process is performed between the UE #1 2211 and the UE #2 2223.

Although FIG. 22 illustrates another example of a network authorized direct connection establishment process based on the second direct connection establishment scheme for an intra PLMN and an inter MME case in a communication system supporting a D2D scheme according to an embodiment of the present disclosure, various changes could be made to FIG. 22. For example, although shown as a series of operations, various operations in FIG. 22 could overlap, occur in parallel, occur in a different order, or occur multiple times.

Another example of a network authorized direct connection establishment process based on the second direct connection establishment scheme for an intra PLMN and an inter MME case in a communication system supporting a D2D scheme according to an embodiment of the present disclosure has been described with reference to FIG. 22, and a network authorized direct connection establishment process based on the second direct connection establishment scheme for an inter MME case in a communication system supporting a D2D scheme according to an embodiment of the present disclosure has been described with reference to FIG. 23.

Figure 23:
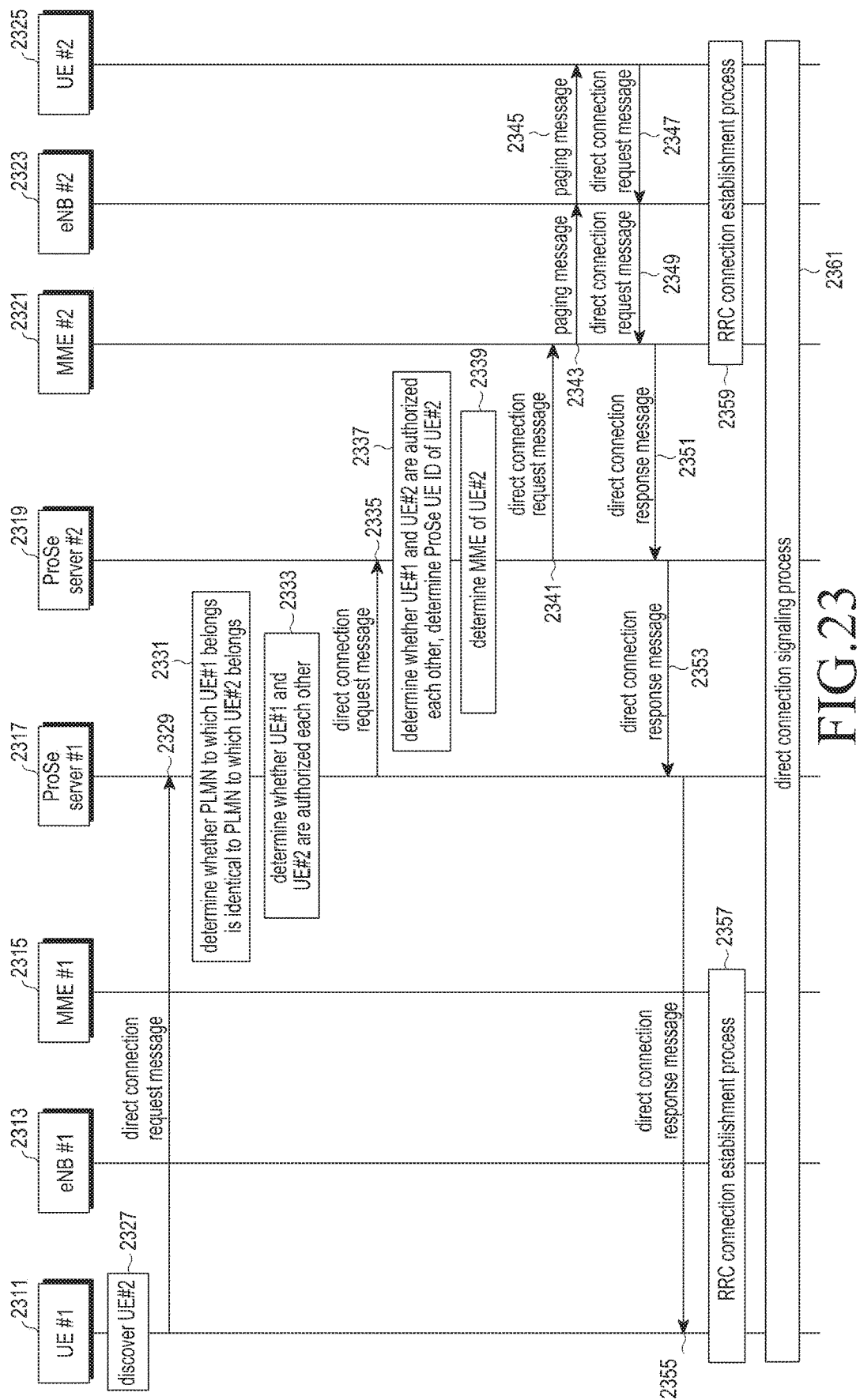
FIG. 23 schematically illustrates a network authorized direct connection establishment process based on the second direct connection establishment scheme for an inter MME case in a communication system supporting a D2D scheme according to an embodiment of the present disclosure.

FIG. 23 schematically illustrates a network authorized direct connection establishment process based on the second direct connection establishment scheme for an inter MME case in a communication system supporting a D2D scheme according to an embodiment of the present disclosure.

Referring to FIG. 23, the communication system includes a UE #1 2311, an eNB #1 2313, an MME #1 2315, a ProSe server #1 2317, a ProSe server #2 2319, an MME #2 2321, an eNB #2 2323, and a UE #2 2325.

The UE #1 2311 discovers the UE #2 2325, and determines to establish a direct connection with the UE #2 2325 at operation 2327. The UE #1 2311 determines PLMN information of the UE #2 2325. A detailed description of the operation of determining the PLMN information of the UE #2 2325 in the UE #1 2311 will be followed.

Firstly, the PLMN information, e.g., a PLMN ID may be included in discovery information transmitted on a discovery channel. If the UE #1 2311 discovers the UE #2 2325 using the discovery information, the UE #1 2311 may acquire the PLMN information.

Secondly, if the UE #2 2325 belongs to a PLMN which is different from a PLMN to which the UE #1 2311 belongs, the UE #2 2325 operates on an operating frequency different from an operating frequency of the UE #1 2311. In this case, in order to discover the UE #2 2325, the UE #1 2311 receives the discovery information from the UE #2 2325 on other frequency which is not a camped cell of the UE #1 2311. Here, a BS or an eNB of the UE #2 2325 transmits PLMN information on a PLMN to which the UE #2 2325 belongs. The UE #1 2311 may determine the PLMN information of the UE #2 2325 based on the PLMN information which is transmitted by the BS or the eNB of the UE #2 2325.

Thirdly, the UE #1 2311 may include a mapping table which stores mapping relation between a frequency and PLMN information. The UE #1 2311 may determine the PLMN information corresponding to a received frequency through which the discovery information is received using the mapping table. The UE #1 2311 knows a frequency through which the UE #1 2311 receives discovery information which is transmitted by the UE #2 2325.

After determining the direct connection with the UE #2 2325, the UE #1 2311 transmits a direct connection request message to the ProSe server 2317 at operation 2329. The direct connection request message includes a connection type (e.g., a mobile originated), information on the UE #2 2325 which is received on a discovery channel during a discovery process (e.g., a discovery code, an application user ID, or an alias of the application user ID), the ProSe UE ID of the UE #1 2311, and PLMN information of the UE #2 2325 (e.g., a PLMN ID and/or a frequency). The direct connection request message may include the PLMN ID of the UE #1 2311. The direct connection request message may include information on the UE #1 2311 (e.g., discovery code, an application user ID, or an alias of the application user ID).

After receiving the direct connection request message from the UE #1 2311, the ProSe server #1 2317 determines whether a PLMN to which the UE #1 2311 belongs is identical to a PLMN to which the UE #2 2325 belongs at operation 2331. In FIG. 23, it will be assumed that the UE #1 2311 belongs to a PLMN which is different to a PLMN to which the UE #2 2325 belongs. If the PLMN to which the UE #1 2311 belongs is different from the PLMN to which the UE #2 2325 belongs, the ProSe server #1 2317 determines whether the UE #1 2311 and the UE #2 2325 are authorized with each other in order to establish a direct connection between the UE #1 2311 and the UE #2 2325 at operation 2333. In FIG. 23, it will be assumed that the UE #1 2311 and the UE #2 2325 are authorized with each other. The ProSe server #1 2317 determines a ProSe server which will transmit a direct connection request message based on PLMN information of the UE #2 2325, i.e., the ProSe server #2 2319. The ProSe server #1 2317 transmits a direction connection request message to the ProSe server #2 2319 at operation 2335. The direction connection request message includes UE #2 information, the ProSe UE ID of the UE #1 2311, and the PLMN information of the UE #2 2325, e.g., a PLMN ID. The direction connection request message may include the PLMN ID of the UE #1 2311. The direction connection request message may include UE #1 information, e.g., a discovery code, an application ID, or an alias of the application ID. The direction connection request message may include radio resource information. The ProSe server #1 2317 determines radio resources by interacting with the MME #1 2315 and the eNB #1 2313. The radio resources may be previously configured, and information on the radio resources may be informed to the ProSe server #1 2317.

After receiving the direct connection request message from the ProSe server #1 2317, the ProSe server #2 2319 determines whether the UE #1 2311 and the UE #2 2325 are authorized with each other in order to establish a direct connection between the UE #1 2311 and the UE #2 2325 at operation 2337. The ProSe server #2 2319 determines a ProSe UE ID of the UE #2 2325 based on the UE #2 information. In an example, the ProSe server #2 2319 includes a UE information-ProSe UE ID mapping table in which UE information is mapped to a ProSe UE ID of a UE, and the UE information-ProSe UE ID mapping table is used to determine the ProSe UE ID of the UE #2 2325. In other example, the UE information-ProSe UE ID mapping table may be maintained by an application server. If the UE information-ProSe UE ID mapping table is maintained by the application server, the ProSe server #2 2319 performs a communication with the application server to determine the ProSe UE ID of the UE #2 2325. The application server with which the ProSe server #2 2319 performs a communication is determined based on the UE information.

The ProSe server #2 2319 determines an MME of the UE #2 2325 based on the ProSe UE ID at operation 2339. Here, the MME of the UE #2 2325 is the MME #2 2321. The ProSe server #2 2319 transmits a direct connection request message to the MME #2 2321 at operation 2341. The direct connection request message includes the ProSe UE ID of the UE #2 2325. The direct connection request message may include the ProSe UE ID of the UE #1 2311. The direct connection request message may include UE #1 information. The direct connection request message may include radio resource information. The ProSe server #2 2319 determines radio resources through the ProSe server #1 2317.

After receiving the direct connection request message, the MME #2 2321 transmits a paging message to the UE #2 2325 through the eNB #2 2323 at operations 2343 and 2345. The paging message includes a direct connection indicator and the ProSe UE ID of the UE #1 2311. The paging message may include UE #1 information. The UE #1 information included in the paging message may be used to determine to accept the direct connection request or reject the direct connection request. The paging message may include information on the UE #1 2311 which belongs to the other PLMN and a frequency of the UE #1 2311 which belongs to the other PLMN.

After receiving the paging message through the eNB #2 2323, the UE #2 2325 transmits a direct connection request message to the MME #2 2321 through the eNB #2 2323 at operations 2347 and 2349. The direct connection request message includes a connection type (i.e., mobile terminated) and the ProSe UE ID of the UE #2 2325.

After receiving the direct connection request message from the eNB #2 2323, the MME #2 2321 transmits a direct connection response message as a response message to the direct connection request message to the ProSe server #2 2319 at operation 2351. The direct connection response message may include information on an eNB of the UE #2 2325, i.e., the eNB #2 2323. The direct connection response message may include radio resource information. The ProSe server #2 2319 transmits the direct connection response message to the ProSe server #1 2317 at operation 2353. After receiving the direct connection response message from the ProSe server #2 2319, the ProSe server #1 2317 transmits the direct connection response message to the MME #1 2311 at operation 2355.

After receiving the direct connection response message from the MME #2 2321, the MME #1 2315 performs an RRC connection establishment process with the eNB #1 2313 at operation 2357. After receiving the direct connection request message from the eNB #2 2323, the MME #2 2321 performs an RRC connection establishment process with the UE #2 2325 and the eNB #2 2323 at operation 2359. While the RRC connection is established, radio resource information on a direct connection is provided to the UE #1 2311 and the UE #2 2325. The MMEs, i.e., the MME #1 2315 and the MME #2 2321 establish an RRC connection with the eNB #1 2313 and the eNB #2 2323 in order to adjust resource.

The UE #1 2311 and the UE #2 2325 may exchange signaling in a direct connection each other at operation 2361. That is, a direct connection signaling process is performed between the UE #1 2311 and the UE #2 2325.

Although FIG. 23 illustrates a network authorized direct connection establishment process based on the second direct connection establishment scheme for an inter MME case in a communication system supporting a D2D scheme according to an embodiment of the present disclosure, various changes could be made to FIG. 23. For example, although shown as a series of operations, various operations in FIG. 23 could overlap, occur in parallel, occur in a different order, or occur multiple times.

A network authorized direct connection establishment process based on the second direct connection establishment scheme for an inter MME case in a communication system supporting a D2D scheme according to an embodiment of the present disclosure has been described with reference to FIG. 23, and an inner structure of a UE in a communication system supporting a D2D scheme according to an embodiment of the present disclosure will be described with reference to FIG. 24.

Figure 24:
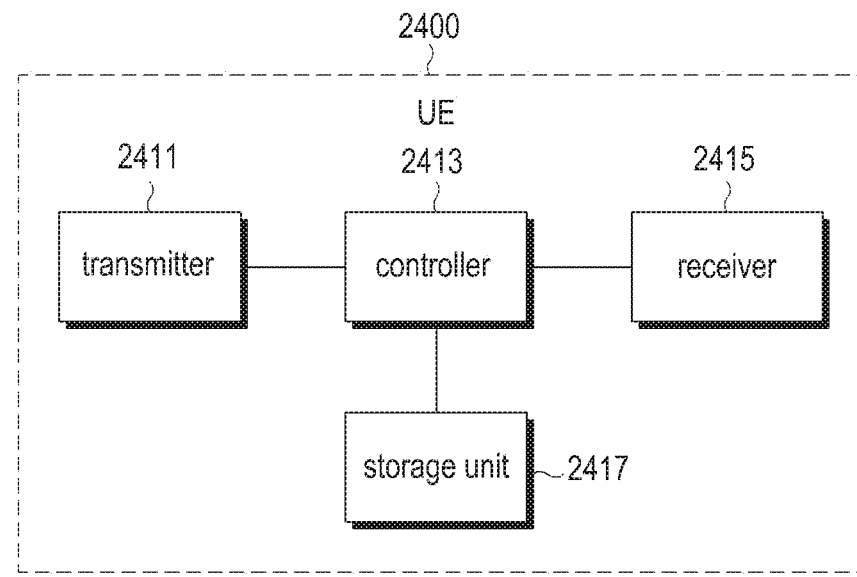
FIG. 24 schematically illustrates an inner structure of a UE in a communication system supporting a D2D scheme according to an embodiment of the present disclosure.

FIG. 24 schematically illustrates an inner structure of a UE in a communication system supporting a D2D scheme according to an embodiment of the present disclosure.

Referring to FIG. 24, a UE 2400 includes a transmitter 2411, a controller 2413, a receiver 2415, and a storage unit 2417.

The controller 2413 controls the overall operation of the UE 2400. More particularly, the controller 2413 controls the UE 2400 to perform an operation related to a network authorized direct connection establishment operation. The operation related to the network authorized direct connection establishment operation is performed in the manner described with reference to FIGS. 2 to 23 and a description thereof will be omitted herein.

The transmitter 2411 transmits various signals and various messages, and the like to an eNB, a ProSe server, and the like under a control of the controller 2413. The various signals and the various messages, and the like transmitted in the transmitter 2411 have been described in FIGS. 2 to 23 and a description thereof will be omitted herein.

The receiver 2415 receives various signals and various messages, and the like from the eNB, the ProSe server, and the like under a control of the controller 2413. The various signals and the various messages, and the like received in the receiver 2415 have been described in FIGS. 2 to 23 and a description thereof will be omitted herein.

The storage unit 2417 stores a program necessary for the operation of the UE 2400 and various data, specially information on the operation related to the network authorized direct connection establishment operation, and the like. The storage unit 2417 stores the various signals and the various messages which the receiver 2415 receives from the eNB, the ProSe server, and the like, and the like.

While the transmitter 2411, the controller 2413, the receiver 2415, and the storage unit 2417 are described as separate units, it is to be understood that this is merely for convenience of description. In other words, two or more of the transmitter 2411, the controller 2413, the receiver 2415, and the storage unit 2417 may be incorporated into a single unit.

An inner structure of a UE in a communication system supporting a D2D scheme according to an embodiment of the present disclosure has been described with reference to FIG. 24, and an inner structure of an eNB in a communication system supporting a D2D scheme according to an embodiment of the present disclosure will be described with reference to FIG. 25.

Figure 25:
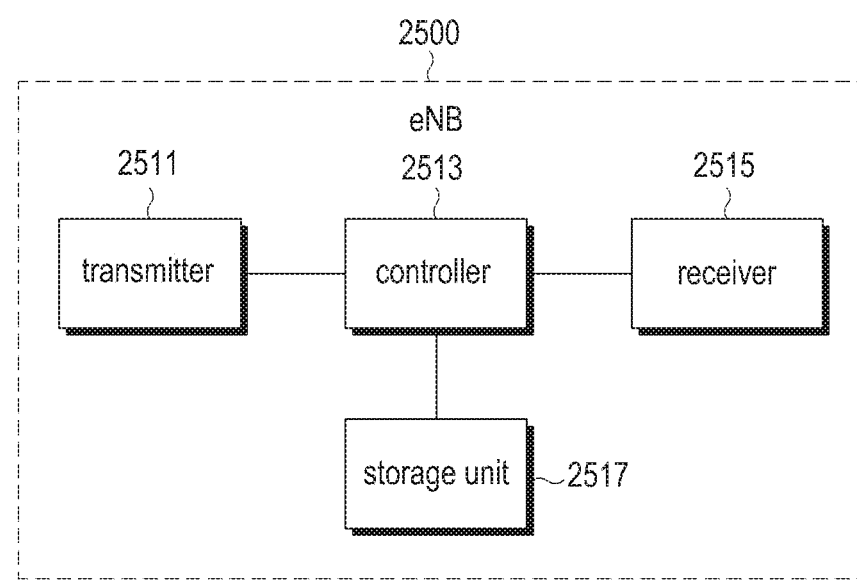
FIG. 25 schematically illustrates an inner structure of an eNB in a communication system supporting a D2D scheme according to an embodiment of the present disclosure.

FIG. 25 schematically illustrates an inner structure of an eNB in a communication system supporting a D2D scheme according to an embodiment of the present disclosure.

Referring to FIG. 25, an eNB 2500 includes a transmitter 2511, a controller 2513, a receiver 2515, and a storage unit 2517.

The controller 2513 controls the overall operation of the eNB 2500. More particularly, the controller 2513 controls the eNB 2500 to perform an operation related to a network authorized direct connection establishment operation. The operation related to the network authorized direct connection establishment operation is performed in the manner described with reference to FIGS. 2 to 23 and a description thereof will be omitted herein.

The transmitter 2511 transmits various signals and various messages, and the like to a UE, an MME, a ProSe server, and the like under a control of the controller 2513. The various signals and the various messages, and the like transmitted in the transmitter 2511 have been described in FIGS. 2 to 23 and a description thereof will be omitted herein.

The receiver 2515 receives various signals and various messages, and the like from the MME, the ProSe server, and the like under a control of the controller 2513. The various signals and the various messages, and the like received in the receiver 2515 have been described in FIGS. 2 to 23 and a description thereof will be omitted herein.

The storage unit 2517 stores a program necessary for the operation of the eNB 2500 and various data, specially information on the operation related to the network authorized direct connection establishment operation, and the like. The storage unit 2517 stores the various signals and the various messages which the receiver 2515 receives from the UE, the MME, the ProSe server, and the like, and the like.

While the transmitter 2511, the controller 2513, the receiver 2515, and the storage unit 2517 are described as separate units, it is to be understood that this is merely for convenience of description. In other words, two or more of the transmitter 2511, the controller 2513, the receiver 2515, and the storage unit 2517 may be incorporated into a single unit.

An inner structure of an eNB in a communication system supporting a D2D scheme according to an embodiment of the present disclosure has been described with reference to FIG. 25, and an inner structure of an MME in a communication system supporting a D2D scheme according to an embodiment of the present disclosure will be described with reference to FIG. 26.

Figure 26:
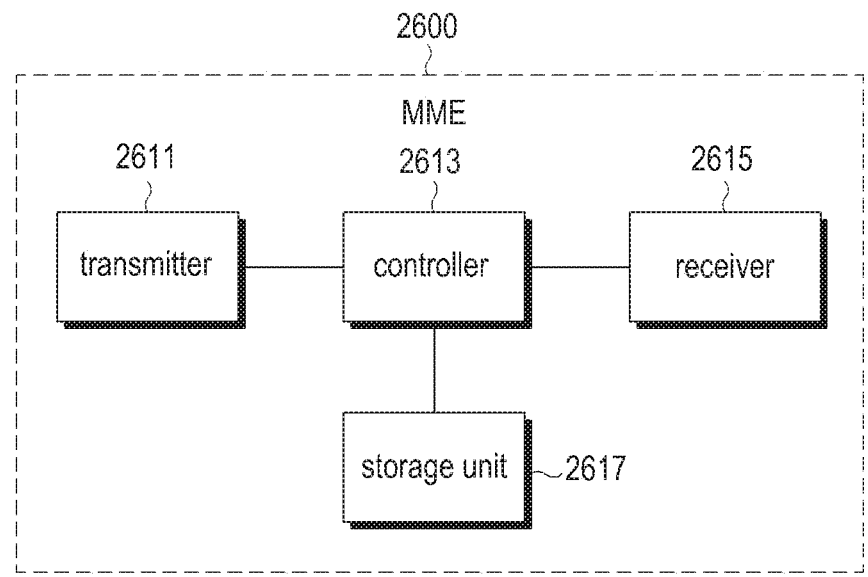
FIG. 26 schematically illustrates an inner structure of an MME in a communication system supporting a D2D scheme according to an embodiment of the present disclosure.

FIG. 26 schematically illustrates an inner structure of an MME in a communication system supporting a D2D scheme according to an embodiment of the present disclosure.

Referring to FIG. 26, an MME 2600 includes a transmitter 2611, a controller 2613, a receiver 2615, and a storage unit 2617.

The controller 2613 controls the overall operation of the MME 2600.

More particularly, the controller 2613 controls the MME 2600 to perform an operation related to a network authorized direct connection establishment operation. The operation related to the network authorized direct connection establishment operation is performed in the manner described with reference to FIGS. 2 to 23 and a description thereof will be omitted herein.

The transmitter 2611 transmits various signals and various messages, and the like to an eNB, a ProSe server, and the like under a control of the controller 2613. The various signals and the various messages, and the like transmitted in the transmitter 2611 have been described in FIGS. 2 to 23 and a description thereof will be omitted herein.

The receiver 2615 receives various signals and various messages, and the like from the eNB, the ProSe server, and the like under a control of the controller 2613. The various signals and the various messages, and the like received in the receiver 2615 have been described in FIGS. 2 to 23 and a description thereof will be omitted herein.

The storage unit 2617 stores a program necessary for the operation of the MME 2600 and various data, specially information on the operation related to the network authorized direct connection establishment operation, and the like. The storage unit 2617 stores the various signals and the various messages which the receiver 2615 receives from the eNB, the ProSe server, and the like, and the like.

While the transmitter 2611, the controller 2613, the receiver 2615, and the storage unit 2617 are described as separate units, it is to be understood that this is merely for convenience of description. In other words, two or more of the transmitter 2611, the controller 2613, the receiver 2615, and the storage unit 2617 may be incorporated into a single unit.

An inner structure of an MME in a communication system supporting a D2D scheme according to an embodiment of the present disclosure has been described with reference to FIG. 26, and an inner structure of a ProSe server in a communication system supporting a D2D scheme according to an embodiment of the present disclosure will be described with reference to FIG. 27.

Figure 27:
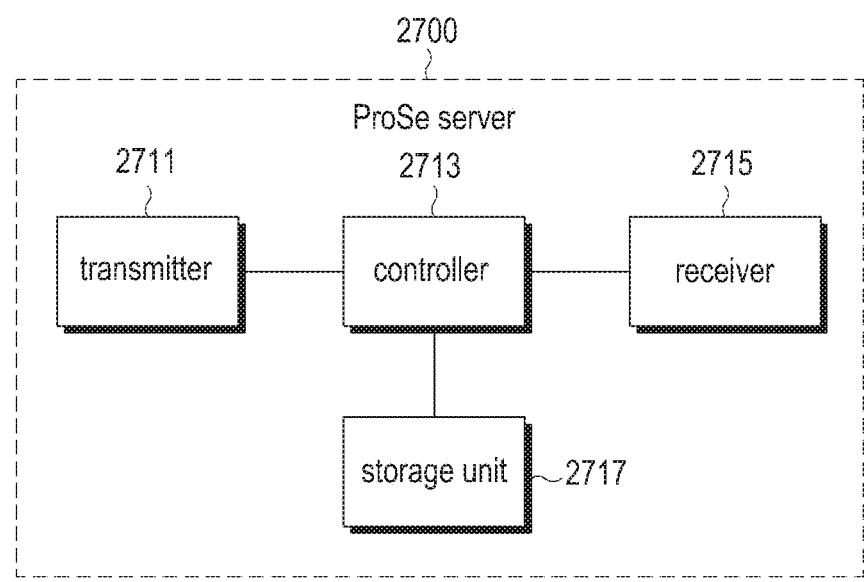
FIG. 27 schematically illustrates an inner structure of a ProSe server in a communication system supporting a D2D scheme according to an embodiment of the present disclosure.

FIG. 27 schematically illustrates an inner structure of a ProSe server in a communication system supporting a D2D scheme according to an embodiment of the present disclosure.

Referring to FIG. 27, a ProSe server 2700 includes a transmitter 2711, a controller 2713, a receiver 2715, and a storage unit 2717.

The controller 2713 controls the overall operation of the ProSe server 2700. More particularly, the controller 2713 controls the ProSe server 2700 to perform an operation related to a network authorized direct connection establishment operation. The operation related to the network authorized direct connection establishment operation is performed in the manner described with reference to FIGS. 2 to 23 and a description thereof will be omitted herein.

The transmitter 2711 transmits various signals and various messages, and the like to a UE, an MME, and the like under a control of the controller 2713. The various signals and the various messages, and the like transmitted in the transmitter 2711 have been described in FIGS. 2 to 23 and a description thereof will be omitted herein.

The receiver 2715 receives various signals and various messages, and the like from the UE, the MME, and the like under a control of the controller 2713. The various signals and the various messages, and the like received in the receiver 2715 have been described in FIGS. 2 to 23 and a description thereof will be omitted herein.

The storage unit 2717 stores a program necessary for the operation of the ProSe server 2700 and various data, specially information on the operation related to the network authorized direct connection establishment operation, and the like. The storage unit 2717 stores the various signals and the various messages which the receiver 2715 receives from the UE, the MME, and the like, and the like.

While the transmitter 2711, the controller 2713, the receiver 2715, and the storage unit 2717 are described as separate units, it is to be understood that this is merely for convenience of description. In other words, two or more of the transmitter 2711, the controller 2713, the receiver 2715, and the storage unit 2717 may be incorporated into a single unit.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc ROMs (CD-ROMs), magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of a first user equipment (UE) in a communication system, the method comprising:
  discovering a second UE;
  transmitting, to a first mobility management entity (MME) to which the first UE belongs, a first direct connection request message including information of the second UE for establishing a direct connection with the second UE;
  establishing a radio resource control (RRC) connection with a base station connected to the first UE for configuring the direct connection after a first direct connection response message is received by the first MME; and establishing the direct connection with the second UE,
wherein the direct connection for exchanging signaling between the first UE and the second UE is a network authorized-direct connection,
wherein the first MME identifies that the first UE and the second UE are connected to different public land mobile networks (PLMNs), transmits a second direct connection request message to a first proximity-based service (ProSe) server connected to the first MME, and receives, in a first case that the first ProSe server identifies that the first UE and the second UE are authorized with each other, a second direct connection response message from the first ProSe server,
wherein the first ProSe server transmits a third direct connection request message to a second ProSe server connected to a second MME to which the second UE belongs in the first case,
wherein the second ProSe server identifies the second MME based on a ProSe UE identifier (ID) of the second UE in a second case that the second ProSe server identifies that the first UE and the second UE are authorized with each other, and transmits a fourth direct connection request message to the second MME, and
wherein the ProSe UE ID of the second UE includes information indicating the second MME, and the ProSe UE ID is identified based on a mapping table indicating a relation between the information of the second UE and the ProSe UE ID of the second UE.

2. The method of claim 1,
wherein one of the first to fourth direct connection request messages further includes at least one of a connection type, a ProSe UE ID of the first UE, PLMN information for the second UE, a PLMN ID of the first UE, or information for the first UE,
wherein the PLMN information for the second UE is identified based on discovery information or a mapping relation between a frequency and PLMN information,
wherein the PLMN information for the second UE includes at least one of a PLMN ID of a PLMN to which the second UE belongs or an operating frequency on which the second UE operates, and
wherein the information of the second UE comprises a discovery code associated with an application ID or an application user ID.

3. The method of claim 2,
wherein the ProSe UE ID of the first UE is generated based on a global unique terminal identifier (GUTI) of the first UE, or
wherein the ProSe UE ID of the first UE is generated based on an MME ID of the first MME and an MME temporary mobile station identifier (M-TMSI), or
wherein the ProSe UE ID of the first UE is generated based on an MME group identifier (MMEGI) of an MME group to which the first MME belongs and a short temporary mobile station identifier (S-TMSI), or
wherein the ProSe UE ID of the first UE is generated based on a GUTI of the first UE, a mobile country code (MCC), a mobile network code (MNC), an S-TMSI, and a ProSe server ID, or
wherein the ProSe UE ID of the first UE is generated based on an MME ID, an M-TMSI, and a ProSe server ID, or
wherein the ProSe UE ID of the first UE is generated based on an MMEGI, an S-TMSI, and a ProSe server ID.

4. A method of a first mobility management entity (MME) in a communication system, the method comprising:

receiving a first direct connection request message including information of a second user equipment (UE) from a first UE;
identifying that the first UE and the second UE are connected to different public land mobile networks (PLMNs);
transmitting a second direct connection request message to a first proximity-based service (ProSe) server connected to the first MME to which the first UE belongs; and
receiving a first direct connection response message from the first ProSe server in a first case that the first ProSe server identifies that the first UE and the second UE are authorized with each other,
wherein the first direct connection request message is transmitted by the first UE for establishing a direct connection with the second UE,
wherein the direct connection for exchanging signaling between the first UE and the second UE is a network authorized-direct connection,
wherein the first ProSe server transmits a third direct connection request message to a second ProSe server connected to a second MME to which the second UE belongs in the first case,
wherein the second ProSe server identifies the second MME based on a ProSe UE identifier (ID) of the second UE in a second case that the second ProSe server identifies that the first UE and the second UE are authorized with each other, and transmits a fourth direct connection request message to the second MME,
wherein the ProSe UE ID of the second UE includes information indicating the second MME, and the ProSe UE ID is identified based on a mapping table indicating a relation between the information of the second UE and the ProSe UE ID of the second UE, and
wherein a radio resource control (RRC) connection is established between the first UE and a base station connected to the first UE for configuring the direct connection after the first direct connection response message is received.

5. The method of claim 4,
wherein one of the first to fourth direct connection request messages further includes at least one of a connection type, a ProSe UE ID of the first UE, PLMN information for the second UE, a PLMN ID of the first UE, or information for the first UE,
wherein the PLMN information for the second UE is identified based on discovery information or a mapping relation between a frequency and PLMN information,
wherein the PLMN information for the second UE includes at least one of a PLMN ID of a PLMN to which the second UE belongs or an operating frequency on which the second UE operates, and
wherein the information of the second UE comprises a discovery code associated with an application ID or an application user ID.

6. The method of claim 5,
wherein the ProSe UE ID of the first UE is generated based on a global unique terminal identifier (GUTI) of the first UE, or
wherein the ProSe UE ID of the first UE is generated based on an MME ID of the first MME and an MME temporary mobile station identifier (M-TMSI), or
wherein the ProSe UE ID of the first UE is generated based on an MME group identifier (MMEGI) of an MME group to which the first MME belongs and a short temporary mobile station identifier (S-TMSI), or wherein the ProSe UE ID of the first UE is generated based on a GUTI of the first UE, a mobile country code (MCC), a mobile network code (MNC), an S-TMSI, and a ProSe server ID, or wherein the ProSe UE ID of the first UE is generated based on an MME ID, an M-TMSI, and a ProSe server ID, or wherein the ProSe UE ID of the first UE is generated based on an MMEGI, an S-TMSI, and a ProSe server ID.

7. A method of a first proximity-based service (ProSe) server in a communication system, the method comprising:

receiving a first direct connection request message including information of a second user equipment (UE) from a first mobility management entity (MME) to which a first UE belongs in a first case that the first MME identifies that the first UE and the second UE are connected to different public land mobile networks (PLMNs);

identifying that the first UE and the second UE are authorized with each other;

transmitting a second direct connection request message to a second ProSe server connected to a second MME to which the second UE belongs;

receiving a first direct connection response message from the second ProSe server in a second case that the second ProSe server identifies that the first UE and the second UE are authorized with each other; and transmitting a second direct connection response message to the first MME, wherein the first direct connection request message is transmitted after the first MME receives, from the first UE, a third direct connection request message for establishing a direct connection between the first UE and the second UE, wherein the direct connection for exchanging signaling between the first UE and the second UE is a network authorized-direct connection, wherein a radio resource control (RRC) connection is established between the first UE and a base station connected to the first UE for configuring the direct connection after the second direct connection response message is transmitted, wherein the second ProSe server identifies the second MME based on a ProSe UE identifier (ID) of the second UE, and wherein the ProSe UE ID of the second UE includes information indicating the second MME, and the ProSe UE ID is identified based on a mapping table indicating a relation between the information of the second UE and the ProSe UE ID of the second UE.

8. The method of claim 7, wherein one of the first to third direct connection request messages includes at least one of information for the second UE, or a ProSe UE ID of the first UE, and wherein the information of the second UE comprises a discovery code associated with an application ID or an application user ID.

9. The method of claim 8, wherein the ProSe UE ID of the first UE is generated based on a global unique terminal identifier (GUTI) of the first UE, or wherein the ProSe UE ID of the first UE is generated based on an MME ID of the first MME and an MME temporary mobile station identifier (M-TMSI), or wherein the ProSe UE ID of the first UE is generated based on an MME group identifier (MMEGI) of an MME group to which the first MME belongs and a short temporary mobile station identifier (S-TMSI), or wherein the ProSe UE ID of the first UE is generated based on a GUTI of the first UE, a mobile country code (MCC), a mobile network code (MNC), an S-TMSI, and a ProSe server ID, or wherein the ProSe UE ID of the first UE is generated based on an MME ID, an M-TMSI, and a ProSe server ID, or wherein the ProSe UE ID of the first UE is generated based on an MMEGI, an S-TMSI, and a ProSe server ID.

10. A method of a second user equipment (UE) in a communication system, the method comprising:

receiving a paging message from a second mobility management entity (MME) to which the second UE belongs, the paging message including a direct connection indicator in a case that a first MME to which a first UE belongs identifies that the first UE and the second UE are connected to different public land mobile networks (PLMNs), and a first proximity-based service (ProSe) server connected to the first MME and a second ProSe server connected to the second MME identify that the first UE and the second UE are authorized with each other;

transmitting, to the second MME, a first direct connection request message associated with a direct connection for exchanging signaling between the first UE and the second UE, the direct connection being a network authorized-direct connection;

establishing a radio resource control (RRC) connection with a base station connected to the second UE for configuring the direct connection; and establishing the direct connection with the first UE, wherein the paging message is transmitted after the second MME receives a second direct connection request message from the second ProSe server which identifies that the first UE and the second UE are authorized with each other, wherein the second ProSe server identifies the second MME based on a ProSe UE identifier (ID) of the second UE, and wherein the ProSe UE ID of the second UE includes information indicating the second MME, and ProSe UE ID is identified based on a mapping table indicating a relation between the information of the second UE and the ProSe UE ID of the second UE.

11. The method of claim 10, wherein the paging message further includes a ProSe UE ID of the first UE, wherein one of the first and second direct connection request messages further includes a connection type, wherein the second UE is discovered by the first UE, and wherein the information of the second UE comprises a discovery code associated with an application ID or an application user ID.

12. The method of claim 11, wherein the ProSe UE ID of the first UE is generated based on a global unique terminal identifier (GUTI) of the first UE, or wherein the ProSe UE ID of the first UE is generated based on an MME ID of the first MME and an MME temporary mobile station identifier (M-TMSI), or wherein the ProSe UE ID of the first UE is generated based on an MME group identifier (MMEGI) of an MME group to which the first MME belongs and a short temporary mobile station identifier (S-TMSI), or wherein the ProSe UE ID of the first UE is generated based on a GUTI of the first UE, a mobile country code (MCC), a mobile network code (MNC), an S-TMSI, and a ProSe server ID, or wherein the ProSe UE ID of the first UE is generated based on an MME ID, an M-TMSI, and a ProSe server ID, or wherein the ProSe UE ID of the first UE is generated based on an MMEGI, an S-TMSI, and a ProSe server ID.

13. A first user equipment (UE) in a communication system, the first UE comprising:
at least one processor configured to discover a second UE; and
a transceiver configured to:
transmit, to a first mobility management entity (MME) to which the first UE belongs, a first direct connection request message including information of the second UE for establishing a direct connection with the second UE,
establish a radio resource control (RRC) connection with a base station connected to the first UE for configuring the direct connection after a first direct connection response message is received by the first MME, and
establish the direct connection with the second UE,
wherein the direct connection for exchanging signaling between the first UE and the second UE is a network authorized-direct connection,
wherein the first MME identifies that the first UE and the second UE are connected to different public land mobile networks (PLMNs), transmits a second direct connection request message to a first proximity-based service (ProSe) server connected to the first MME, and receives, in a first case that the first ProSe server identifies that the first UE and the second UE are authorized with each other, a second direct connection response message from the first ProSe server,
wherein a second ProSe server identifies a second MME based on a ProSe UE identifier (ID) of the second UE in a second case that the second ProSe server identifies that the first UE and the second UE are authorized with each other, and transmits a fourth direct connection request message to the second MME, and
wherein the ProSe UE ID of the second UE includes information indicating the second MME, and the ProSe UE ID is identified based on a mapping table indicating a relation between the information of the second UE and the ProSe UE ID of the second UE.

14. A first mobility management entity (MME) in a communication system, the first MME comprising:
at least one processor configured to identify that a first user equipment (UE) and a second UE are connected to different public land mobile networks (PLMNs); and
a transceiver configured to:
receive a first direct connection request message including information of the second UE,
transmit a second direct connection request message to a first proximity-based service (ProSe) server connected to the first MME to which the first UE belongs, and
receive a first direct connection response message from the first ProSe server in a first case that the first ProSe server identifies that the first UE and the second UE are authorized with each other,
wherein the first direct connection request message is transmitted by the first UE for establishing a direct connection with the second UE,
wherein the direct connection for exchanging signaling between the first UE and the second UE is a network authorized-direct connection,
wherein the first ProSe server transmits a third direct connection request message to a second ProSe server connected to a second MME to which the second UE belongs in the first case,
wherein the second ProSe server identifies the second MME based on a ProSe UE identifier (ID) of the second UE in a second case that the second ProSe server identifies that the first UE and the second UE are authorized with each other, and transmits a fourth direct connection request message to the second MME,
wherein the ProSe UE ID of the second UE includes information indicating the second MME, and the ProSe UE ID is identified based on a mapping table indicating a relation between the information of the second UE and the ProSe UE ID of the second UE, and
wherein a radio resource control (RRC) connection is established between the first UE and a base station connected to the first UE for configuring the direct connection after the first direct connection response message is received.

15. A first proximity-based service (ProSe) server in a communication system, the first ProSe server comprising:
at least one processor configured to identify that a first user equipment (UE) and a second UE are authorized with each other; and
a transceiver configured to:
receive, from a first mobility management entity (MME) to which the first UE belongs, a first direct connection request message including information of the second UE in a first case that the first MME identifies that the first UE and the second UE are connected to different public land mobile networks (PLMNs),
transmit a second direct connection request message to a second ProSe server connected to a second MME to which the second UE belongs,
receive a first direct connection response message from the second ProSe server in a second case that the second ProSe server identifies that the first UE and the second UE are authorized with each other, and
transmit a second direct connection response message to the first MME,
wherein the first direct connection request message is transmitted after the first MME receives, from the first UE, a third direct connection request message for establishing a direct connection between the first UE and the second UE,
wherein the direct connection for exchanging signaling between the first UE and the second UE is a network authorized-direct connection,
wherein a radio resource control (RRC) connection is established between the first UE and a base station connected to the first UE for configuring the direct connection after the second direct connection response message is transmitted,
wherein the second ProSe server identifies the second MME based on a ProSe UE identifier (ID) of the second UE, and
wherein the ProSe UE ID of the second UE includes information indicating the second MME, and the ProSe UE ID is identified based on a mapping table indicating a relation between the information of the second UE and the ProSe UE ID of the second UE.

16. A second user equipment (UE) in a communication system, the second UE comprising:
at least one processor; and
a transceiver configured to:
receive a paging message from a second mobility management entity (MME) to which the second UE belongs, the paging message including a direct connection indicator in a case that a first MME to which a first UE belongs identifies that the first UE and the second UE are connected to different public land mobile networks (PLMNs), and a first proximity-based service (ProSe) server connected to the first MME and a second ProSe server connected to the second MME identify that the first UE and the second UE are authorized with each other,
transmit, to the second MME, a first direct connection request message associated with a direct connection for exchanging signaling between the first UE and the second UE, the direct connection being a network authorized-direct connection,
establish a radio resource control (RRC) connection with a base station connected to the second UE for configuring the direct connection, and
establish the direct connection with the first UE,
wherein the paging message is transmitted after the second MME receives a second direct connection request message from the second ProSe server which identifies that the first UE and the second UE are authorized with each other,
wherein the second ProSe server identifies the second MME based on a ProSe UE identifier (ID) of the second UE, and
wherein the ProSe UE ID of the second UE includes information indicating the second MME, and the ProSe UE ID is identified based on a mapping table indicating a relation between the information of the second UE and the ProSe UE ID of the second UE.

17. The first UE of claim 13,
wherein one of the first to fourth direct connection request messages further includes at least one of a connection type, a ProSe UE ID of the first UE, PLMN information for the second UE, a PLMN ID of the first UE, or information for the first UE,
wherein the PLMN information for the second UE is identified based on discovery information or a mapping relation between a frequency and PLMN information,
wherein the PLMN information for the second UE includes at least one of a PLMN ID of a PLMN to which the second UE belongs or an operating frequency on which the second UE operates, and
wherein the information of the second UE comprises a discovery code associated with an application ID or an application user ID.

18. The first UE of claim 17,
wherein the ProSe UE ID of the first UE is generated based on a global unique terminal identifier (GUTI) of the first UE, or
wherein the ProSe UE ID of the first UE is generated based on an MME ID of the first MME and an MME temporary mobile station identifier (M-TMSI), or
wherein the ProSe UE ID of the first UE is generated based on an MME group identifier (MMEGI) of an MME group to which the first MME belongs and a short temporary mobile station identifier (S-TMSI), or wherein the ProSe UE ID of the first UE is generated based on a GUTI of the first UE, a mobile country code (MCC), a mobile network code (MNC), an S-TMSI, and a ProSe server ID, or
wherein the ProSe UE ID of the first UE is generated based on an MME ID, an M-TMSI, and a ProSe server ID, or
wherein the ProSe UE ID of the first UE is generated based on an MMEGI, an S-TMSI, and a ProSe server ID.

19. The first MME of claim 14,
wherein one of the first to fourth direct connection request messages further includes at least one of a connection type, a ProSe UE ID of the first UE, PLMN information for the second UE, a PLMN ID of the first UE, or information for the first UE,
wherein the PLMN information for the second UE is identified based on discovery information or a mapping relation between a frequency and PLMN information,
wherein the PLMN information for the second UE includes at least one of a PLMN ID of a PLMN to which the second UE belongs or an operating frequency on which the second UE operates, and
wherein the information of the second UE comprises a discovery code associated with an application ID or an application user ID.

20. The first MME of claim 19,
wherein the ProSe UE ID of the first UE is generated based on a global unique terminal identifier (GUTI) of the first UE, or
wherein the ProSe UE ID of the first UE is generated based on an MME ID of the first MME and an MME temporary mobile station identifier (M-TMSI), or
wherein the ProSe UE ID of the first UE is generated based on an MME group identifier (MMEGI) of an MME group to which the first MME belongs and a short temporary mobile station identifier (S-TMSI), or
wherein the ProSe UE ID of the first UE is generated based on a GUTI of the first UE, a mobile country code (MCC), a mobile network code (MNC), an S-TMSI, and a ProSe server ID, or
wherein the ProSe UE ID of the first UE is generated based on an MME ID, an M-TMSI, and a ProSe server ID, or
wherein the ProSe UE ID of the first UE is generated based on an MMEGI, an S-TMSI, and a ProSe server ID.

21. The first ProSe server of claim 15,
wherein one of the first to third direct connection request messages includes at least one of information for the second UE, or a ProSe UE ID of the first UE, and
wherein the information of the second UE comprises a discovery code associated with an application ID or an application user ID.

22. The first ProSe server of claim 21,
wherein the ProSe UE ID of the first UE is generated based on a global unique terminal identifier (GUTI) of the first UE, or
wherein the ProSe UE ID of the first UE is generated based on an MME ID of the first MME and an MME temporary mobile station identifier (M-TMSI), or
wherein the ProSe UE ID of the first UE is generated based on an MME group identifier (MMEGI) of an MME group to which the first MME belongs and a short temporary mobile station identifier (S-TMSI), or wherein the ProSe UE ID of the first UE is generated based on a GUTI of the first UE, a mobile country code (MCC), a mobile network code (MNC), an S-TMSI, and a ProSe server ID, or wherein the ProSe UE ID of the first UE is generated based on an MME ID, an M-TMSI, and a ProSe server ID, or wherein the ProSe UE ID of the first UE is generated based on an MMEGI, an S-TMSI, and a ProSe server ID.

23. The second UE of claim 16,
wherein the paging message further includes a ProSe UE ID of the first UE,
wherein one of the first and second direct connection request messages further includes a connection type,
wherein the second UE is discovered by the first UE, and
wherein the information of the second UE comprises a discovery code associated with an application ID or an application user ID.

24. The second UE of claim 23,
wherein the ProSe UE ID of the first UE is generated based on a global unique terminal identifier (GUTI) of the first UE, or wherein the ProSe UE ID of the first UE is generated based on an MME ID of the first MME and an MME temporary mobile station identifier (M-TMSI), or wherein the ProSe UE ID of the first UE is generated based on an MME group identifier (MMEGI) of an MME group to which the first MME belongs and a short temporary mobile station identifier (S-TMSI), or wherein the ProSe UE ID of the first UE is generated based on a GUTI of the first UE, a mobile country code (MCC), a mobile network code (MNC), an S-TMSI, and a ProSe server ID, or wherein the ProSe UE ID of the first UE is generated based on an MME ID, an M-TMSI, and a ProSe server ID, or wherein the ProSe UE ID of the first UE is generated based on an MMEGI, an S-TMSI, and a ProSe server ID.

* * * * *